US012742953B2

(12) United States Patent
Kimura

(10) Patent No.: US 12,742,953 B2
(45) Date of Patent: Sep. 22, 2026

(54) ZOOM LENS AND IMAGE PICKUP APPARATUS

(71) Applicant: CANON KABUSHIKI KAISHA, Tokyo (JP)

(72) Inventor: Kohei Kimura, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 303 days.

(21) Appl. No.: 18/430,420

(22) Filed: Feb. 1, 2024

(65) Prior Publication Data

US 2024/0264419 A1 Aug. 8, 2024

(30) Foreign Application Priority Data

Feb. 6, 2023 (JP) ................................ 2023-015971

(51) Int. Cl.
*G02B 15/14* (2006.01)
*G02B 13/00* (2006.01)
(Continued)

(52) U.S. Cl.
CPC ....... *G02B 15/1461* (2019.08); *G02B 13/005* (2013.01); *G02B 13/02* (2013.01); *G02B 27/646* (2013.01)

(58) Field of Classification Search
CPC ........ G02B 15/1431; G02B 15/143101; G02B 15/143105; G02B 15/1441;
(Continued)

(56) References Cited

U.S. PATENT DOCUMENTS 5,042,927 A * 8/1991 Ogawa ........... G02B 15/145113
359/683
6,246,519 B1 6/2001 Suzuki
(Continued)

FOREIGN PATENT DOCUMENTS

GB 2625870 A 7/2024
JP 6969784 B2 11/2021
(Continued)

OTHER PUBLICATIONS

Gross et al. "Handbook of Optical Systems vol. 3: Aberration Theory and Correction of Optical Systems" Weinheim Germany, Wiley-VCH Verlag GmbH & Co. KGaA, pp. 377-379 (Year: 2007).*

(Continued)

*Primary Examiner* — Cara E Rakowski
(74) *Attorney, Agent, or Firm* — Canon U.S.A., Inc. IP Division

(57) ABSTRACT

A zoom lens includes a plurality of lens units, the plurality of lens units consisting of, in order from an object side to an image side, a first lens unit having positive refractive power, a second lens unit having negative refractive power, and a rear group consisting of one or more lens units. A distance between adjacent lens units changes during zooming, and the second lens unit does not move for zooming. At least a part of the second lens unit moves in a direction including a component orthogonal to an optical axis during image stabilization. A lens disposed closest to an object in the second lens unit has positive refractive power. A predetermined inequality is satisfied.

15 Claims, 26 Drawing Sheets

(51) Int. Cl.
*G02B 13/02* (2006.01)
*G02B 27/64* (2006.01)

(58) Field of Classification Search
CPC .... G02B 15/144101; G02B 15/144105; G02B 15/144109; G02B 15/144113; G02B 15/1451; G02B 15/145101; G02B 15/145105; G02B 15/145109; G02B 15/145113; G02B 15/145117; G02B 15/145121; G02B 15/145125; G02B 15/145129; G02B 15/1461
See application file for complete search history.

(56) References Cited

U.S. PATENT DOCUMENTS

| | | | | |
|---|---|---|---|---|
| 9,509,912 | B2 | 11/2016 | Okumura | |
| 2013/0201565 | A1* | 8/2013 | Yamanaka | G02B 15/145125 359/684 |
| 2014/0211029 | A1* | 7/2014 | Okumura | G02B 15/145113 359/557 |
| 2018/0284407 | A1* | 10/2018 | Iwasawa | G02B 27/0025 |
| 2022/0214530 | A1* | 7/2022 | Nakahara | G02B 15/145113 |
| 2022/0260814 | A1* | 8/2022 | Kitada | G02B 7/14 |

FOREIGN PATENT DOCUMENTS

| | | | |
|---|---|---|---|
| JP | 2022106401 | A | 7/2022 |
| JP | 2022125480 | A | 8/2022 |
| WO | 2020105111 | A1 | 5/2020 |

OTHER PUBLICATIONS

Herbert Gross et al., Handbook of Optical Systems, vol. 3: Aberration Theory and Correction of Optical Systems, 2007, pp. 377-379.

Herbert Gross et al., Handbook of Optical Systems, vol. 3: Aberration Theory and Correction of Optical Systems, Chapter 31: Correction of Aberrations, 2007, pp. 215-221 and 225.

* cited by examiner d-line
g-line
Fno= 5.6
-0.400 0.400
SPHERICAL ABERRATION

ΔS
ΔM
$\omega$= 6.08°
-0.400 0.400
ASTIGMATISM d-line
$\omega$= 6.08°
-2.000 2.000
DISTORTION (%)

g-line
$\omega$= 6.08°
-0.050 0.050
CHROMATIC ABERRATION d-line
g-line
Fno= 6.34
-0.400 0.400
SPHERICAL ABERRATION

ΔS
ΔM
ω= 2.47°
-0.400 0.400
ASTIGMATISM d-line
ω= 2.47°
-2.000 2.000
DISTORTION (%)

g-line
ω= 2.47°
-0.050 0.050
CHROMATIC ABERRATION d-line
g-line
Fno= 7.1
-0.400 0.400
SPHERICAL ABERRATION

ΔS
ΔM
ω= 1.77°
-0.400 0.400
ASTIGMATISM d-line
ω= 1.77°
-2.000 2.000
DISTORTION (%)

g-line
ω= 1.77°
-0.050 0.050
CHROMATIC ABERRATION

ΔS
ΔM
ω= 6.17°
ω= 5.14°
ω= 4.29°
ω= 2.86°
Fno= 6.43
ω= 0°
0.050
-0.050
ΔS
ΔM
ω= 3.17°
ω= 2.64°
ω= 2.2°
ω= 1.47°
Fno= 6.24
ω= 0°
0.050
-0.050

ZOOM LENS AND IMAGE PICKUP APPARATUS

BACKGROUND

Technical Field

One of the aspects of the embodiments relates to a zoom lens and an image pickup apparatus.

Description of Related Art

PCT International Publication No. WO 2020-105111 discloses a zoom lens that consists of, in order from the object side to the image side, first to fifth lens units having positive, negative, positive, negative, and negative refractive powers, wherein a distance between adjacent lens units changes during zooming and image stabilization is performed by the second lens unit. Japanese Patent No. 6969784 discloses a zoom lens that consists of, in order from the object side to the image side, first to eighth lens units having positive, negative, positive, positive, negative, positive, negative, and negative refractive powers, wherein image stabilization is performed by three partial lens units close to the image plane in the second lens unit.

In the zoom lens disclosed in PCT International Publication No. WO 2020-105111, the optical performance deteriorates because the second lens unit that moves during zooming and has strong refractive power is used as the image stabilizing unit. For higher magnification, the second lens unit needs higher refractive power, and consequently optical performance deteriorates due to manufacturing errors. In the zoom lens disclosed in Japanese Patent No. 6969784, the size reduction is difficult due to the large number of lenses in the second lens unit. In addition, for a further telephoto scheme, decentering aberration that occurs during image stabilization is insufficiently corrected.

SUMMARY

A zoom lens according to one aspect of the disclosure includes a plurality of lens units, the plurality of lens units consisting of, in order from an object side to an image side, a first lens unit having positive refractive power, a second lens unit having negative refractive power, and a rear group consisting of one or more lens units. A distance between adjacent lens units changes during zooming, and the second lens unit does not move for zooming. At least a part of the second lens unit moves in a direction including a component orthogonal to an optical axis during image stabilization. A lens disposed closest to an object in the second lens unit has positive refractive power. The following inequality is satisfied:

$$0.003 < D2/ft < 0.026$$

where D2 is a distance on an optical axis from a lens surface closest to an object of the second lens unit to a lens surface closest to an image plane of the second lens unit, and ft is a focal length of the zoom lens at a telephoto end. An image pickup apparatus having the above zoom lens also constitutes another aspect of the disclosure.

Further features of the disclosure will become apparent from the following description of embodiments with reference to the attached drawings.

DESCRIPTION OF THE EMBODIMENTS

Referring now to the accompanying drawings, a detailed description will be given of embodiments according to the disclosure.

A zoom lens for an image pickup apparatus is demanded to have a short overall length, small size, a high zoom ratio, and high optical performance over the entire zoom range and all object distances. In particular, the zoom lens is demanded to maintain good optical performance (image stabilizing performance) during image stabilization at the telephoto end, a reduced lens overall length and barrel diameter, and the weight of the zoom lens. In order to satisfy these demands in a positive lead type zoom lens, each element in the zoom lens is properly set. In particular, in order to secure image stabilizing performance at the telephoto end and to maintain the weight of the zoom lens, the structure, position, thickness, etc. of the image stabilizing lens unit are properly set.

The zoom lens according to each example disclosed herein includes a plurality of lens units. The plurality of lens units consist of, in order from the object side to the image side, a first lens unit L1 having positive refractive power, a second lens unit L2 having negative refractive power, and a rear group consisting of one or more lens units (L3 to L7). A distance between adjacent lens units changes during zooming, and the second lens unit L2 does not move for zooming. In each example, the whole or part of the second lens unit L2 (at least part of the second lens unit L2) serves as an image stabilizing unit that is moved (decentered) in a direction including a component orthogonal to the optical axis OA during image stabilization (so as to correct image blur).

Figure 1:
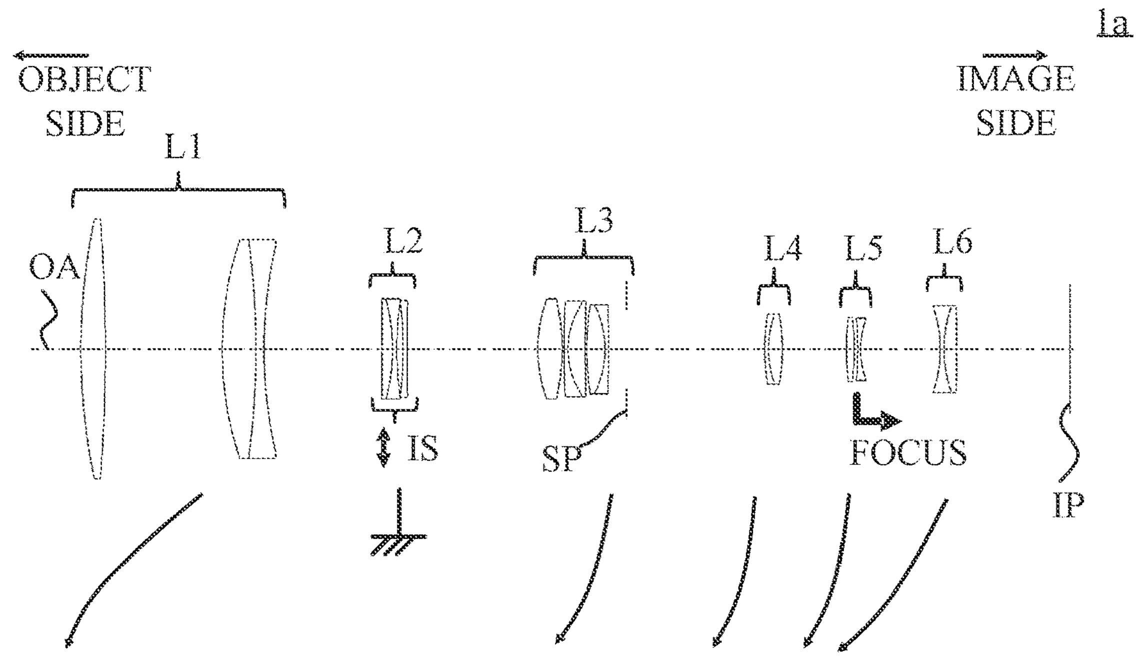
FIG. 1 is a sectional view of a zoom lens according to Example 1 at a wide-angle end.
Figure 2A:
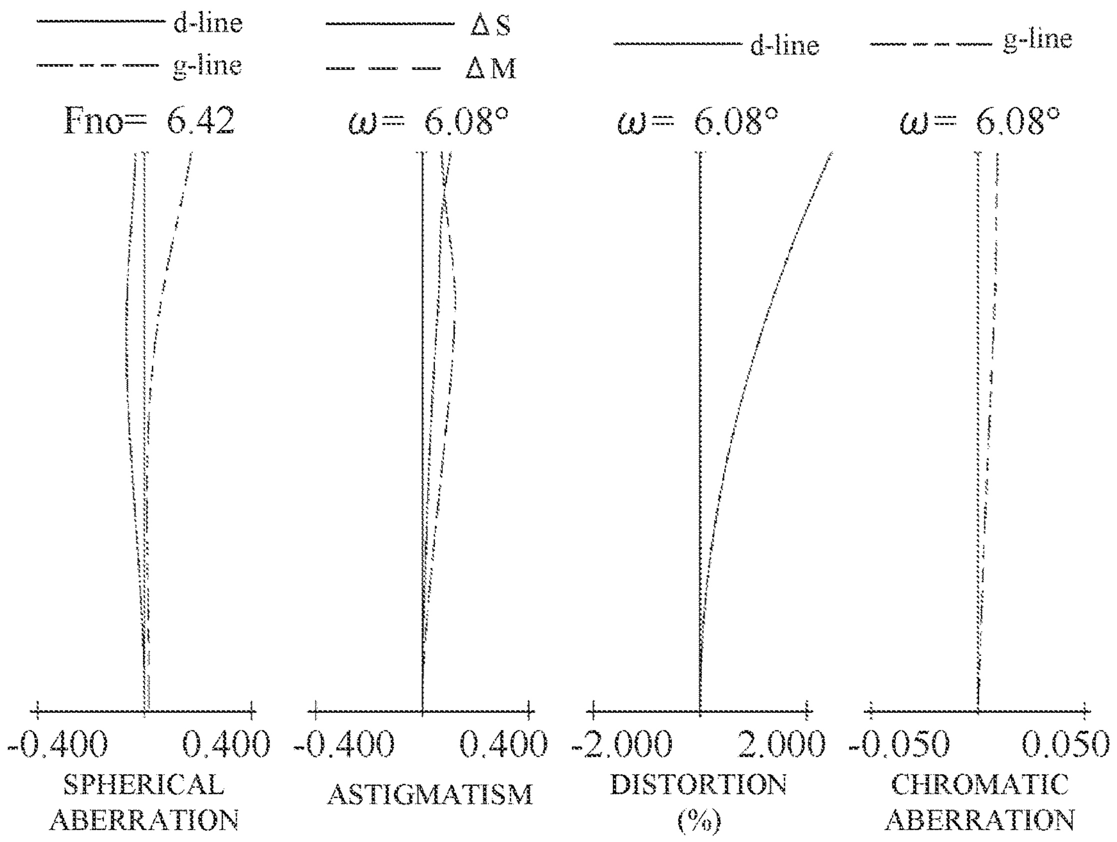
FIGS. 2A, 2B, and 2C are longitudinal aberration diagrams of the zoom lens according to Example 1 at the wide-angle end, an intermediate (middle) zoom position, and a telephoto end, respectively.
Figure 2B:
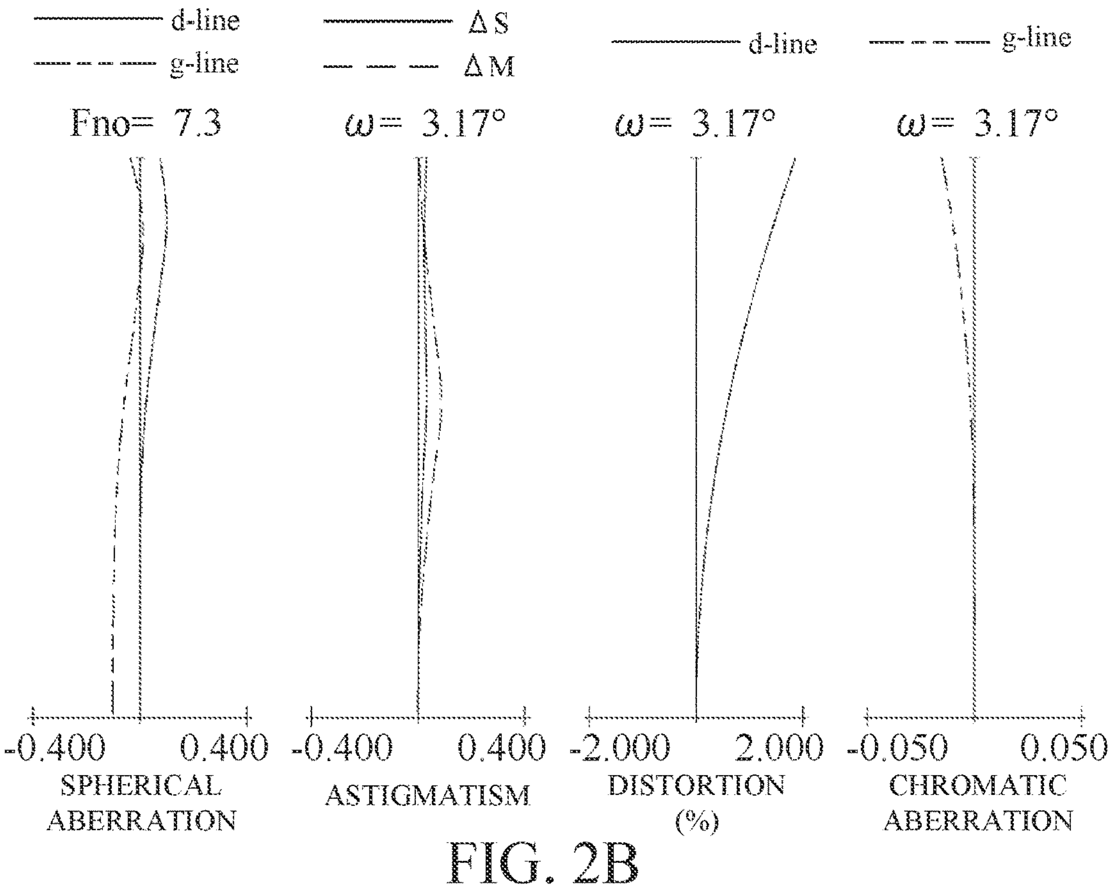
Figure 2C:
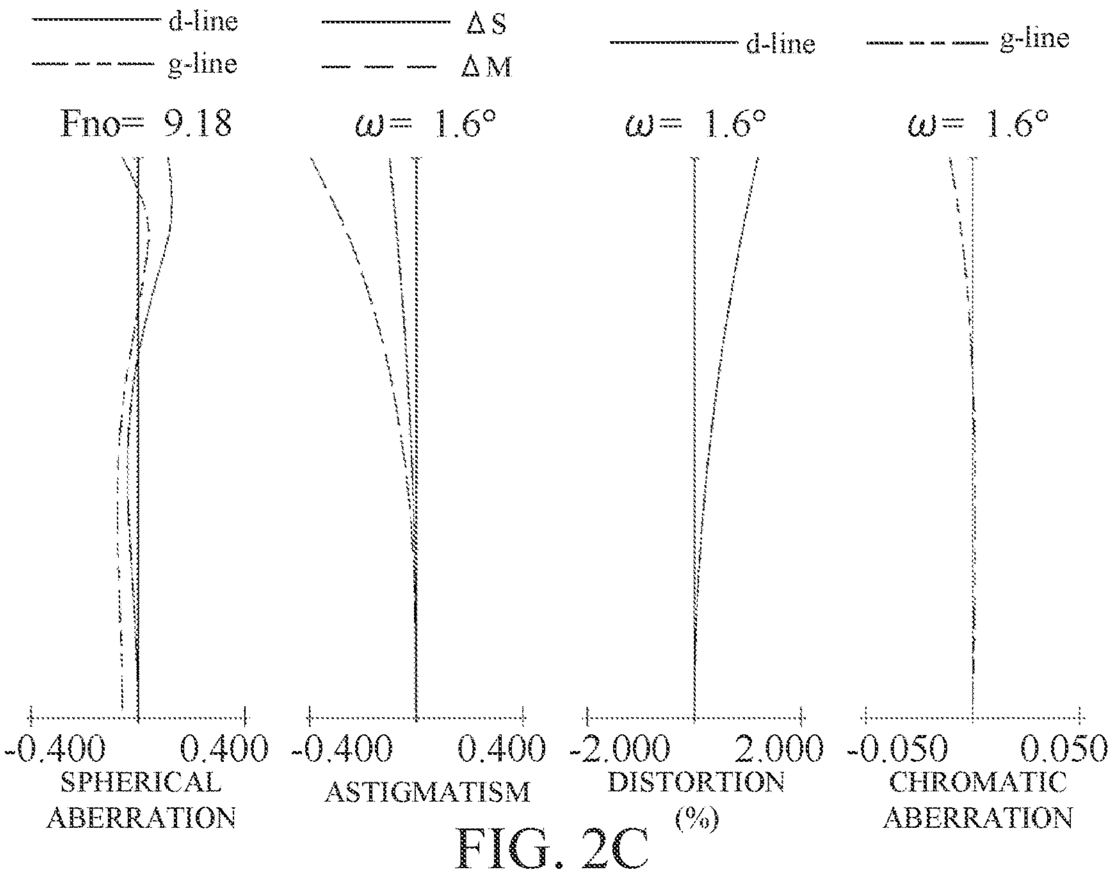
Figure 3A:
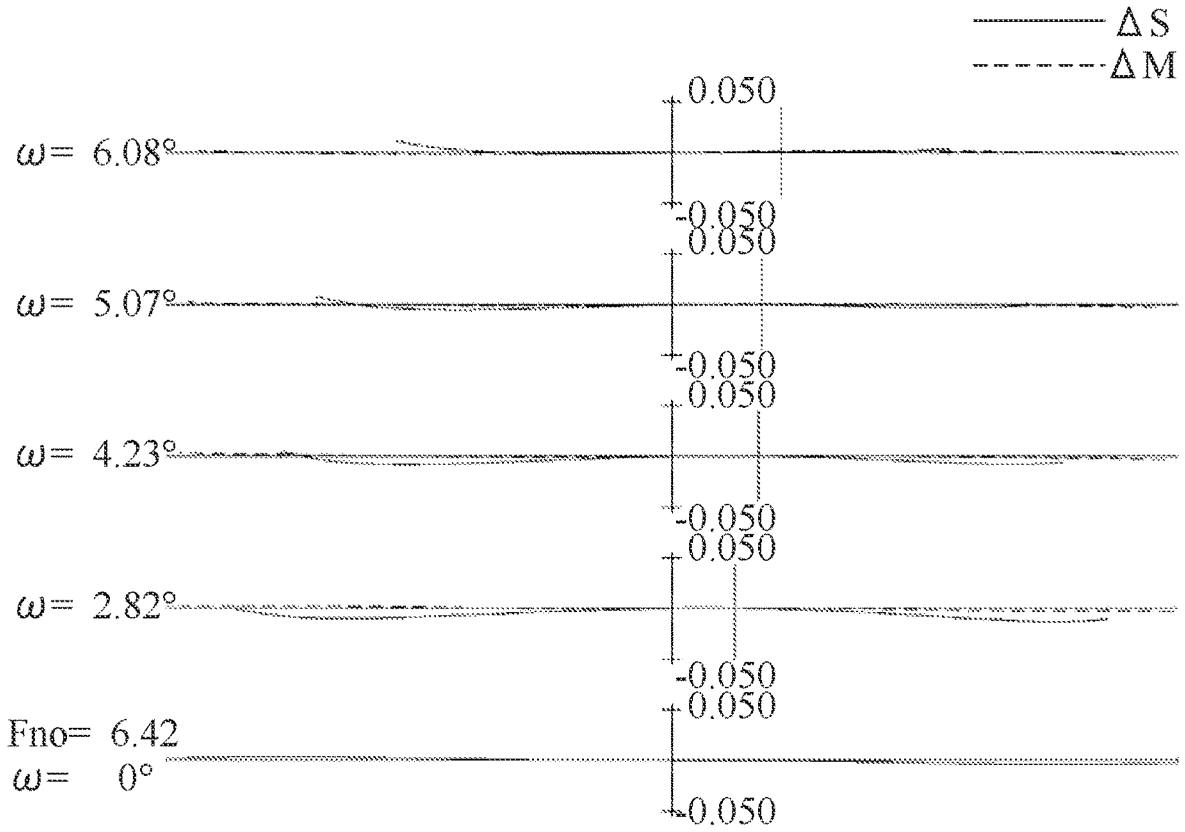
FIGS. 3A, 3B, and 3C are lateral aberration diagrams of the zoom lens according to Example 1 at the wide-angle end, the intermediate zoom position, and the telephoto end, respectively.
Figure 3B:
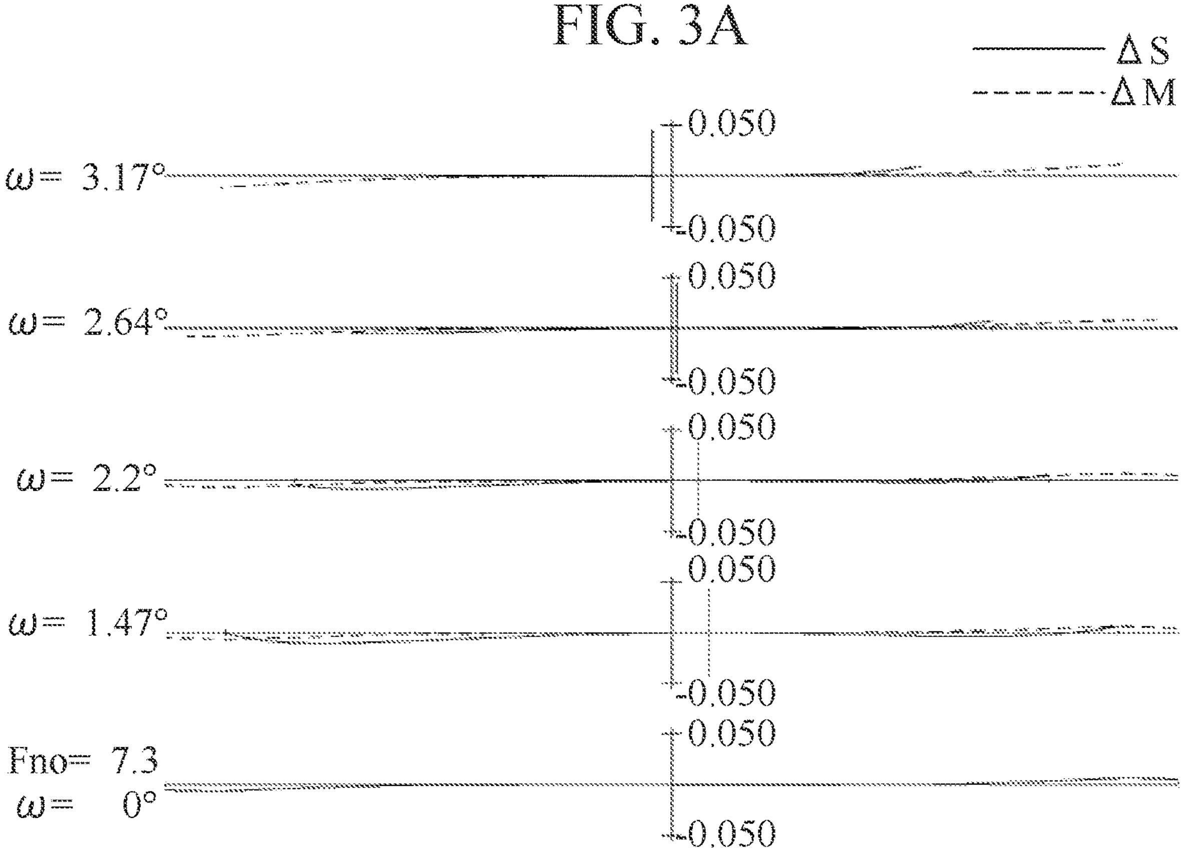
Figure 3C:
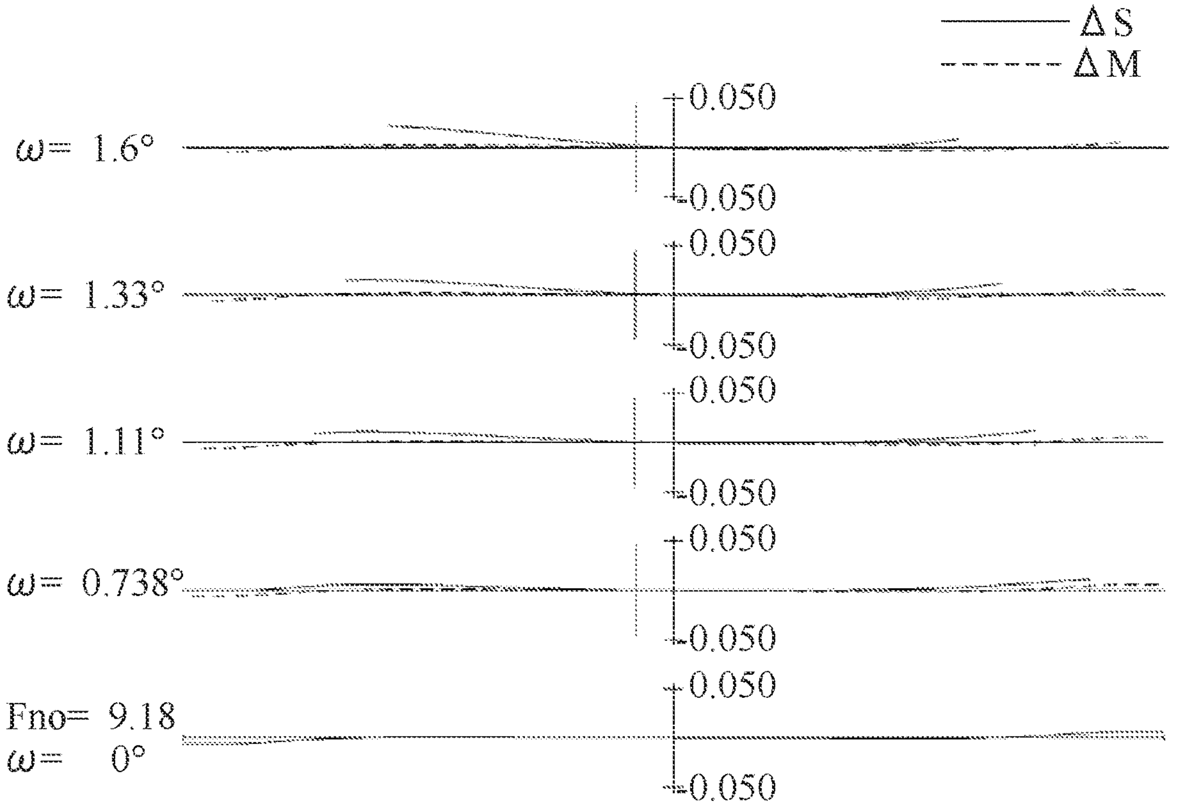
Figure 4A:
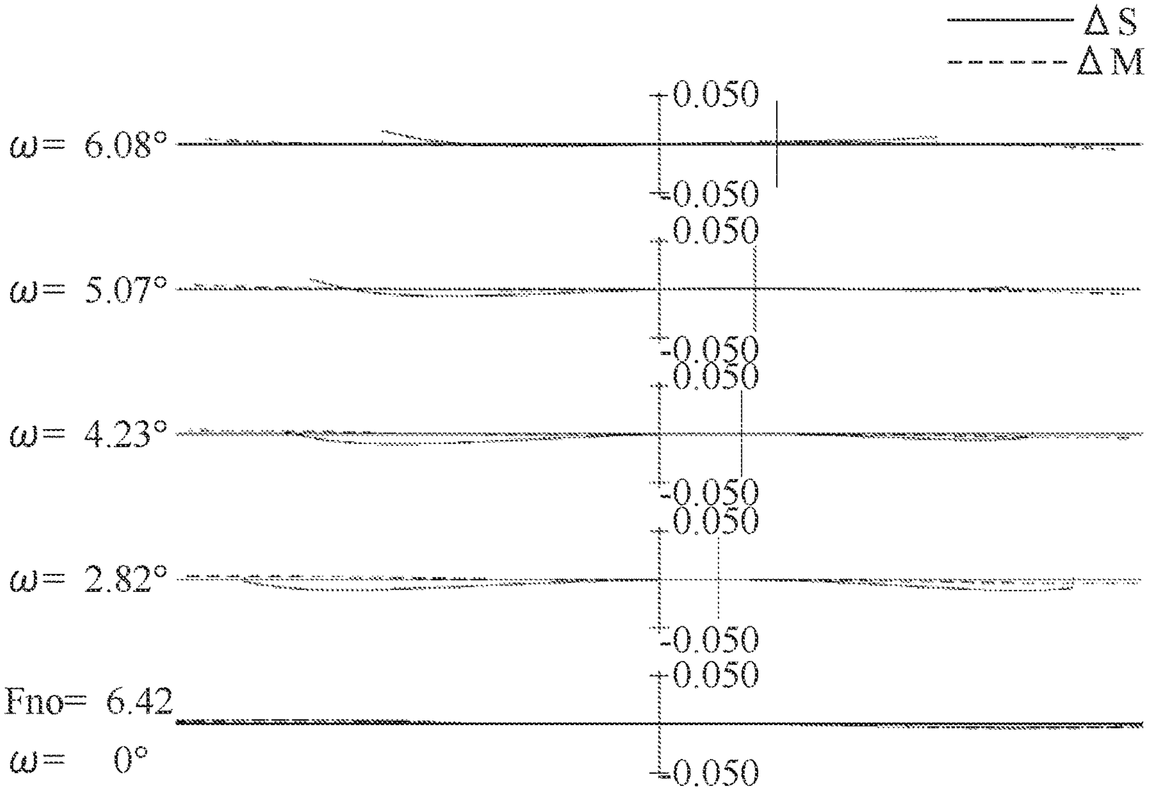
FIGS. 4A, 4B, and 4C are lateral aberration diagrams of the zoom lens according to Example 1 at the wide-angle end, the intermediate zoom position, and the telephoto end, respectively, after image stabilization by 0.3 degrees.
Figure 4B:
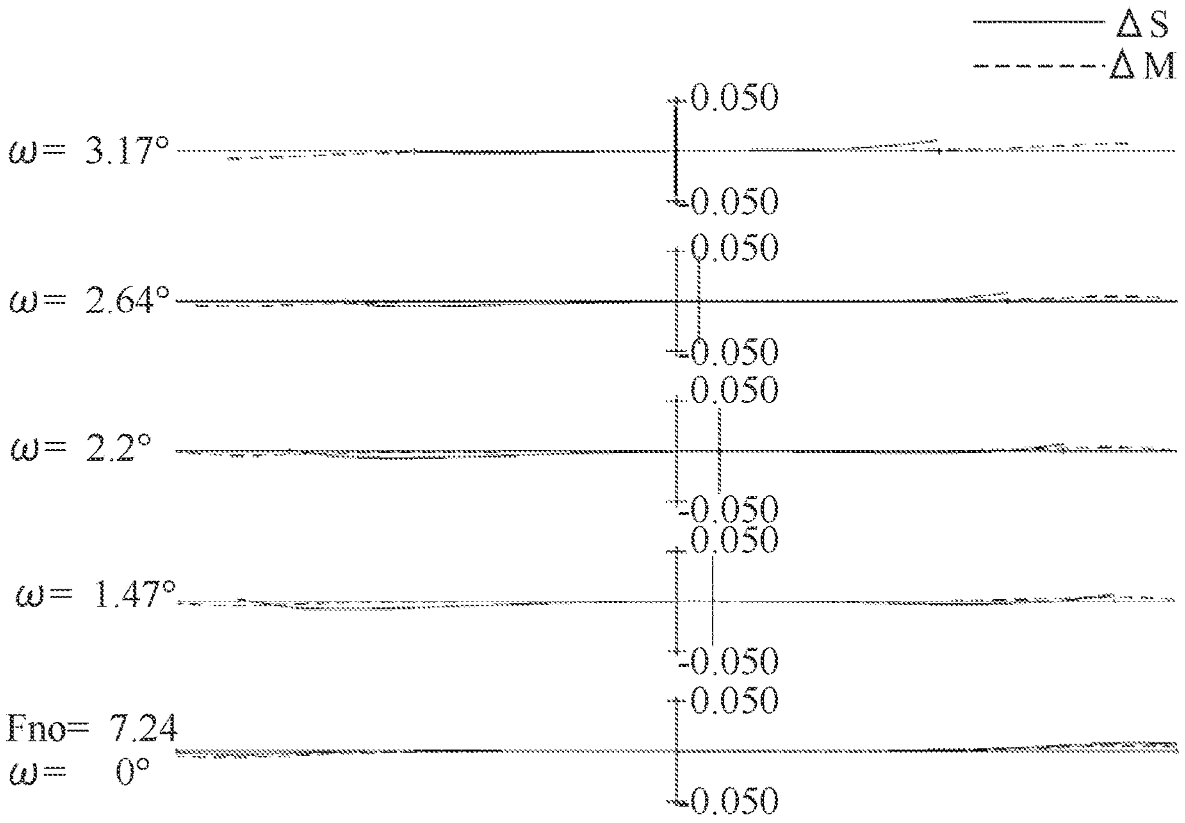
Figure 4C:
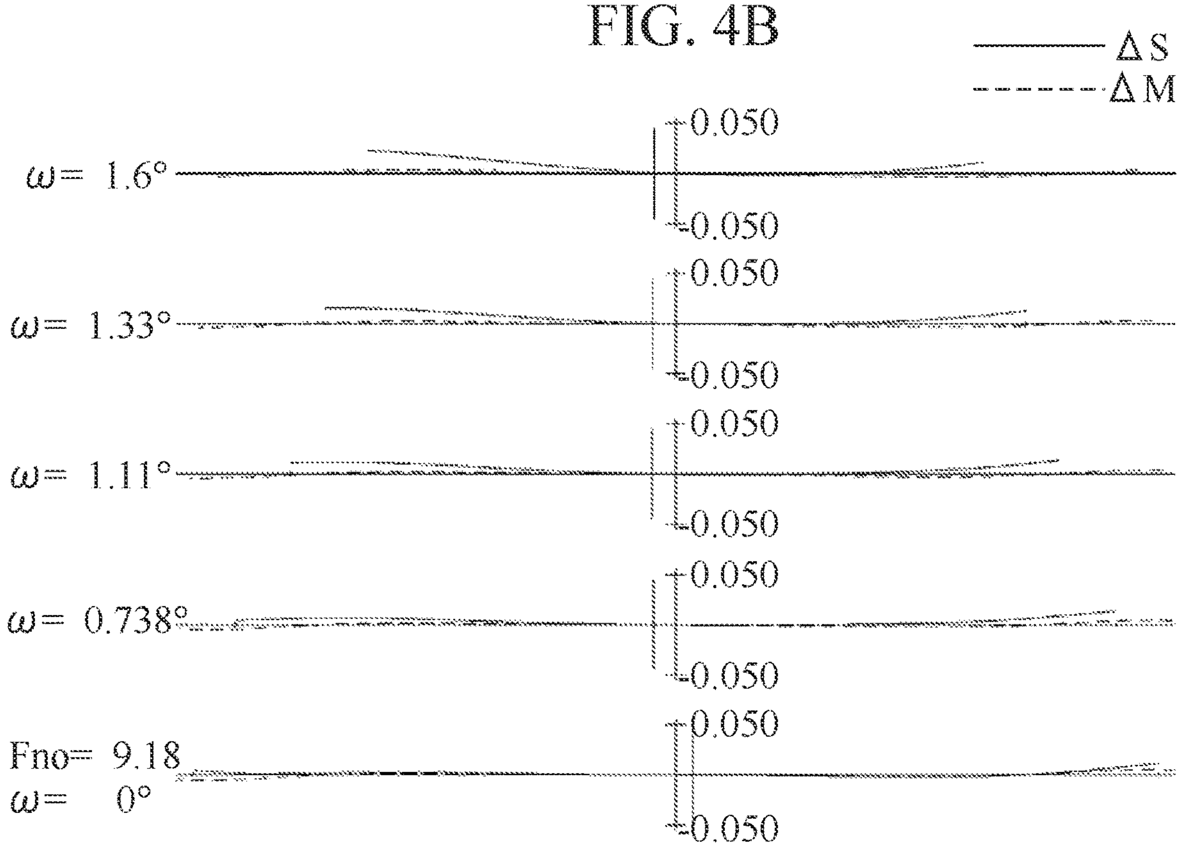

FIG. 1 is a sectional view of a zoom lens 1*a* according to Example 1. FIGS. 2A, 2B, and 2C are longitudinal aberration diagrams of the zoom lens 1*a* at the wide-angle end (FIG. 2A), the intermediate zoom position (FIG. 2B), and the telephoto end (FIG. 2C), respectively. FIGS. 3A, 3B, and 3C are lateral aberration diagrams of the zoom lens 1*a* at the wide-angle end, the intermediate zoom position, and the telephoto end, respectively. FIGS. 4A, 4B, and 4C are lateral aberration diagrams of the zoom lens 1*a* after image stabilization by 0.3 degrees at the wide-angle end, the intermediate zoom position, and the telephoto end, respectively. The zoom lens 1*a* has a zoom ratio of 3.8, and an F-number of about 6.4 to 9.2.

Figure 5:
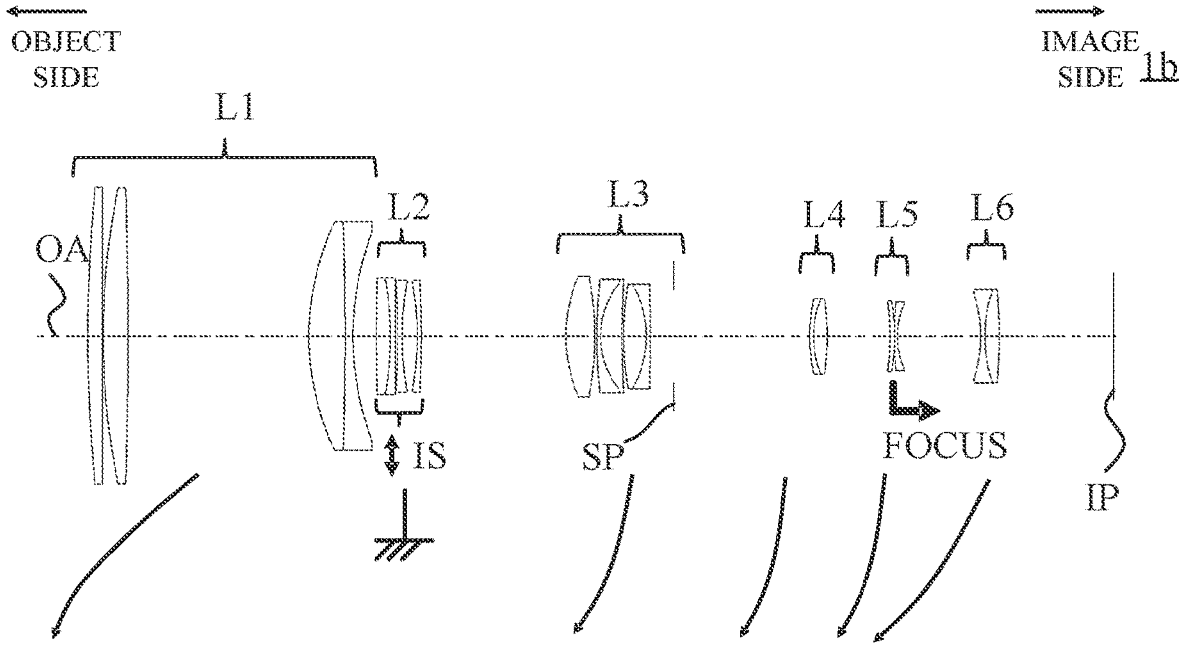
FIG. 5 is a sectional view of a zoom lens according to Example 2 at a wide-angle end.
Figure 6A:
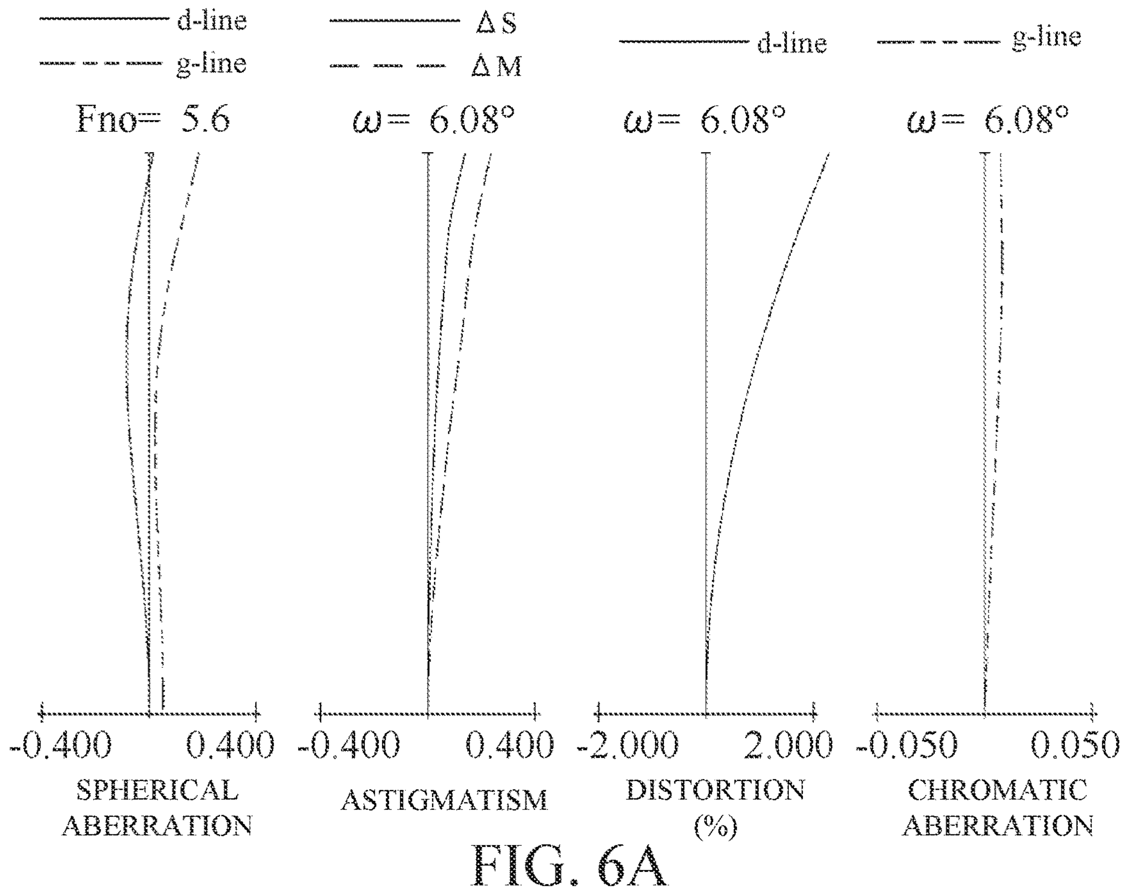
FIGS. 6A, 6B, and 6C are longitudinal aberration diagrams of the zoom lens according to Example 2 at the wide-angle end, an intermediate zoom position, and a telephoto end, respectively.
Figure 6B:
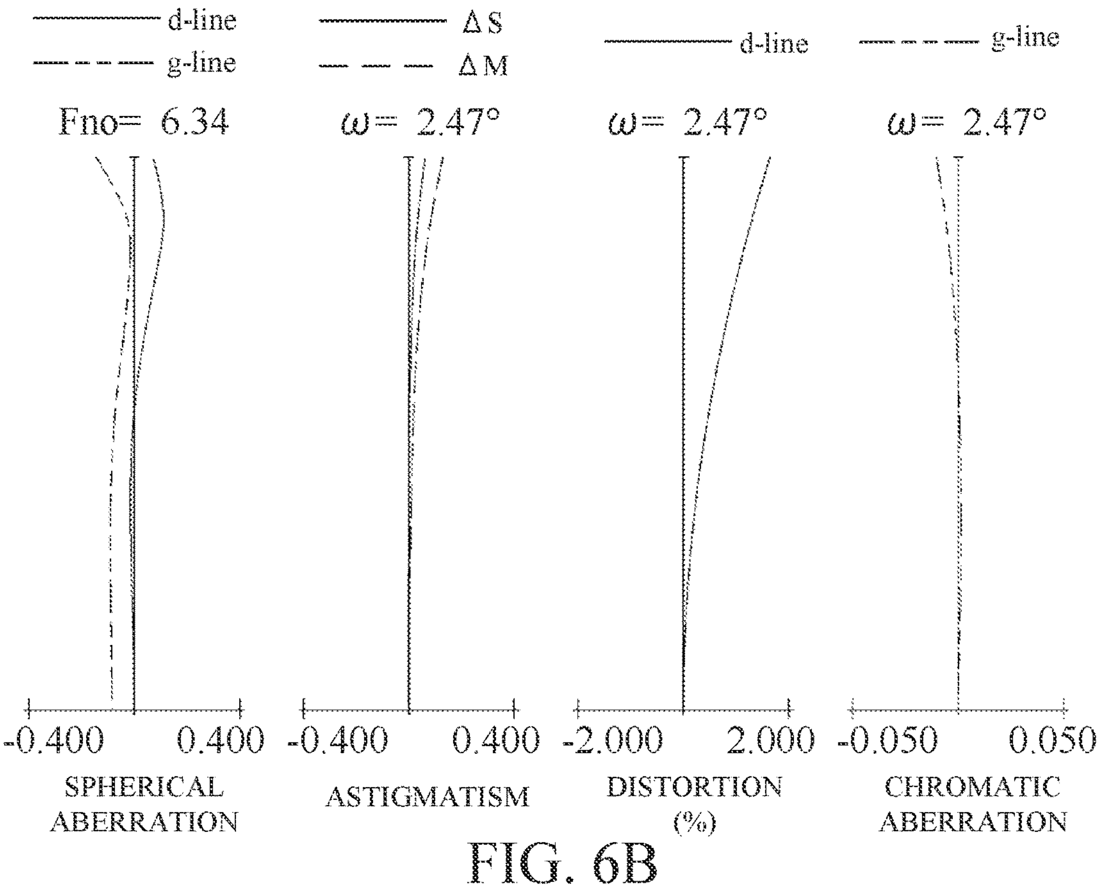
Figure 6C:
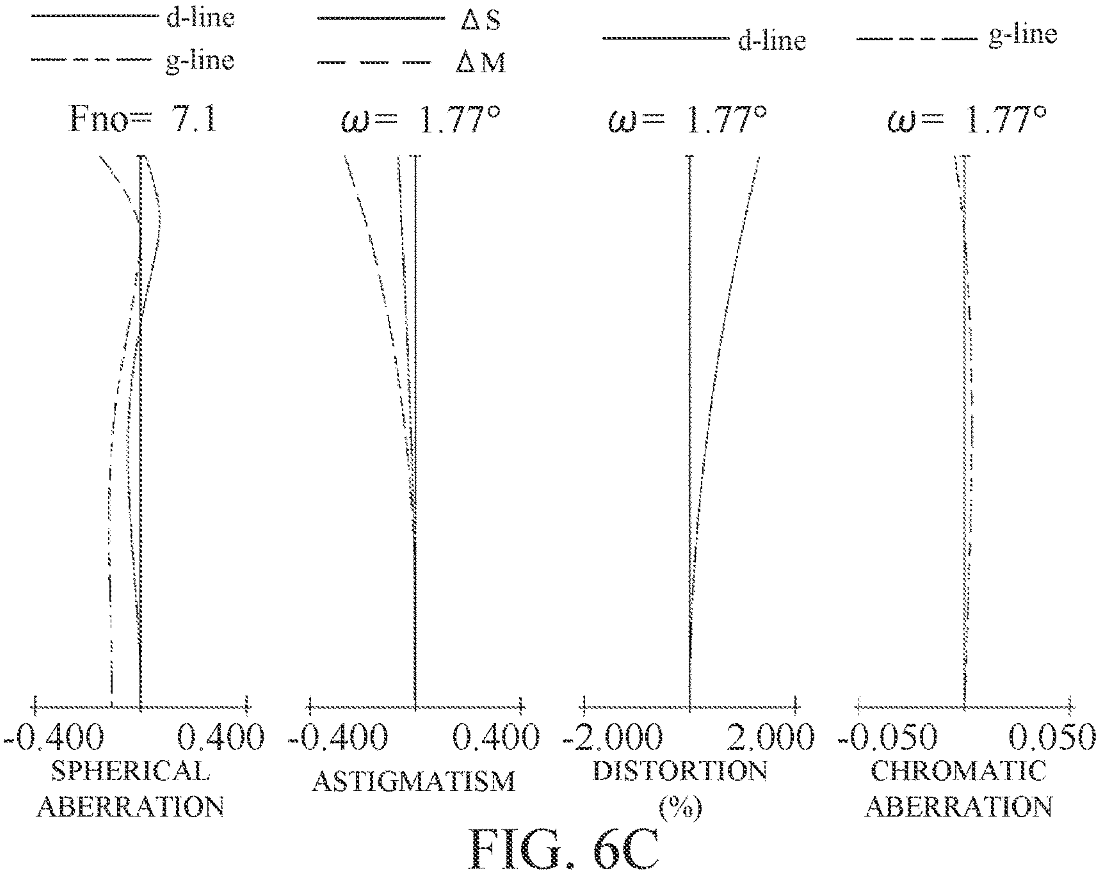
Figure 7A:
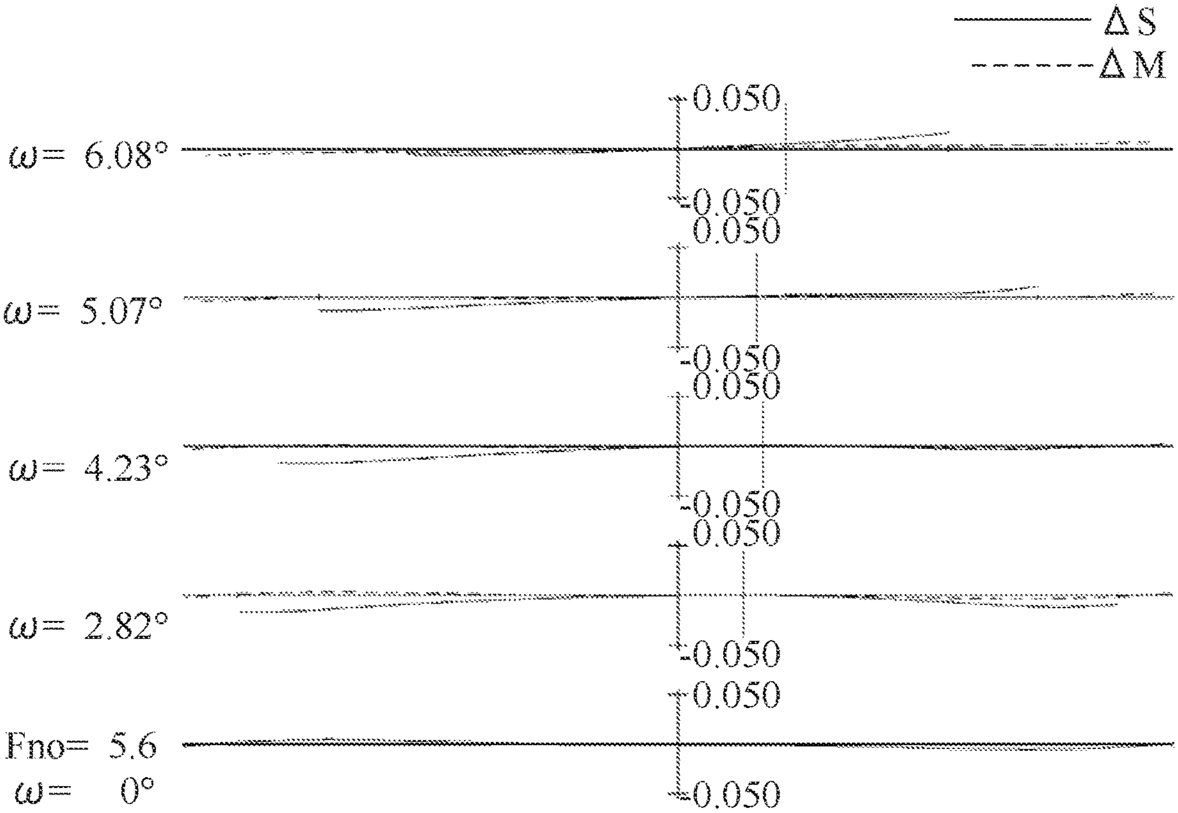
FIGS. 7A, 7B, and 7C are lateral aberration diagrams of the zoom lens according to Example 2 at the wide-angle end, the intermediate zoom position, and the telephoto end, respectively.
Figure 7B:
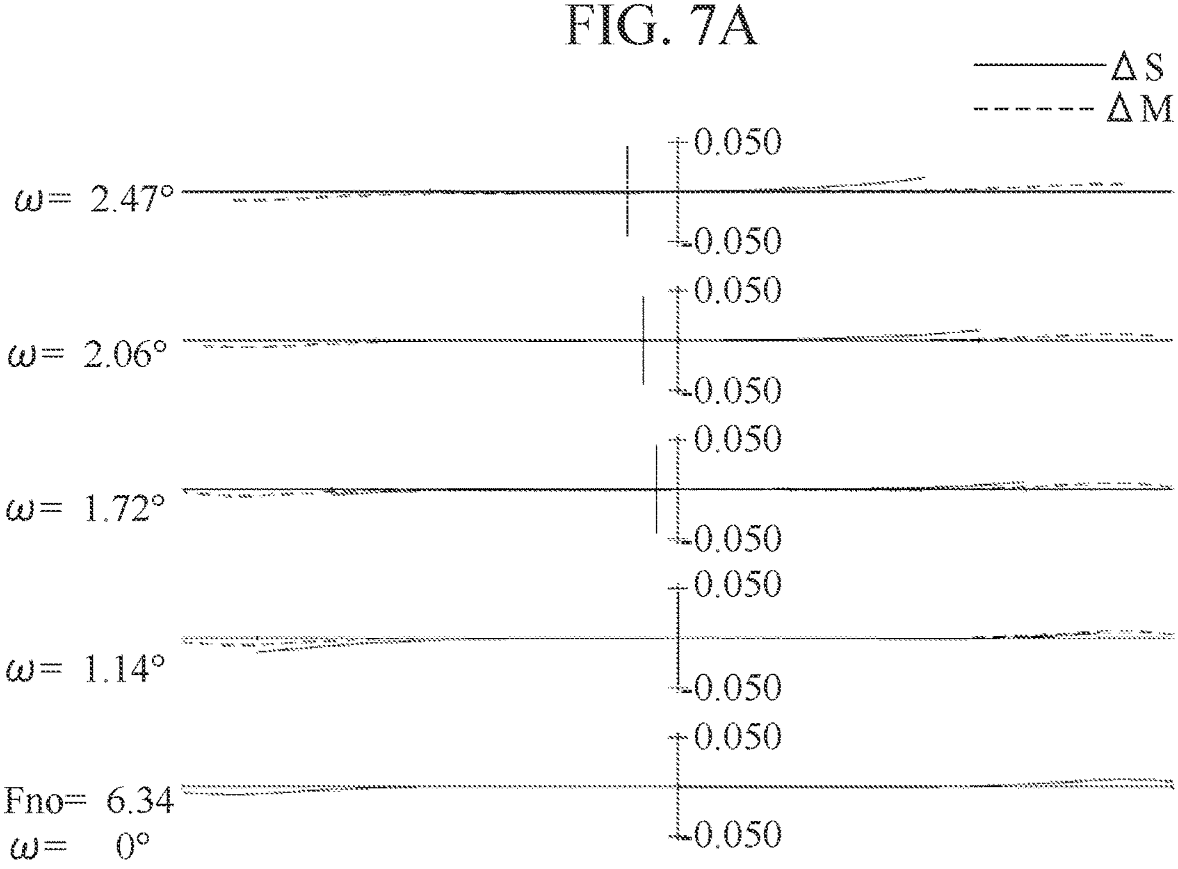
Figure 7C:
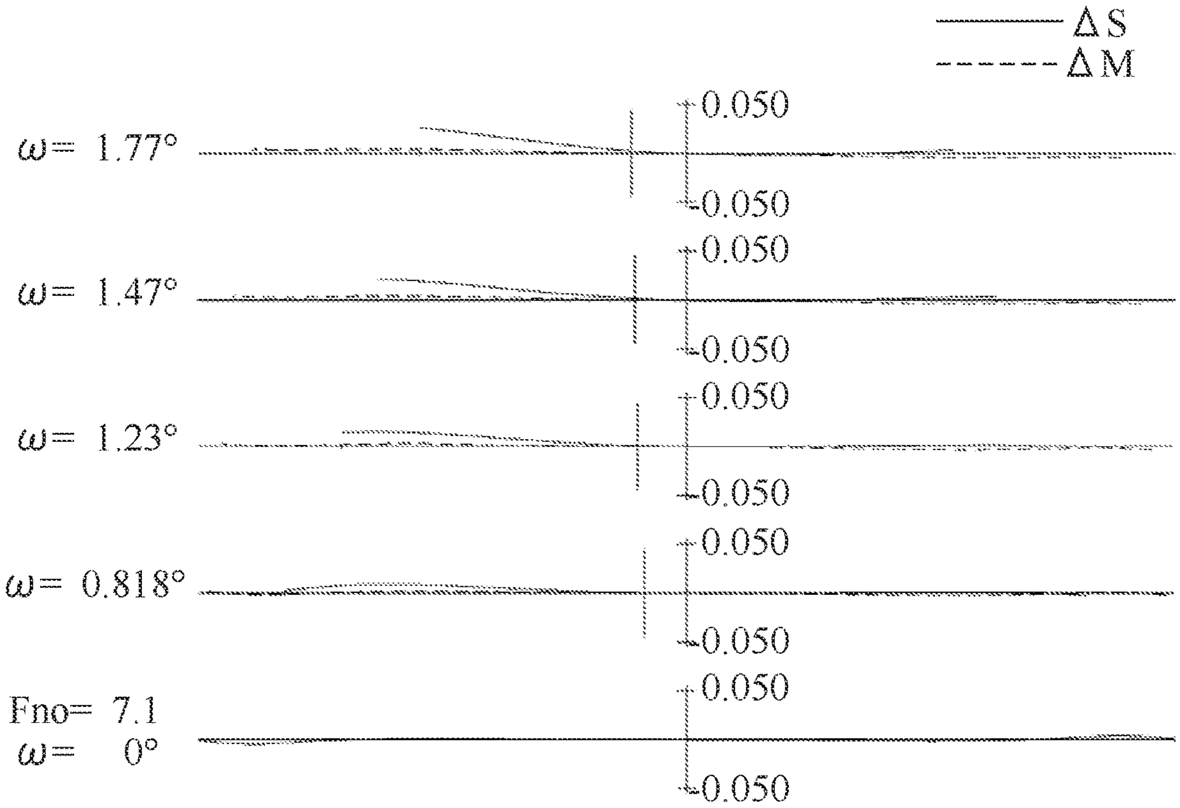
Figure 8A:
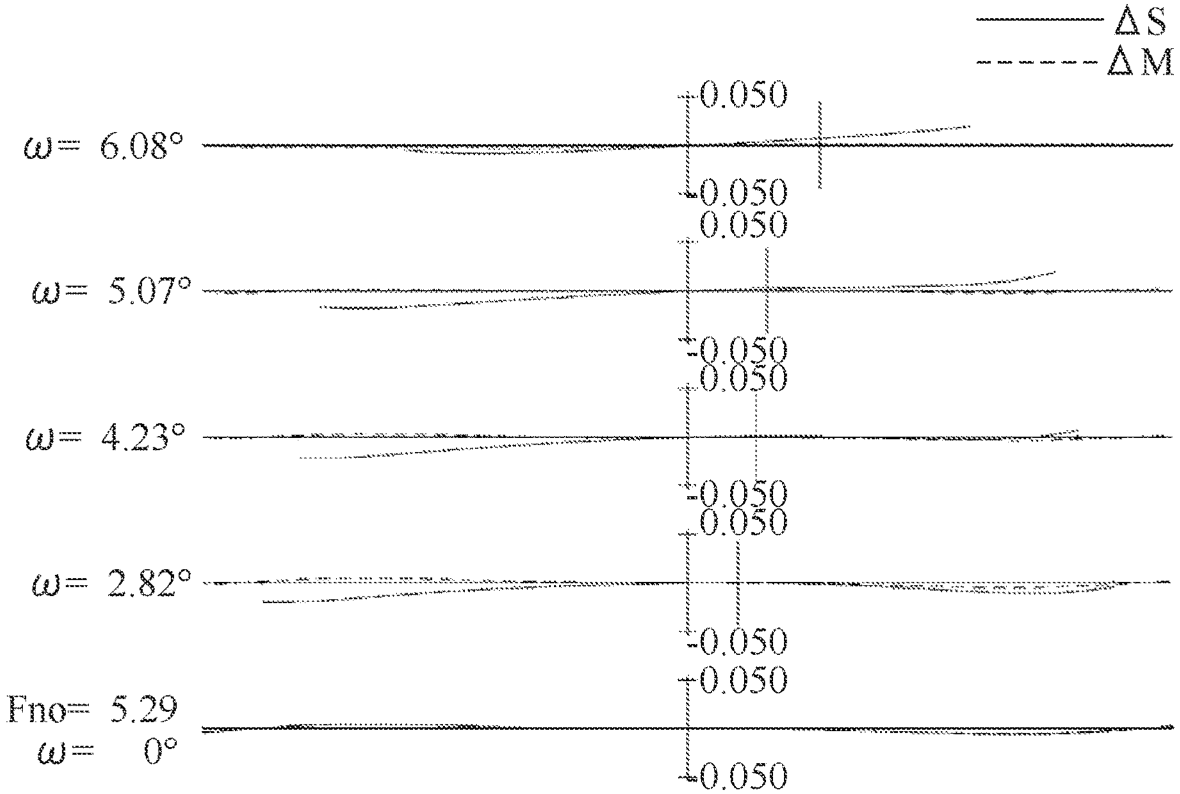
FIGS. 8A, 8B, and 8C are lateral aberration diagrams of the zoom lens according to Example 2 at the wide-angle end, the intermediate zoom position, and the telephoto end, respectively, after image stabilization by 0.3 degrees.
Figure 8B:
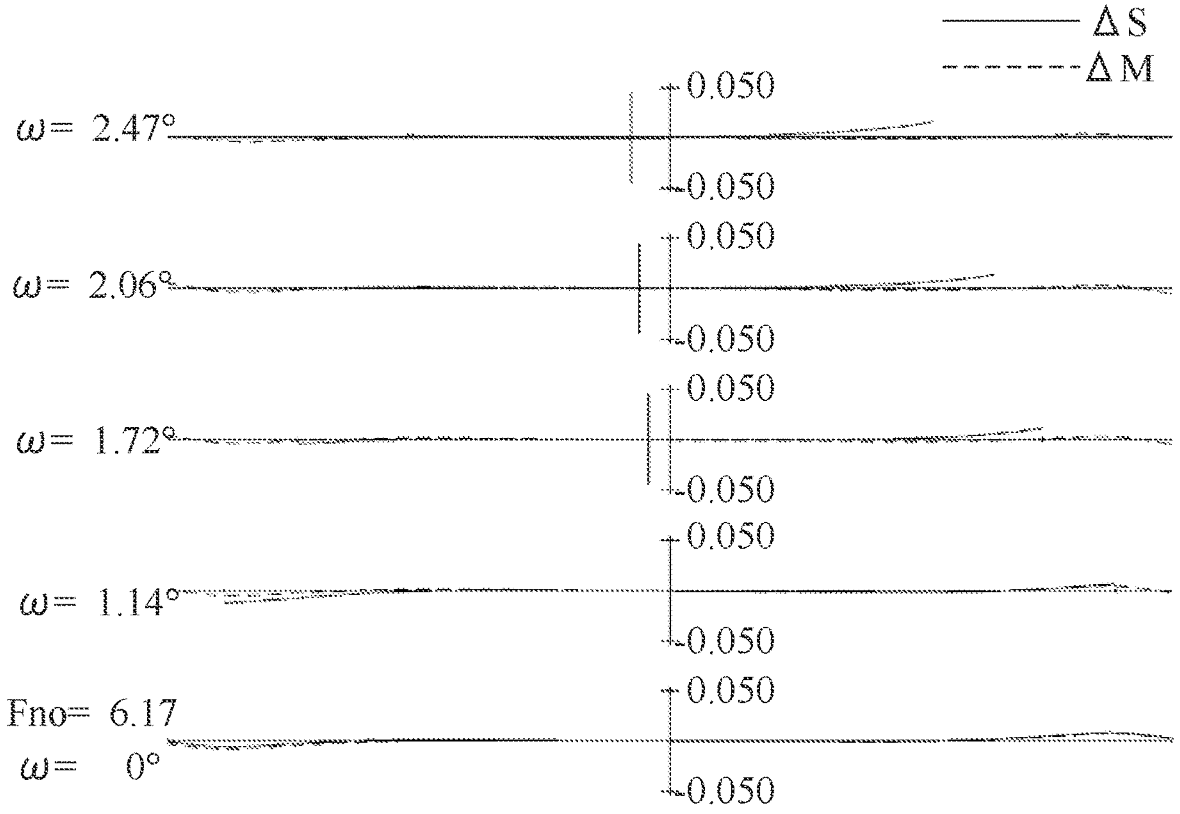
Figure 8C:
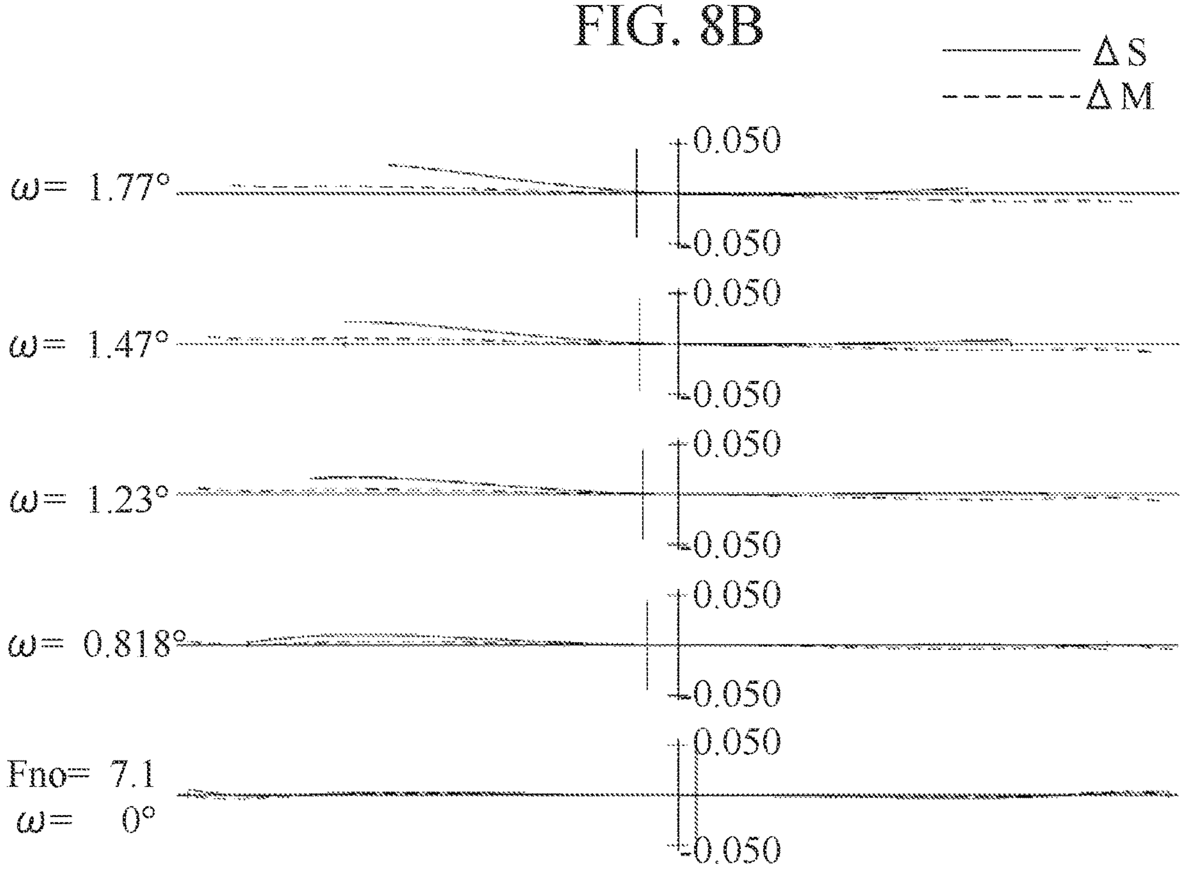

FIG. 5 is a sectional view of a zoom lens 1*b* according to Example 2. FIGS. 6A, 6B, and 6C are longitudinal aberration diagrams of the zoom lens 1*b* at the wide-angle end, the intermediate zoom position, and the telephoto end, respectively. FIGS. 7A, 7B, and 7C are lateral aberration diagrams of the zoom lens 1*b* at the wide-angle end, the intermediate zoom position, and the telephoto end, respectively. FIGS. 8A, 8B, and 8C are lateral aberration diagrams of the zoom lens 1*b* after image stabilization by 0.3 degrees at the wide-angle end, the intermediate zoom position, and the telephoto end, respectively. The zoom lens 1*b* is a zoom lens with a zoom ratio of 3.5 and an F-number of about 5.6 to 7.1.

Figure 9:
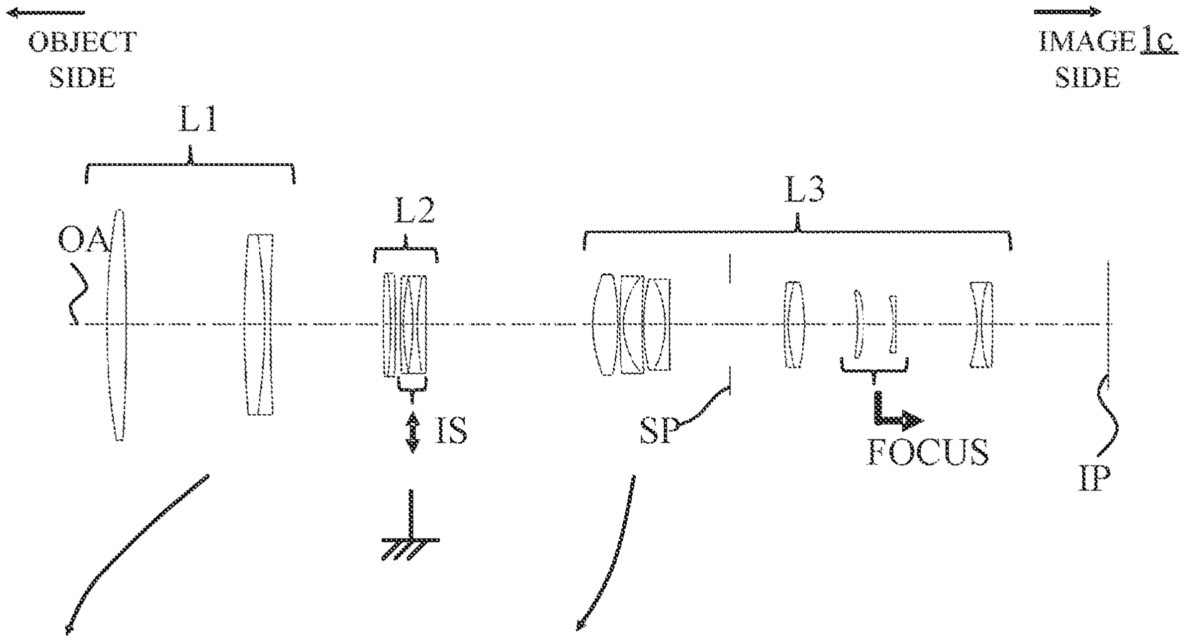
FIG. 9 is a sectional view of a zoom lens according to Example 3 at a wide-angle end.
Figure 10A:
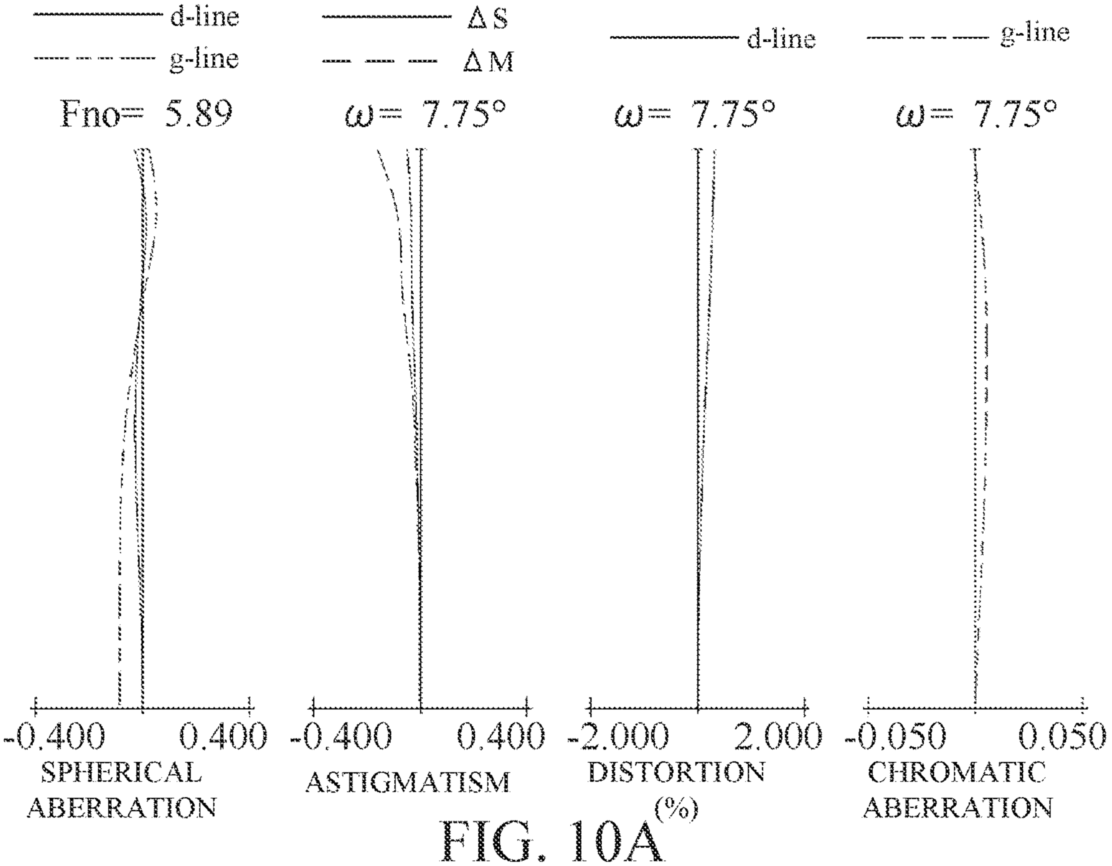
FIGS. 10A, 10B, and 10C are longitudinal aberration diagrams of the zoom lens according to Example 3 at the wide-angle end, an intermediate zoom position, and a telephoto end, respectively.
Figure 10B:
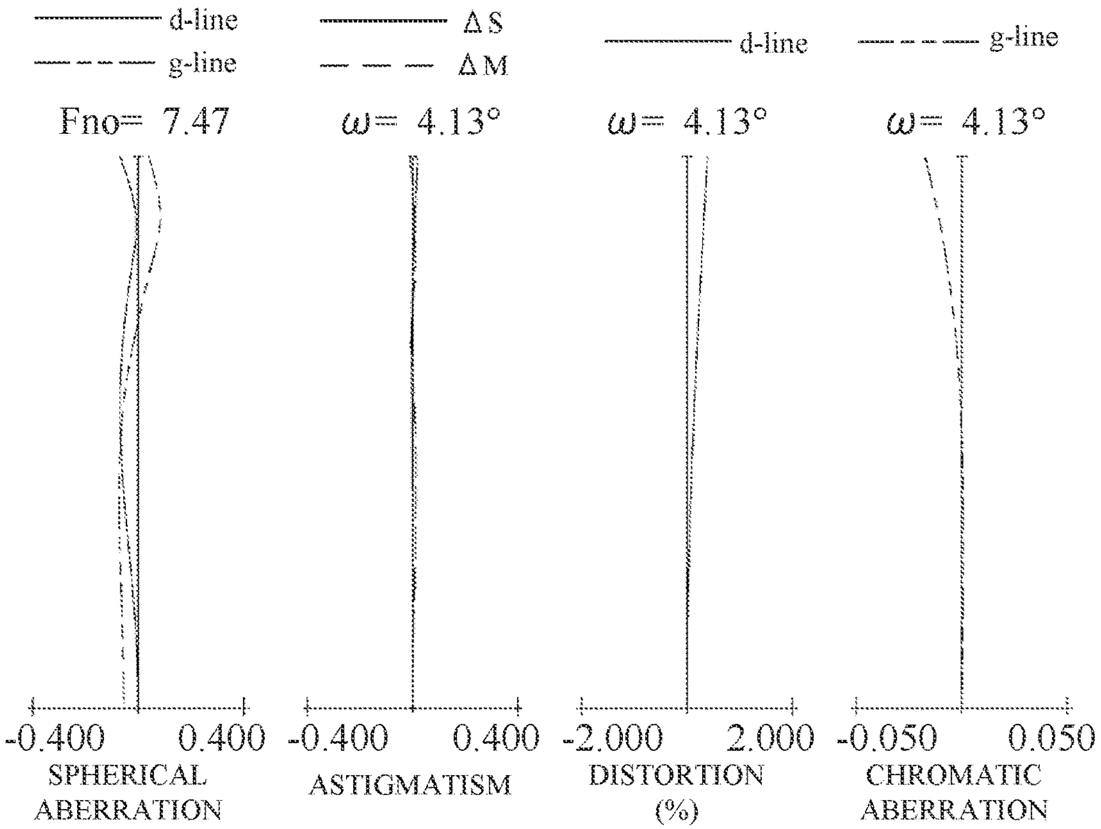
Figure 10C:
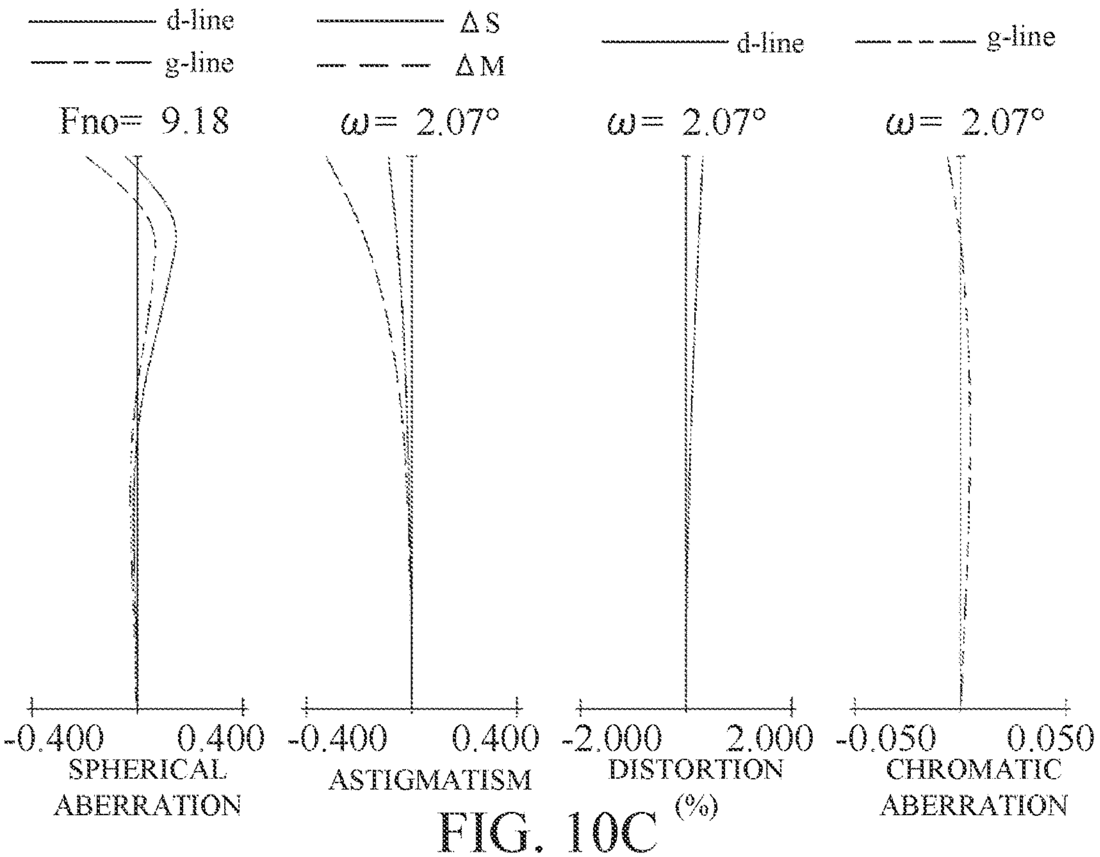
Figure 11A:
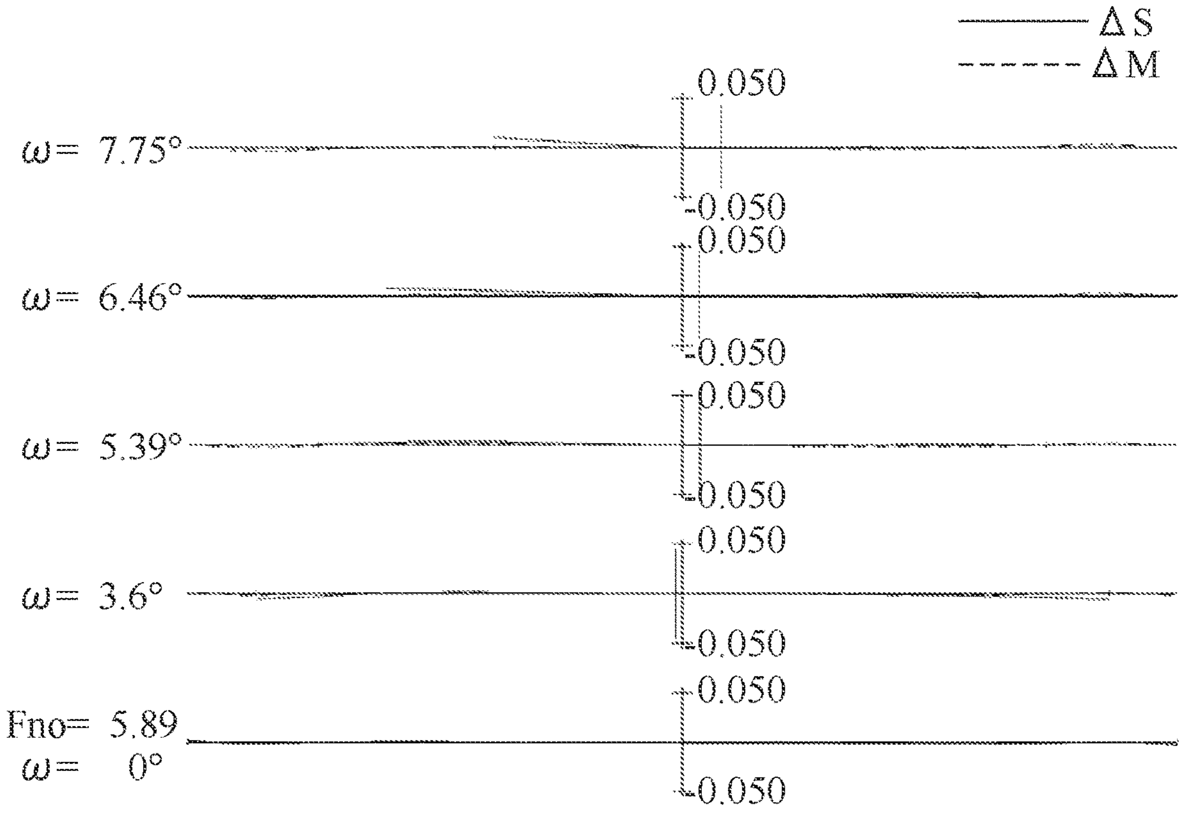
FIGS. 11A, 11B, and 11C are lateral aberration diagrams of the zoom lens according to Example 3 at the wide-angle end, the intermediate zoom position, and the telephoto end, respectively.
Figure 11B:
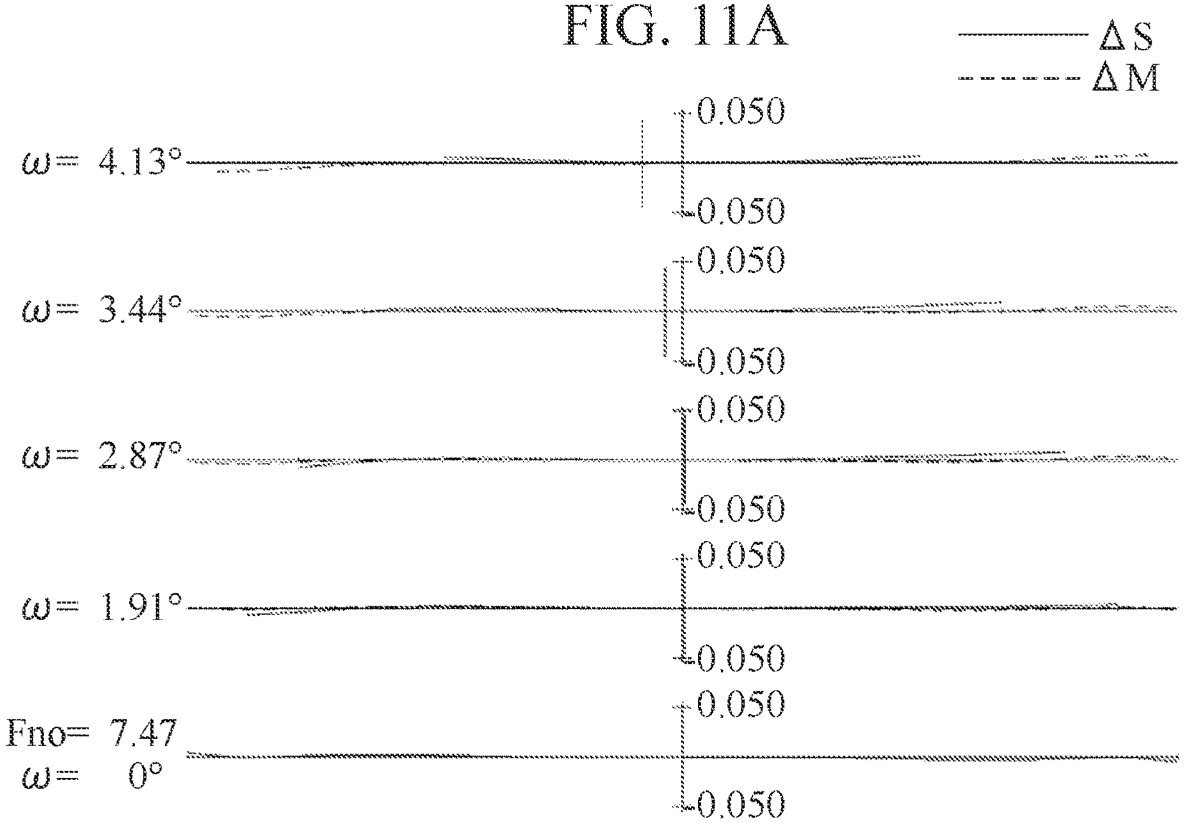
Figure 11C:
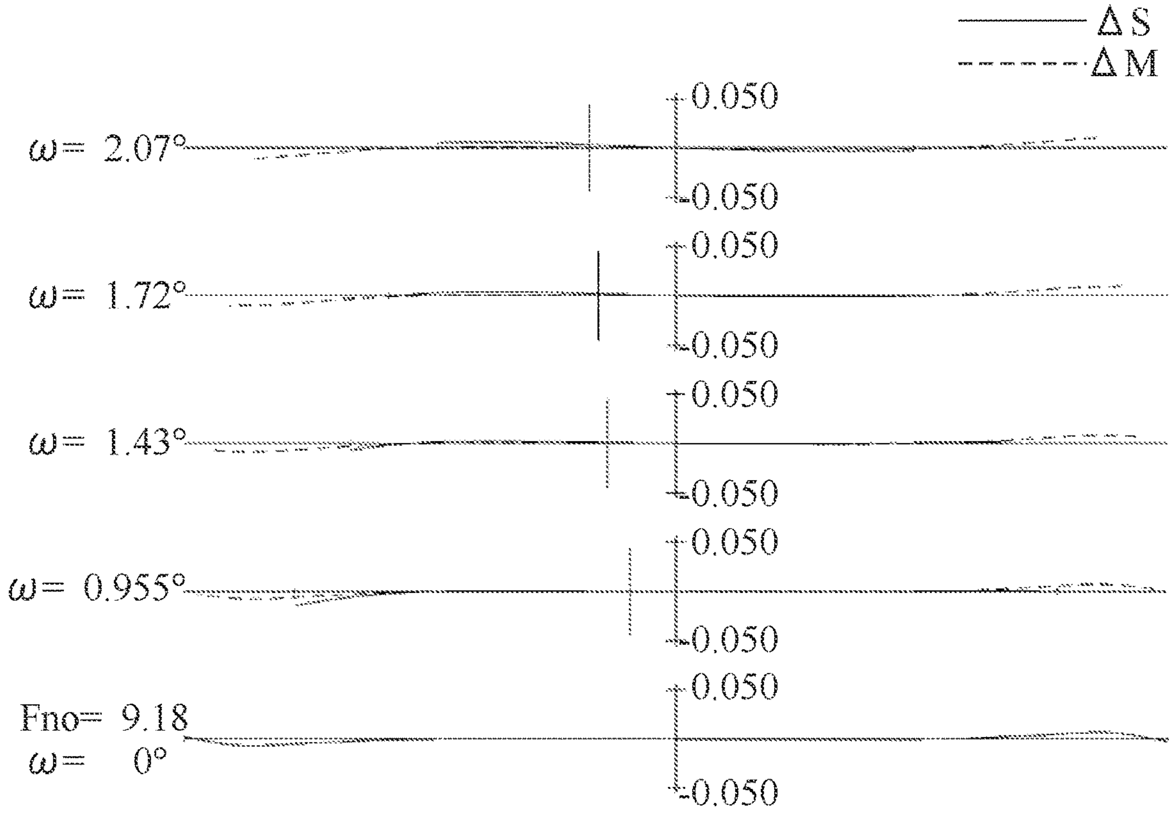
Figure 12A:
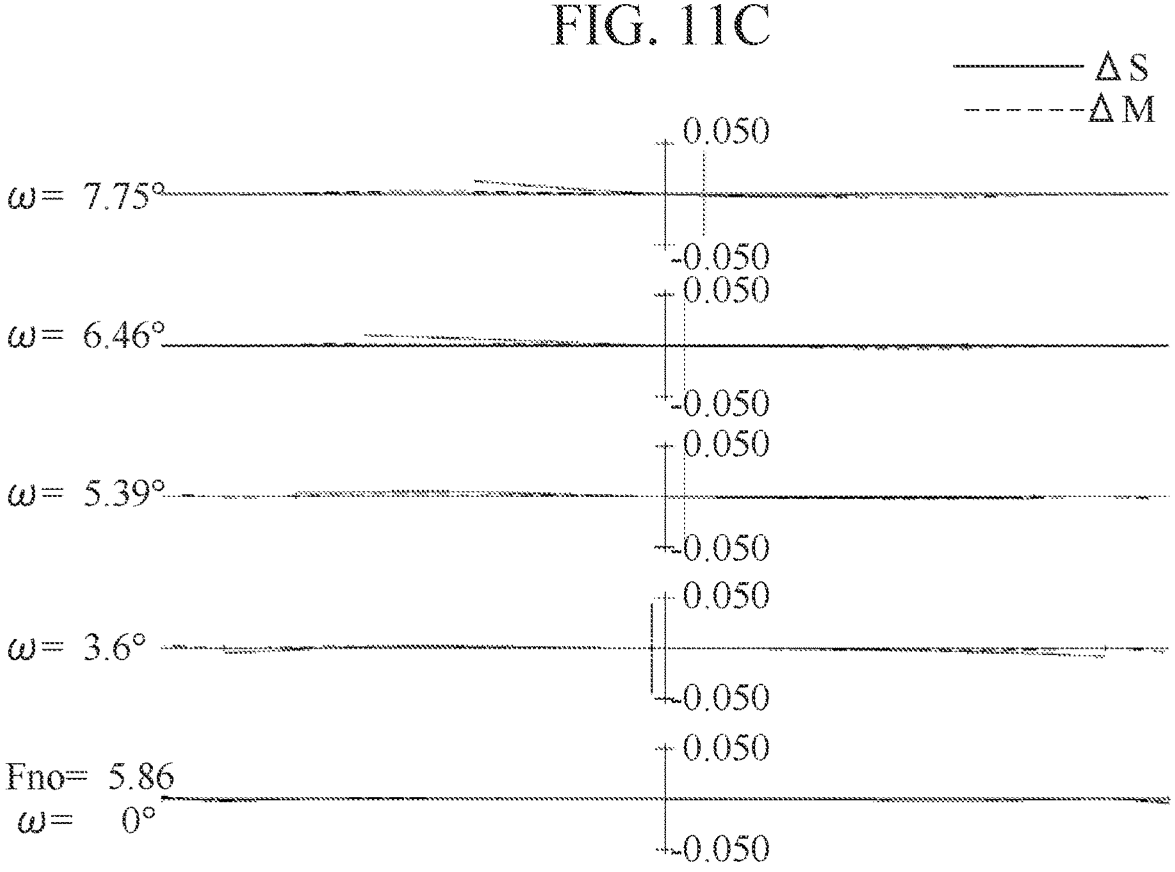
FIGS. 12A, 12B, and 12C are lateral aberration diagrams of the zoom lens according to Example 3 at the wide-angle end, the intermediate zoom position, and the telephoto end, respectively. After image stabilization by 0.3 degrees.
Figure 12B:
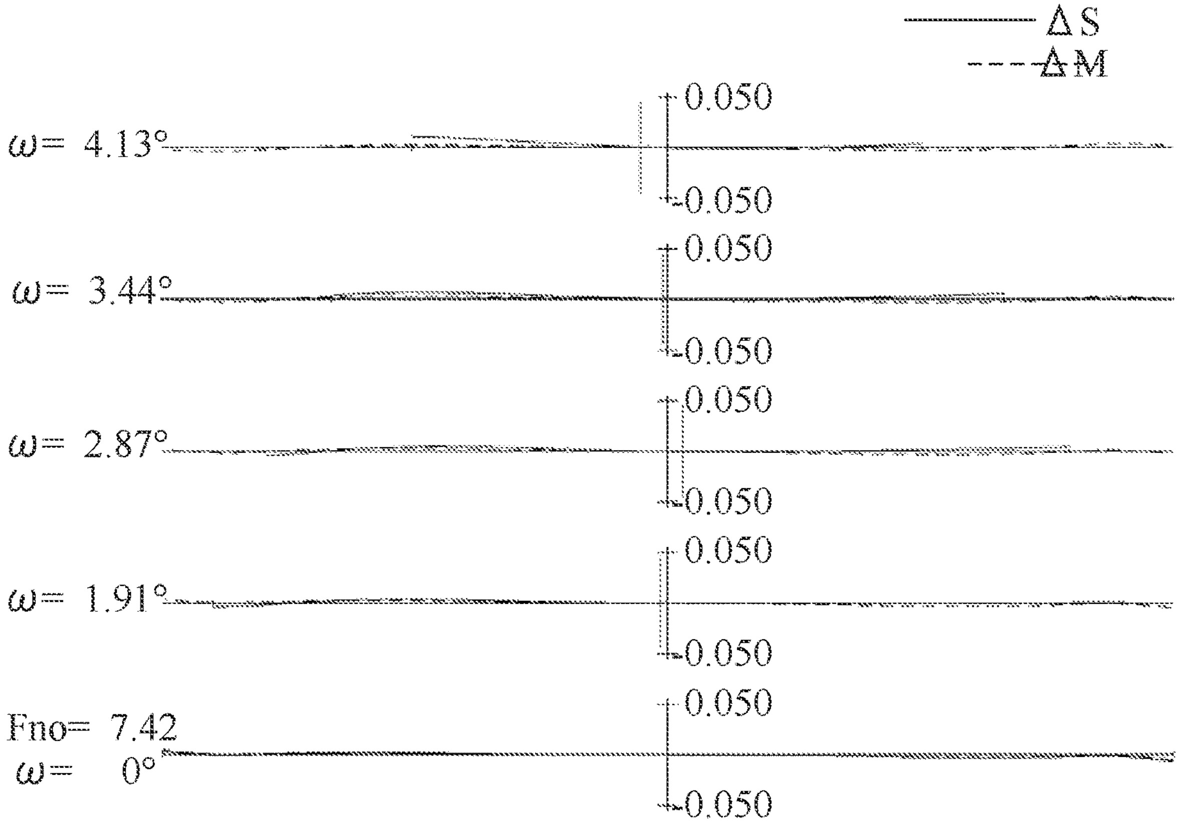
Figure 12C:
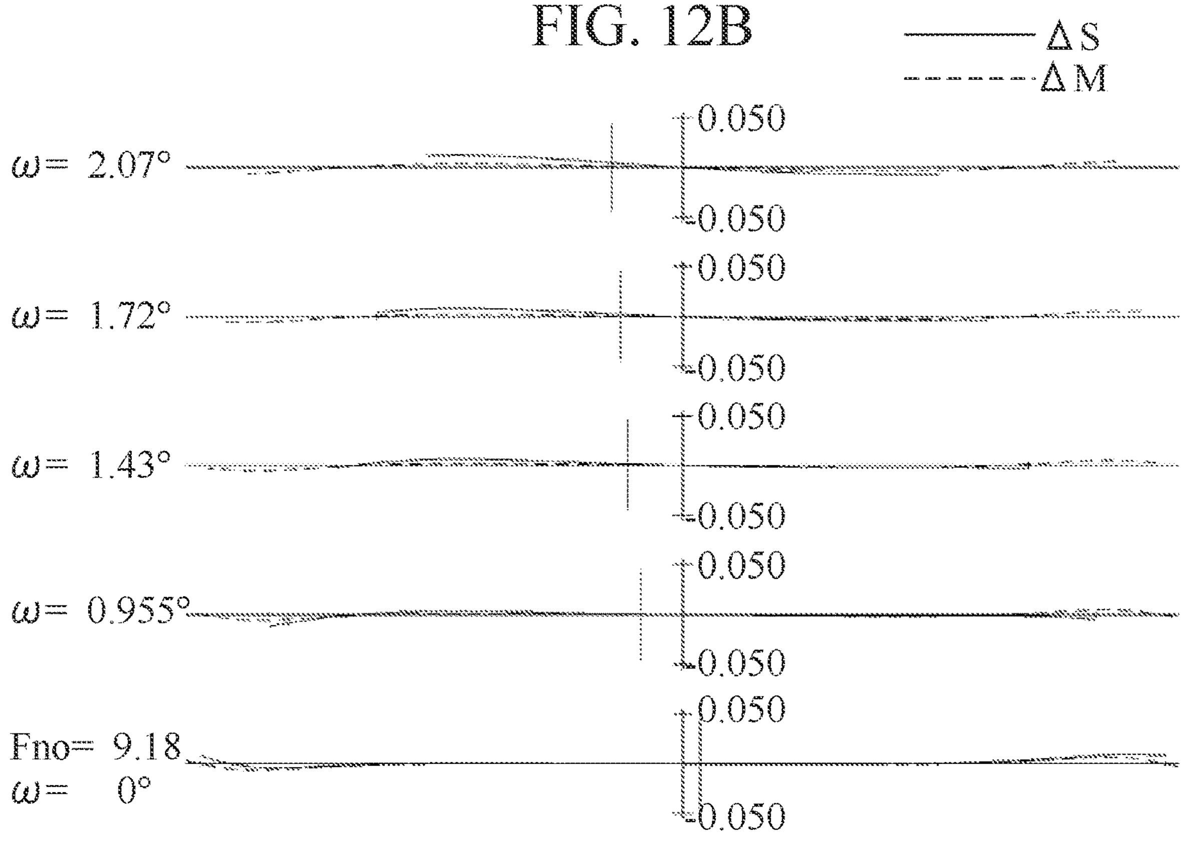

FIG. 9 is a sectional view of a zoom lens 1*c* according to Example 3. FIGS. 10A, 10B, and 10C are longitudinal aberration diagrams of the zoom lens 1*c* at the wide-angle end, the intermediate zoom position, and the telephoto end, respectively. FIGS. 11A, 11B, and 11C are lateral aberration diagrams of the zoom lens 1*c* at the wide-angle end, the intermediate zoom position, and the telephoto end, respectively. FIGS. 12A, 12B, and 12C are lateral aberration diagrams of the zoom lens 1*c* after image stabilization by 0.3 degrees at the wide-angle end, the intermediate zoom position, and the telephoto end, respectively. The zoom lens 1*c* has a zoom ratio of 3.8 and an F-number of about 5.9 to 9.2.

Figure 13:
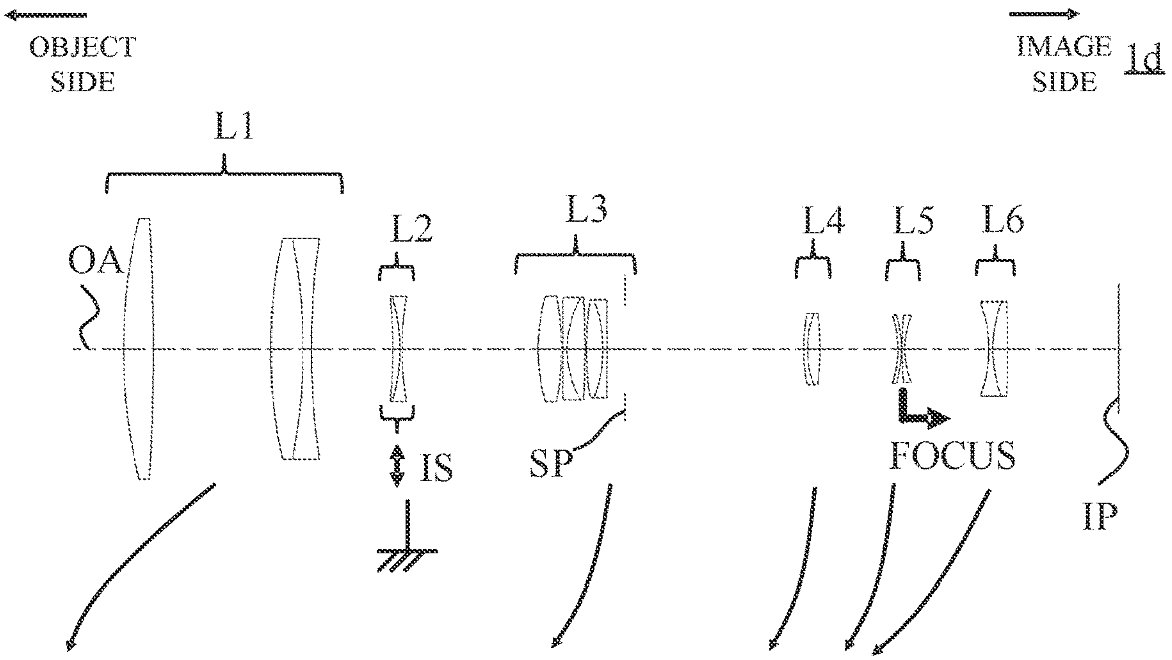
FIG. 13 is a sectional view of a zoom lens according to Example 4 at a wide-angle end.
Figure 14A:
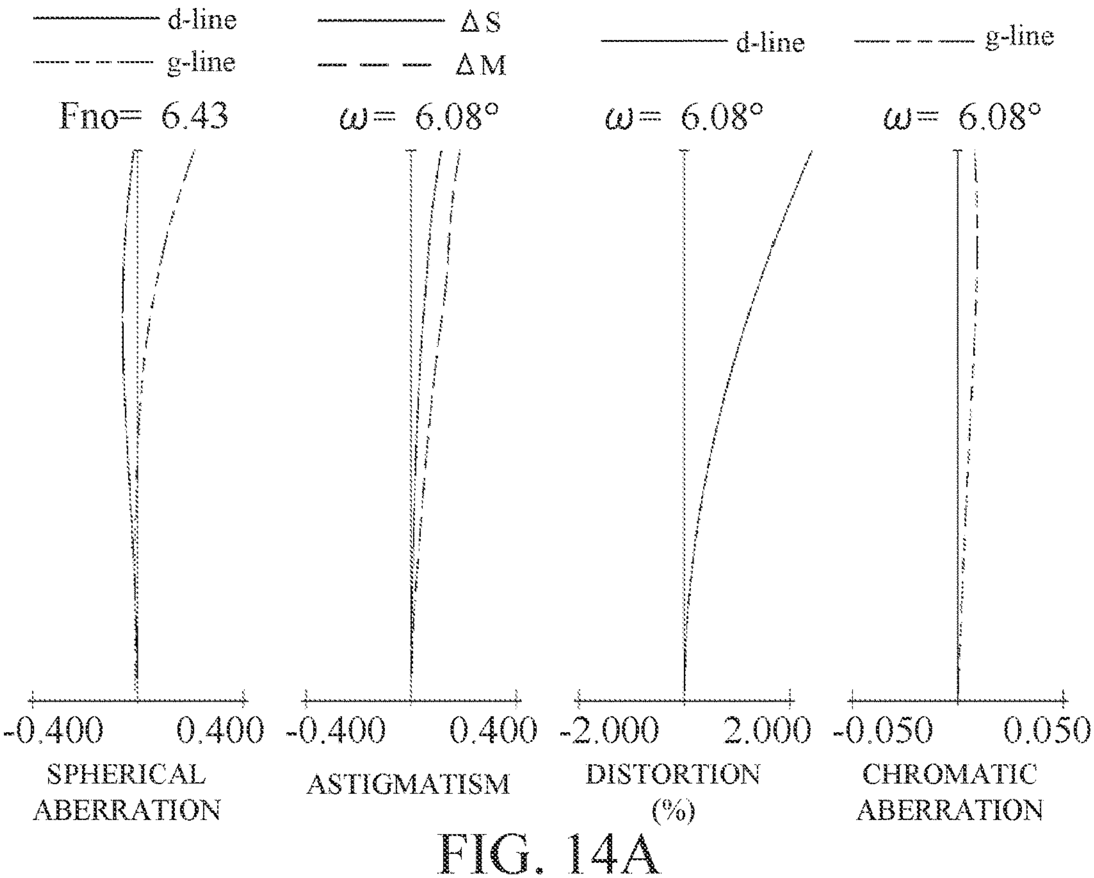
FIGS. 14A, 14B, and 14C are longitudinal aberration diagrams of the zoom lens according to Example 4 at the wide-angle end, an intermediate zoom position, and a telephoto end, respectively.
Figure 14B:
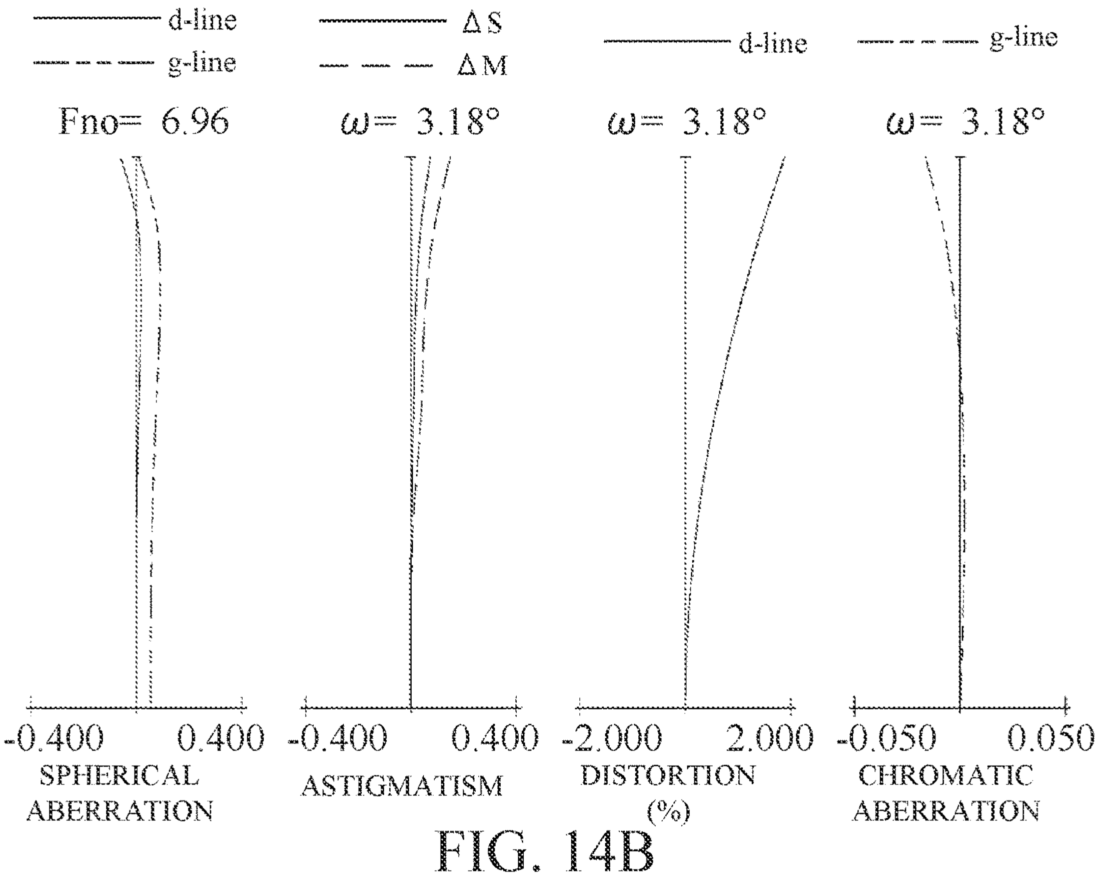
Figure 14C:
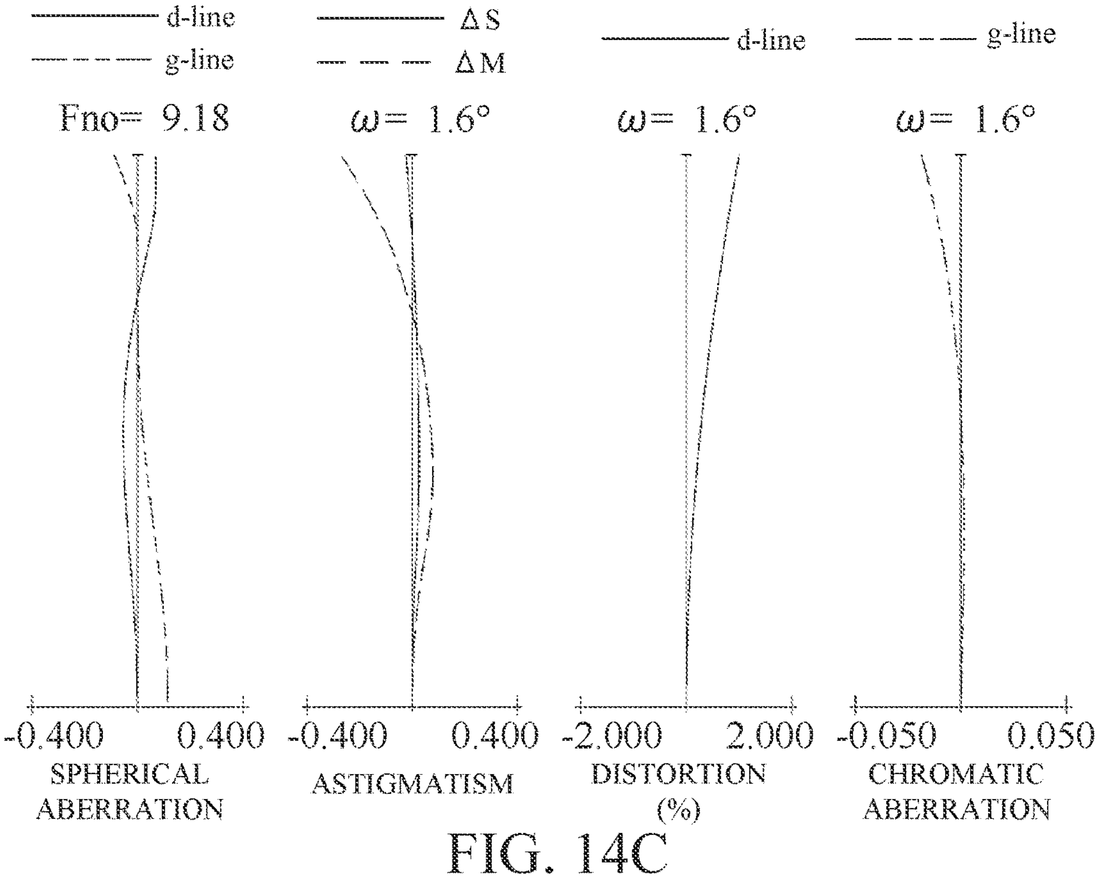
Figure 15A:
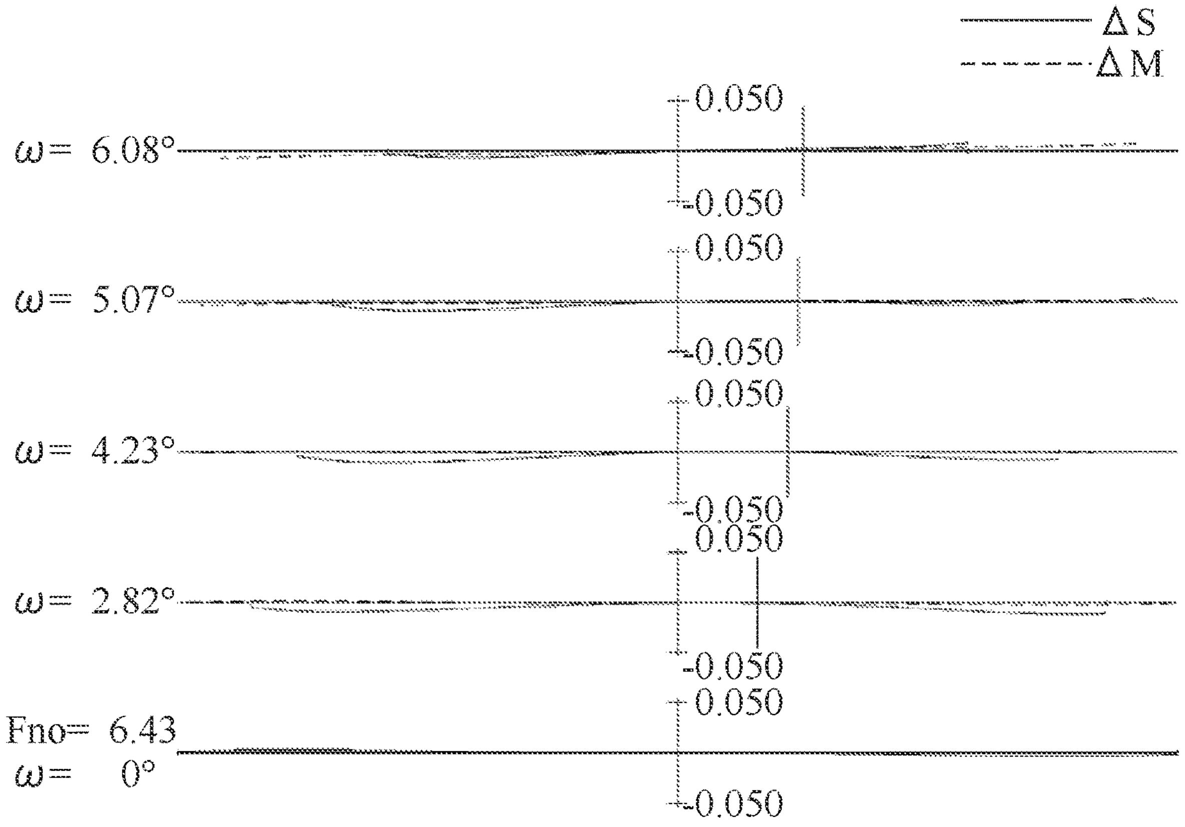
FIGS. 15A, 15B, and 15C are lateral aberration diagrams of the zoom lens according to Example 4 at the wide-angle end, the intermediate zoom position, and the telephoto end, respectively.
Figure 15B:
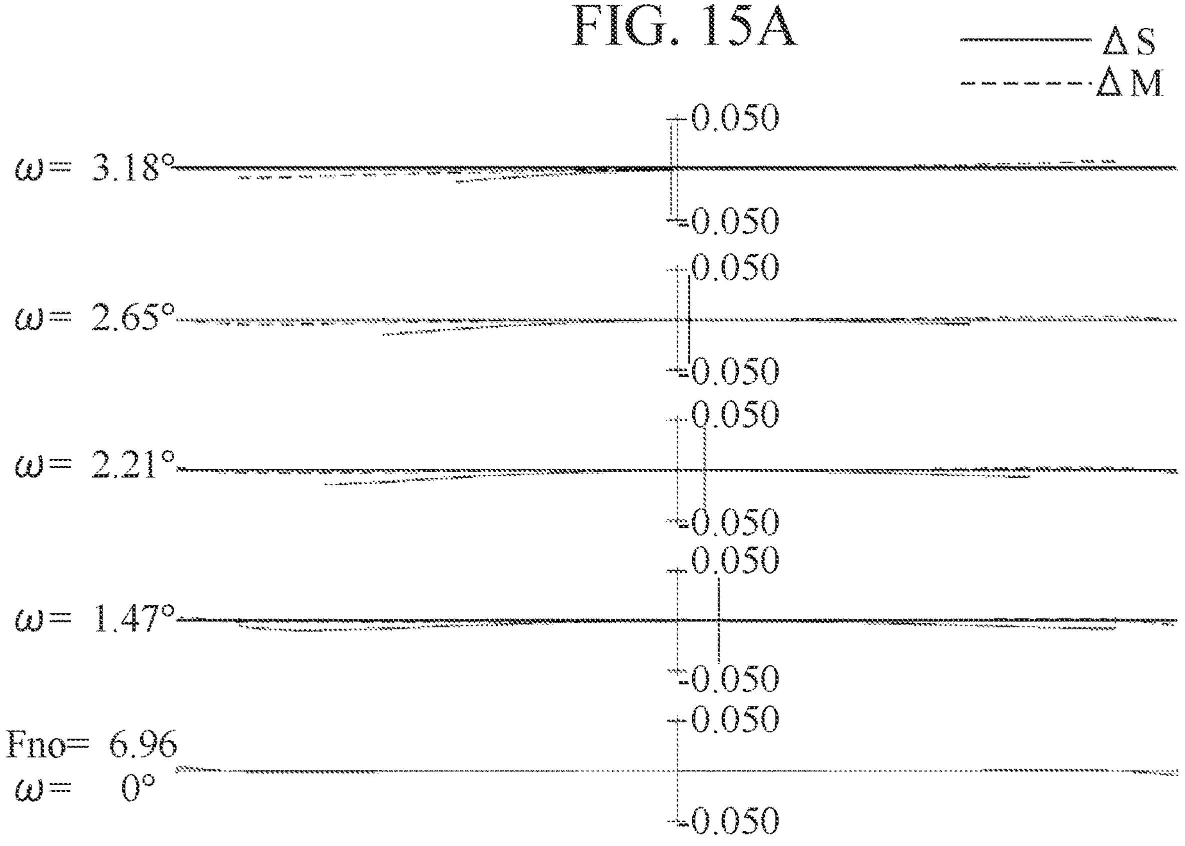
Figure 15C:
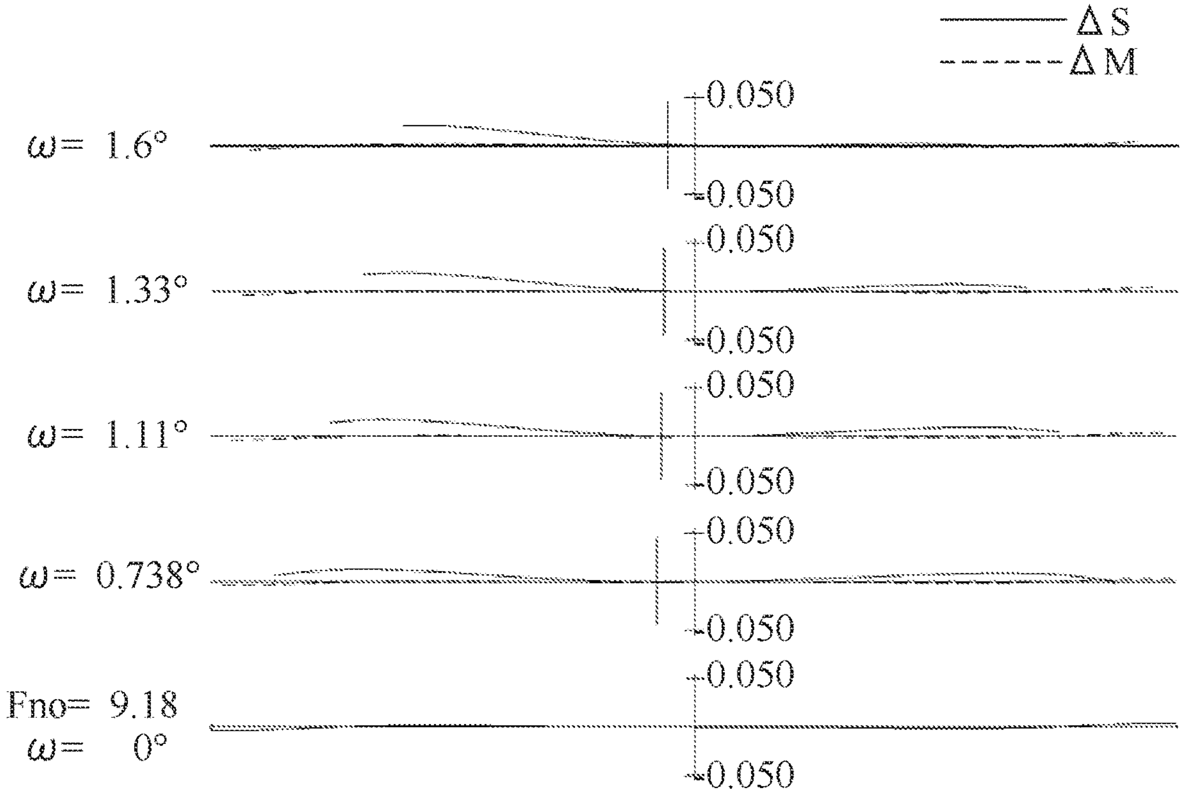
Figure 16A:
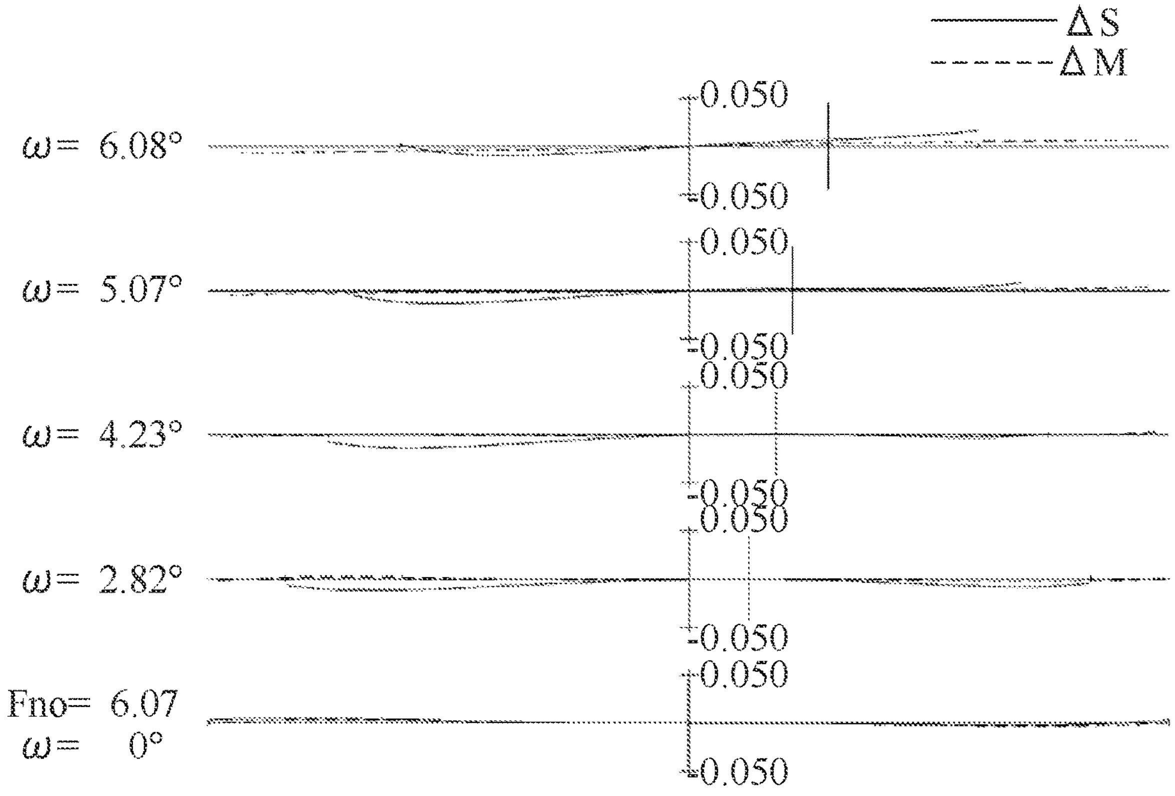
FIGS. 16A, 16B, and 16C are lateral aberration diagrams of the zoom lens according to Example 4 at the wide-angle end, the intermediate zoom position, and the telephoto end, respectively, after image stabilization by 0.3 degrees.
Figure 16B:
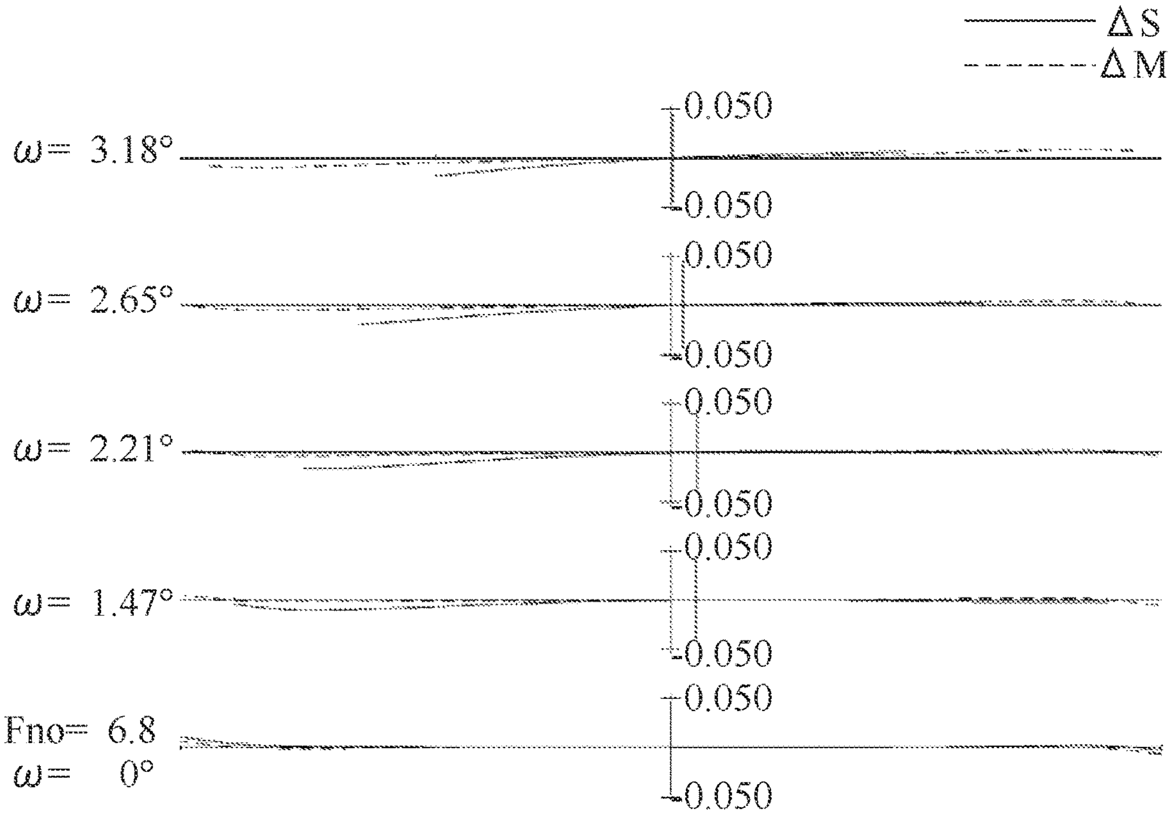
Figure 16C:
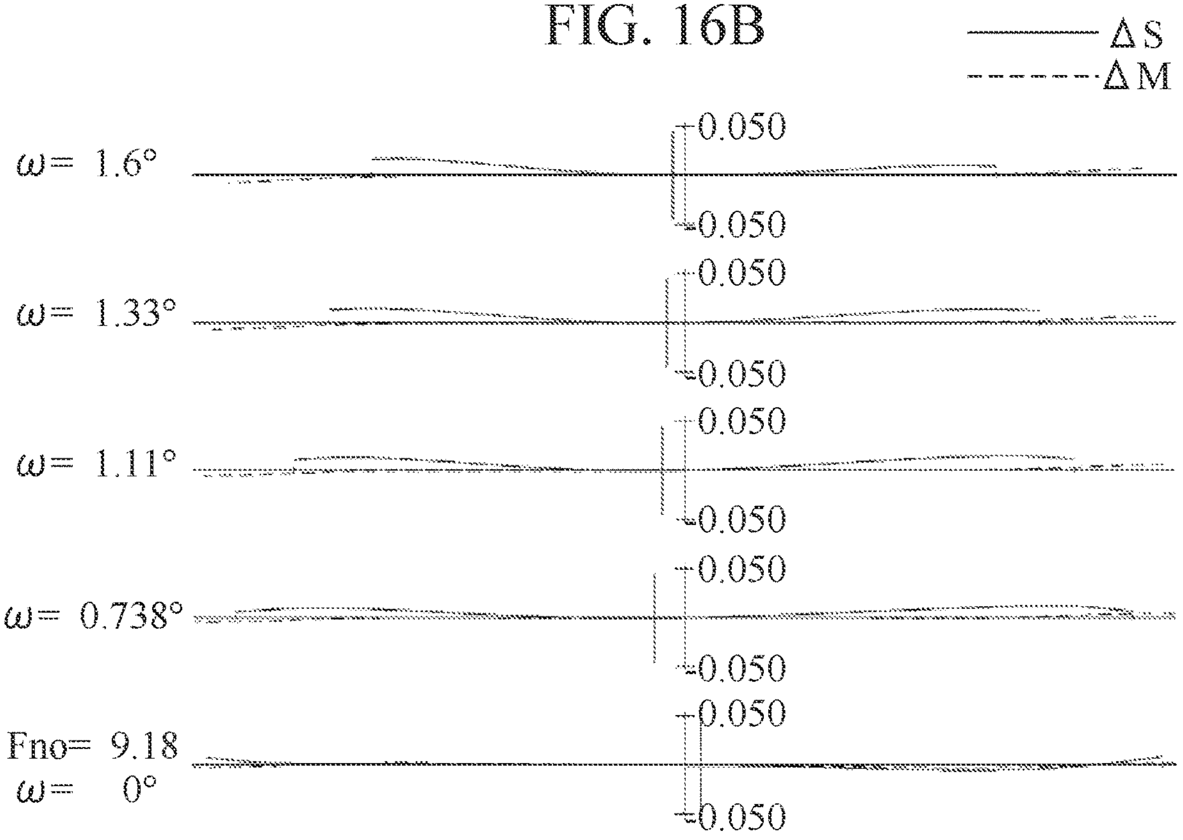

FIG. 13 is a sectional view of a zoom lens 1*d* according to Example 4. FIGS. 14A, 14B, and 14C are longitudinal aberration diagrams of the zoom lens 1*d* at the wide-angle end, the intermediate zoom position, and the telephoto end, respectively. FIGS. 15A, 15B, and 15C are lateral aberration diagrams of the zoom lens 1*d* at the wide-angle end, the intermediate zoom position, and the telephoto end, respectively. FIGS. 16A, 16B, and 16C are lateral aberration diagrams of the zoom lens 1*d* after image stabilization by 0.3 degrees at the wide-angle end, the intermediate zoom position, and the telephoto end, respectively. The zoom lens 1*d* has a zoom ratio of 3.8 and an F-number of about 6.4 to 9.2.

Figure 17:
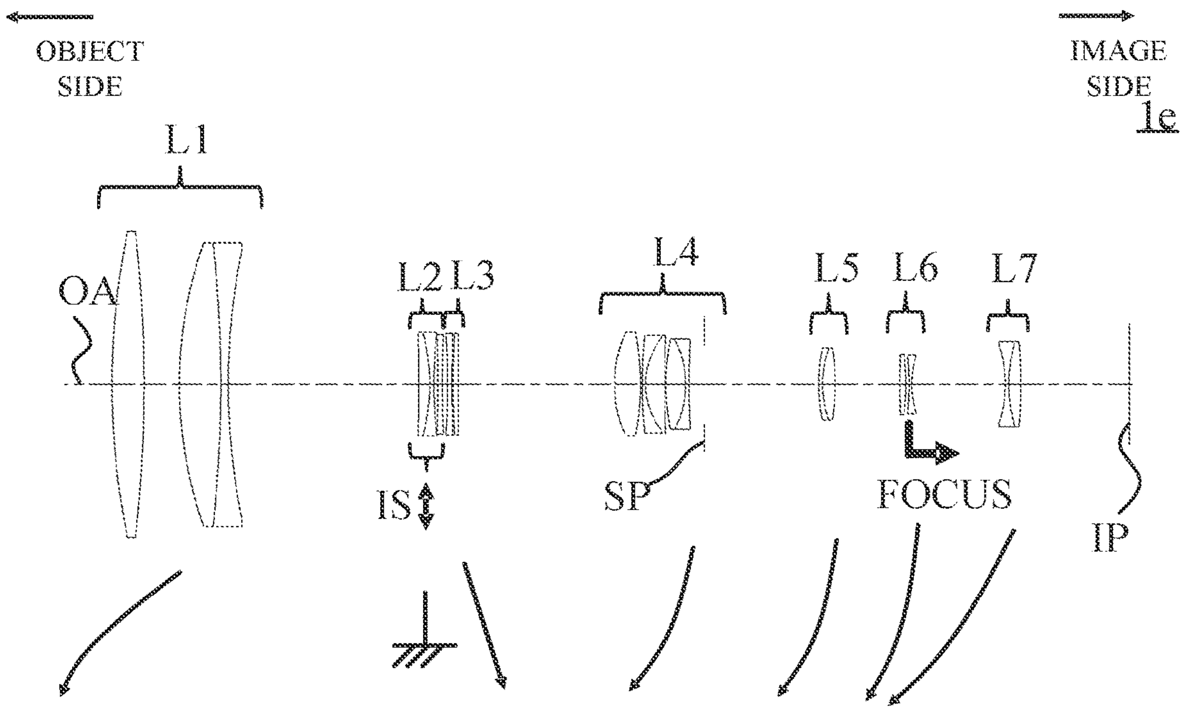
FIG. 17 is a sectional view of a zoom lens according to Example 5 at a wide-angle end.
Figure 18A:
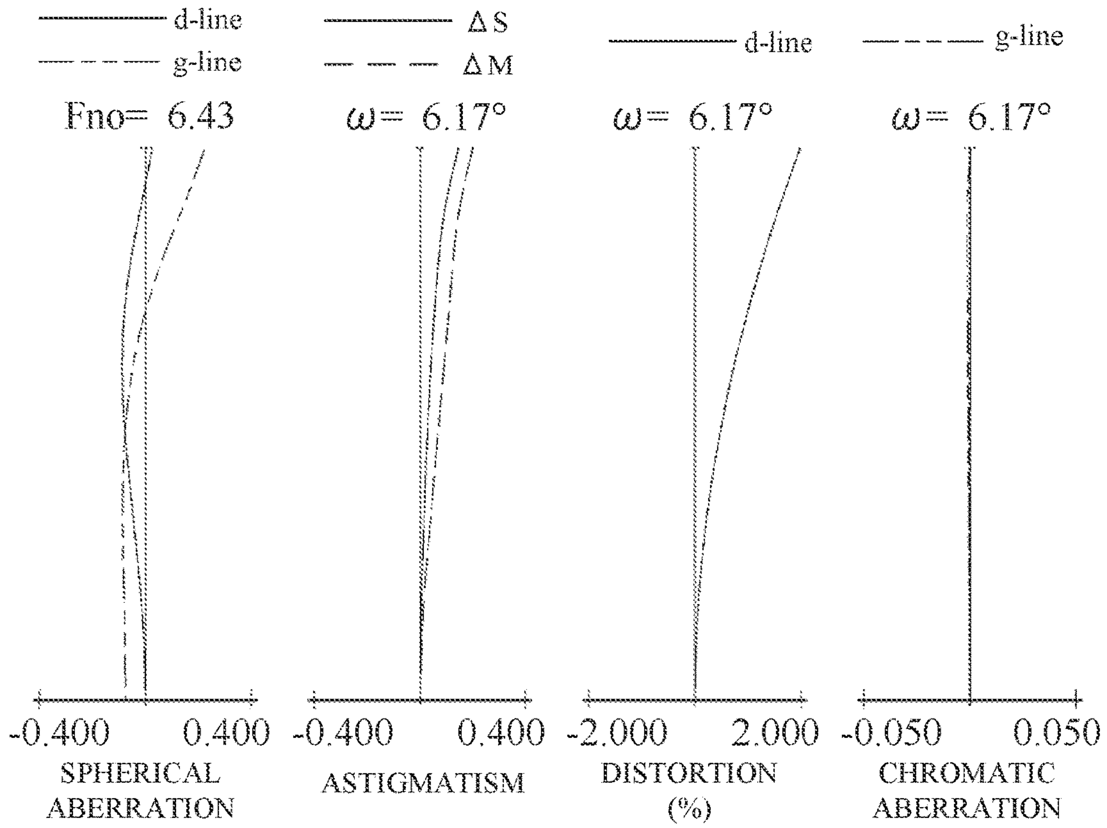
FIGS. 18A, 18B, and 18C are longitudinal aberration diagrams of the zoom lens according to Example 5 at the wide-angle end, an intermediate zoom position, and a telephoto end, respectively.
Figure 18B:
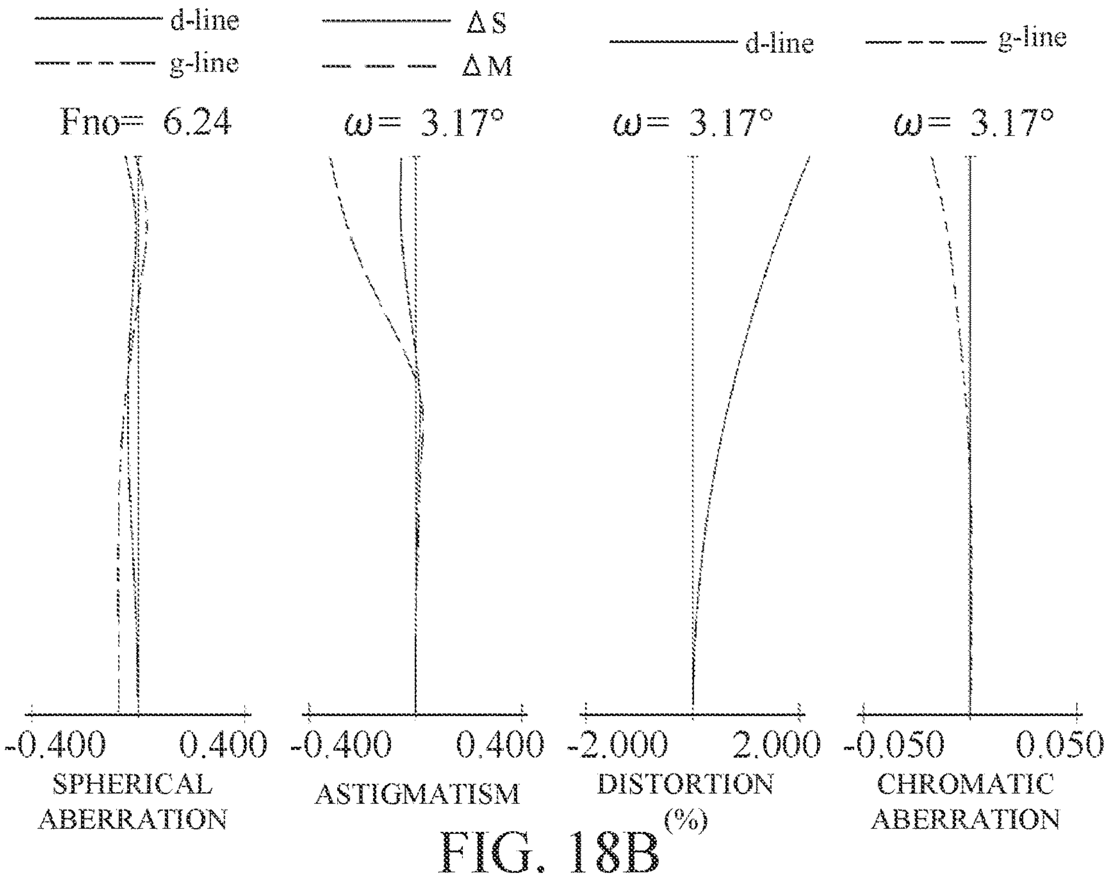
Figure 18C:
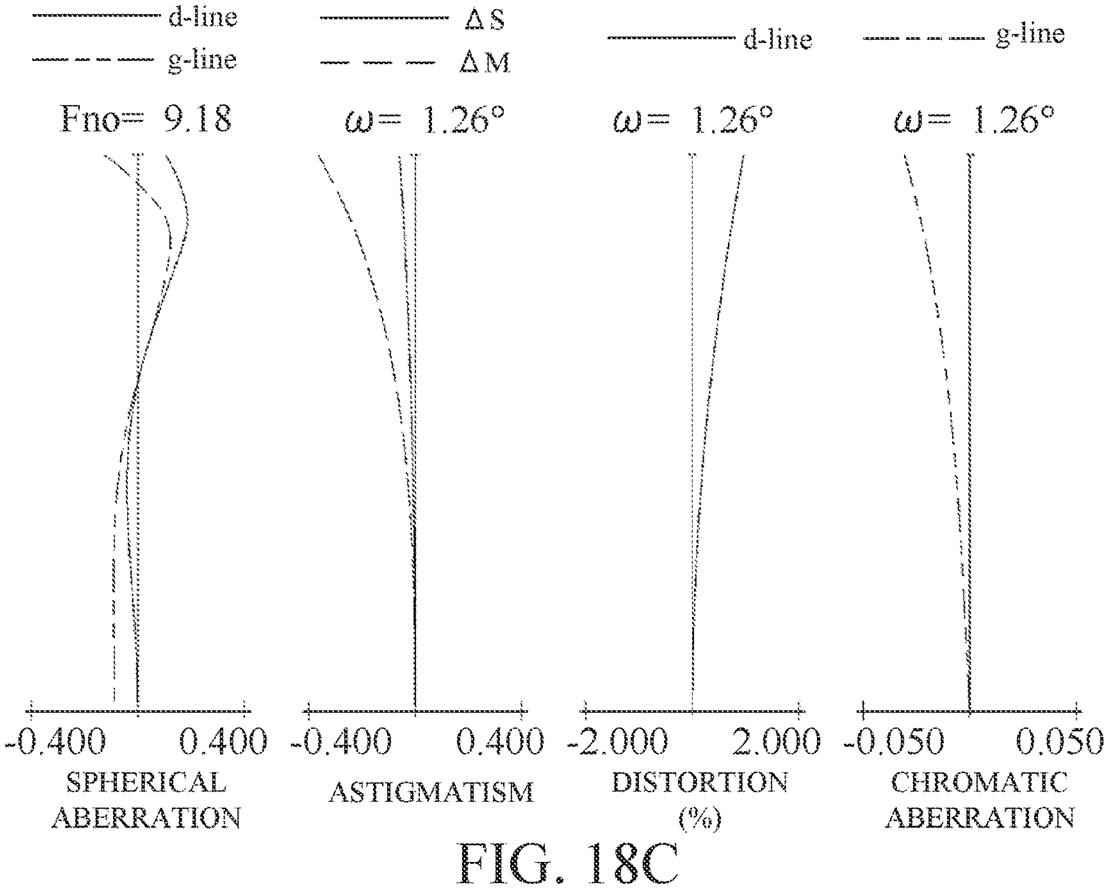
Figure 19A:
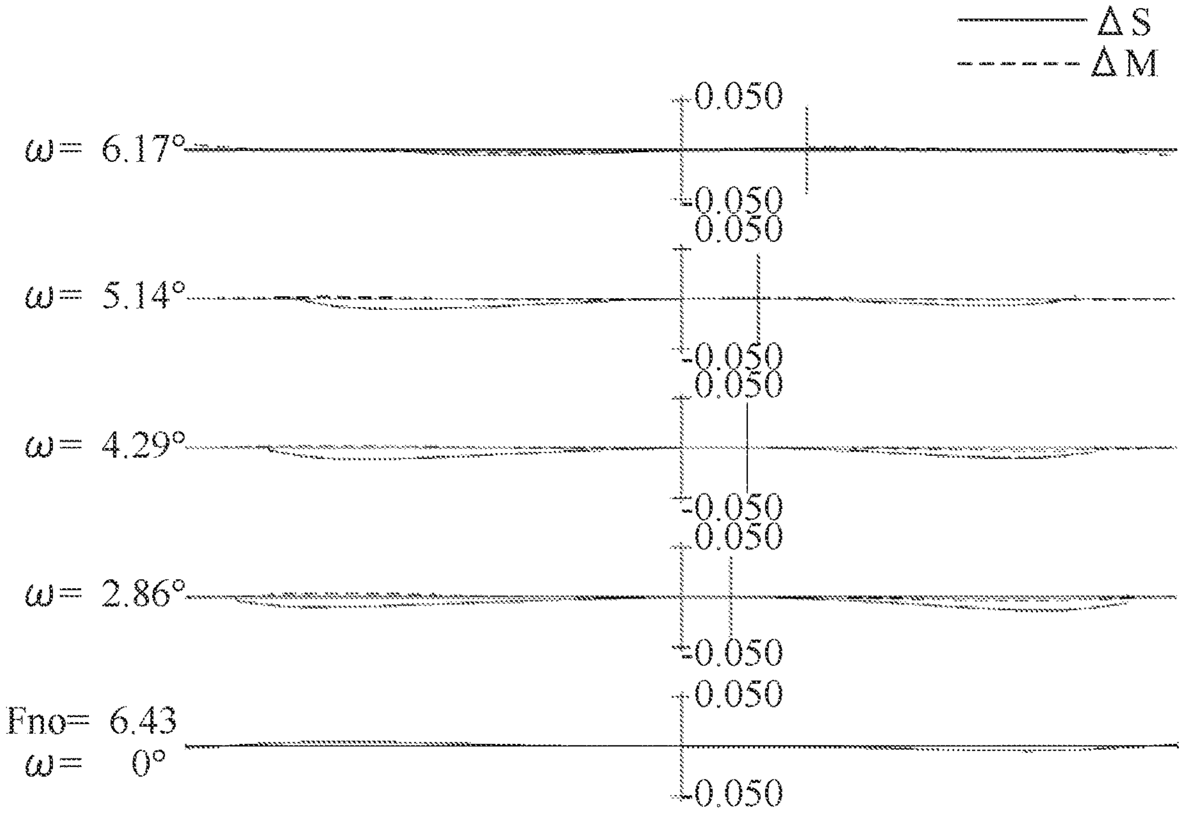
FIGS. 19A, 19B, and 19C are lateral aberration diagrams of the zoom lens according to Example 5 at the wide-angle end, the intermediate zoom position, and the telephoto end, respectively.
Figure 19B:
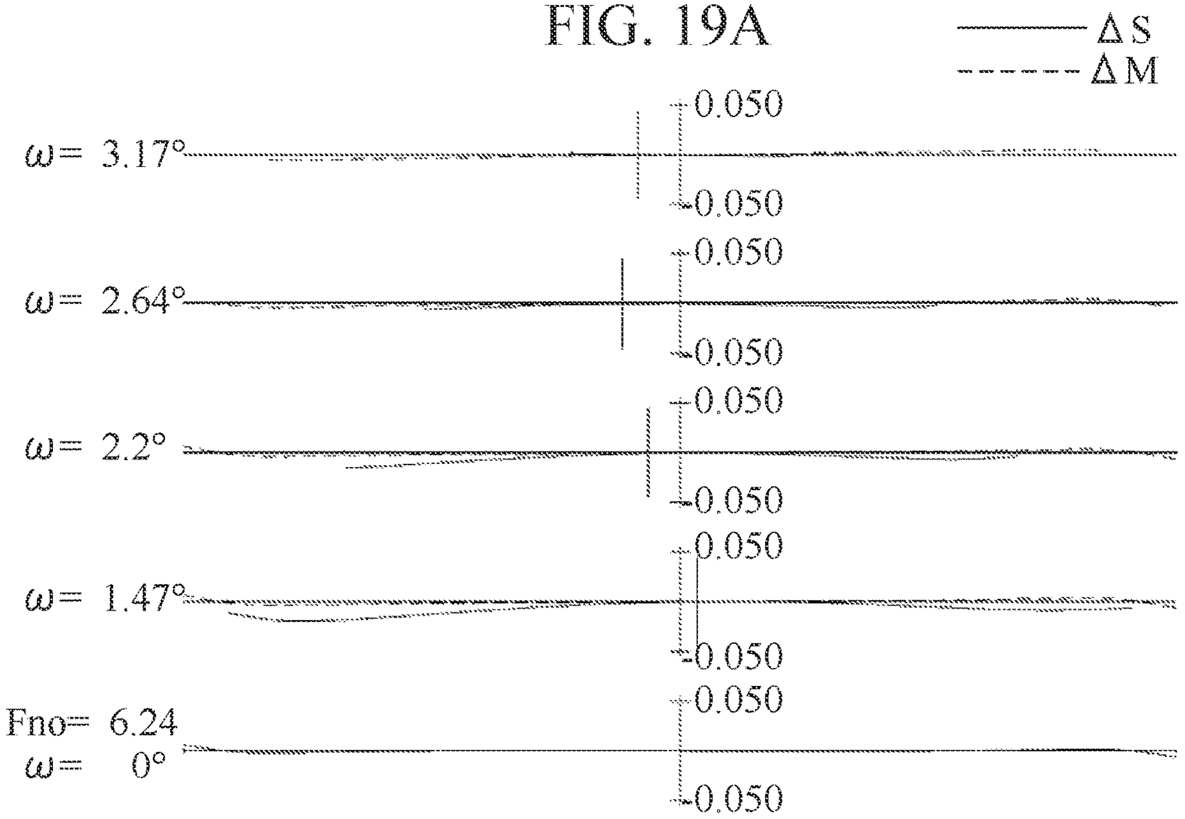
Figure 19C:
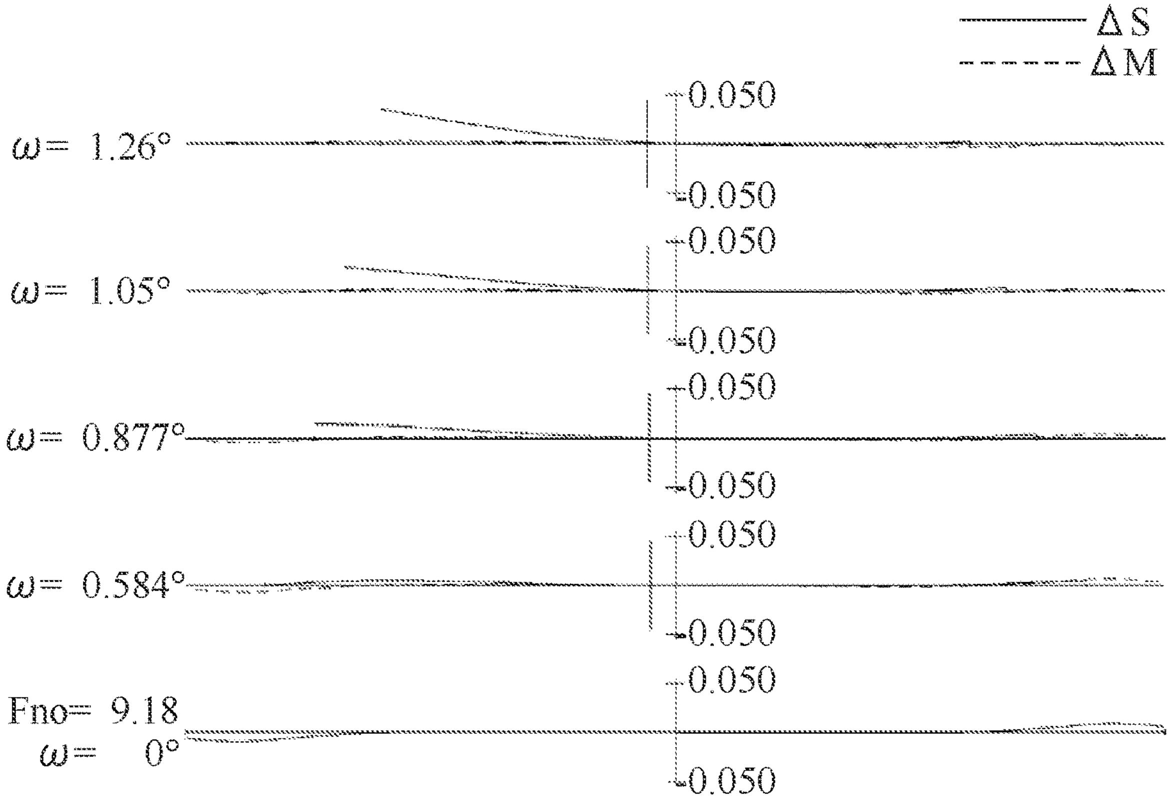
Figure 20A:
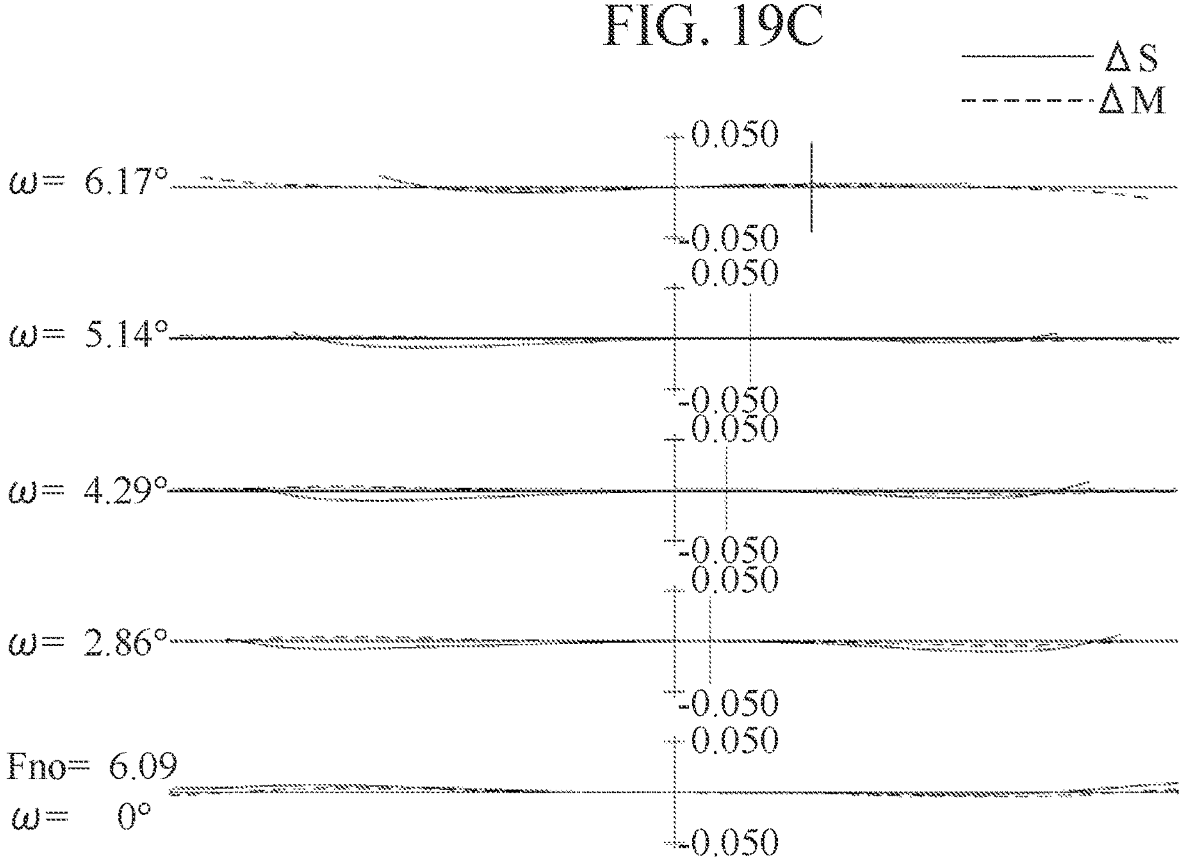
FIGS. 20A, 20B, and 20C are lateral aberration diagrams of the zoom lens according to Example 5 at the wide-angle end, the intermediate zoom position, and the telephoto end, respectively, after image stabilization by 0.3 degrees.
Figure 20B:
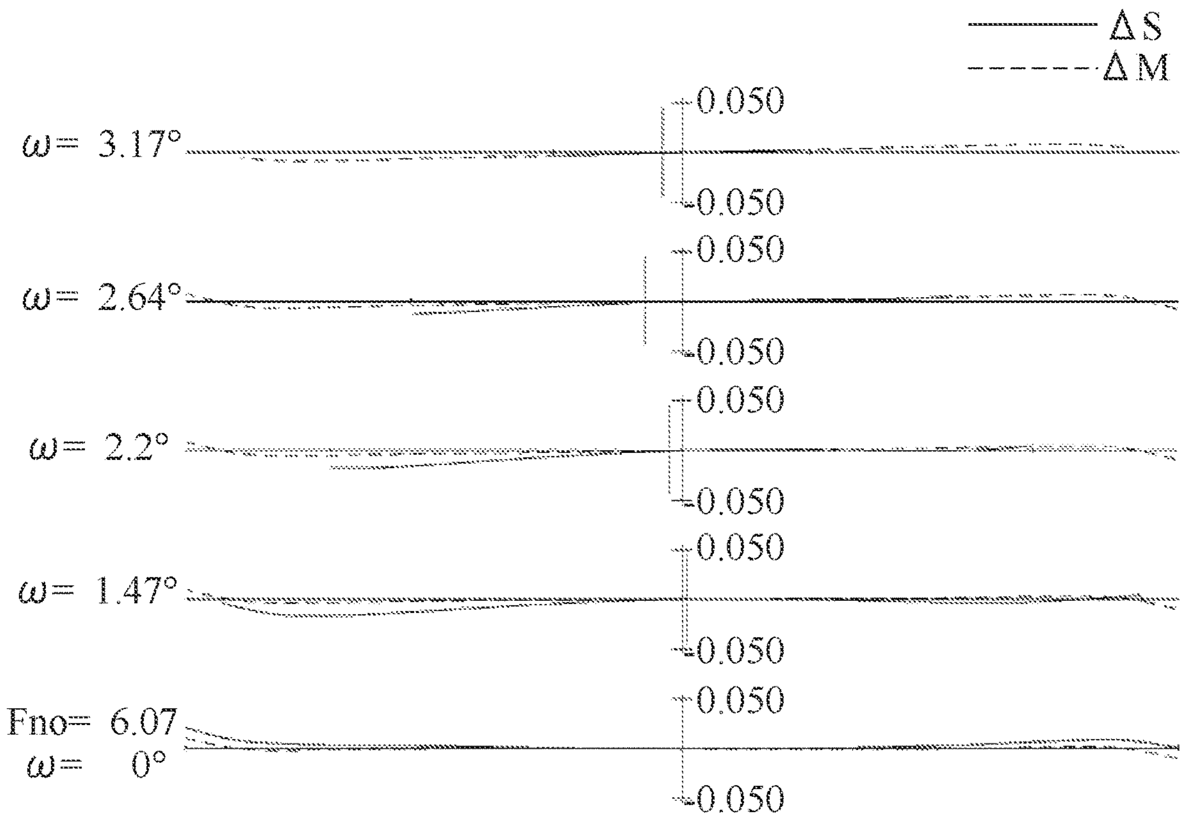
Figure 20C:
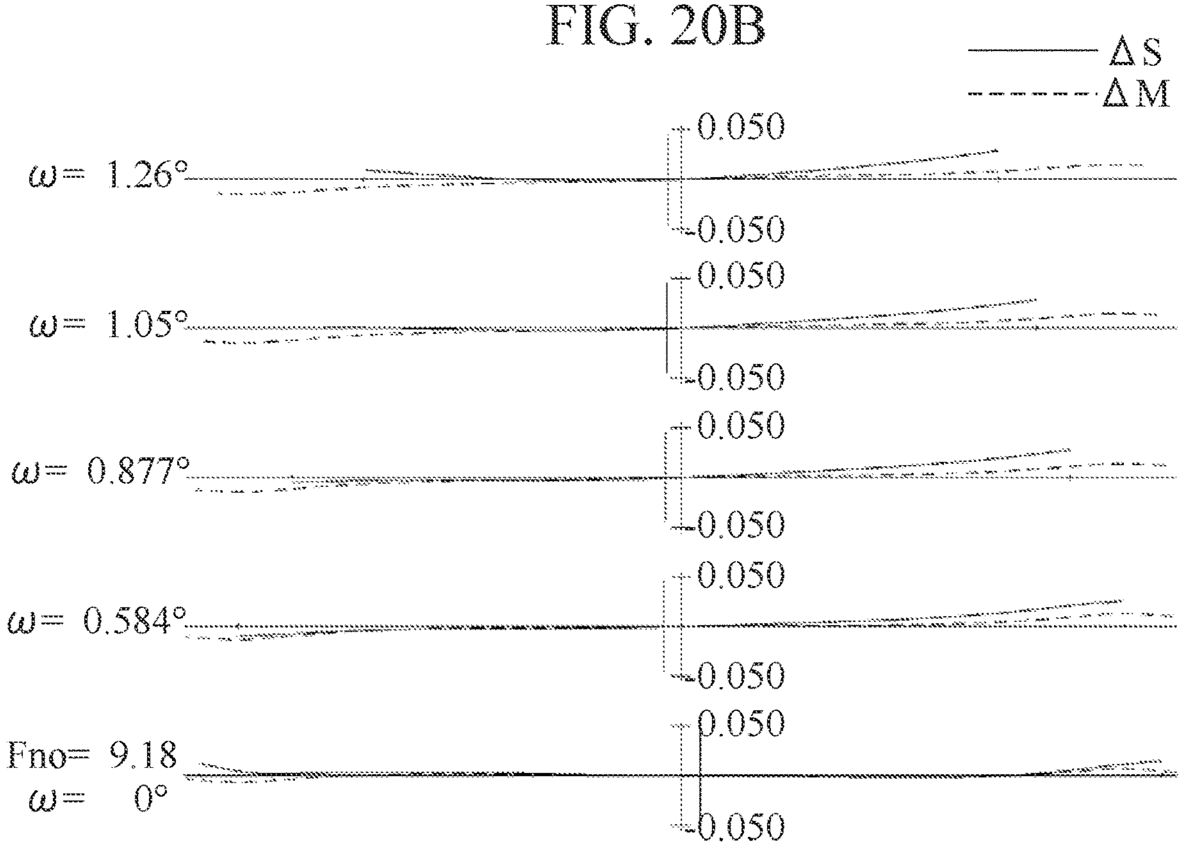

FIG. 17 is a sectional view of a zoom lens 1*e* according to Example 5. FIGS. 18A, 18B, and 18C are longitudinal aberration diagrams of the zoom lens 1*e* at the wide-angle end, the intermediate zoom position, and the telephoto end, respectively. FIGS. 19A, 19B, and 19C are lateral aberration diagrams of the zoom lens 1*e* at the wide-angle end, the intermediate zoom position, and the telephoto end, respectively. FIGS. 20A, 20B, and 20C are lateral aberration diagrams of the zoom lens 1*e* at the wide-angle end, the intermediate zoom position, and the telephoto end after image stabilization by 0.3 degrees, respectively. The zoom lens 1*e* has a zoom ratio of 4.9, and an F-number of about 6.4 to 9.2.

The zoom lens according to each example as disclosed herein is a zoom lens for an image pickup apparatus such as a digital camera, a video camera, a broadcasting camera, a surveillance camera, and a film-based camera. The zoom lens according to each example can also be used as a projection optical system for a projection apparatus (projector).

In the lens sectional view according to each example as disclosed herein, a left side is an object side (front), and a right side is an image side (rear). Where i is the order of the lens units counted from the object side, Li indicates an i-th lens unit. SP represents an aperture stop. IP represents an image plane. The image plane IP corresponds to an imaging plane of an image sensor (photoelectric conversion element) such as a CCD sensor or a CMOS sensor in a case where a zoom lens is used for an image pickup apparatus such as a digital camera or a video camera. In a case where a zoom lens is used for an image pickup apparatus as a film-based camera, the image plane IP corresponds to a film surface. During zooming from the wide-angle end to the telephoto end, each lens unit is moved as illustrated by an arrow. An arrow regarding focus (FOCUS) indicates a moving direction during focusing from an object at infinity to an object at a short distance. IS represents an image stabilizing lens unit, where image stabilization is performed by shifting the image stabilizing lens unit IS in a direction approximately orthogonal to the optical axis OA.

In a spherical aberration diagram, Fno represents an F-number. A solid line d represents a spherical aberration amount for the d-line (wavelength 587.6 nm), and an alternate long and two short dashes line g represents a spherical aberration amount for the g-line (wavelength 435.8 nm). In an astigmatism diagram, a dotted line ΔM represents an astigmatism amount on a meridional image plane for the d-line, and a solid line ΔS represents an astigmatism amount on a sagittal image plane for the d-line. A distortion diagram illustrates a distortion amount for the d-line. A lateral chromatic aberration diagram illustrates a lateral chromatic aberration amount for the g-line. ω represents a half angle of view (degrees).

A description will now be given of the lens configuration according to each example. The zoom lens 1*a* according to Example 1 (FIG. 1) is a six-unit zoom lens. The zoom lens 1*a* includes, in order from the object side to the image side, a first lens unit L1 having positive refractive power, a second lens unit L2 having negative refractive power, a third lens unit L3 having positive refractive power, a fourth lens unit L4 having positive refractive power, a fifth lens unit L5 having negative refractive power, and a sixth lens unit L6 having negative refractive power. The third lens unit L3, the fourth lens unit L4, the fifth lens unit, and the sixth lens unit L6 form a rear group. During zooming from the wide-angle end to the telephoto end, all the lens units except the second lens unit L2 move toward the object side. The second lens unit L2 consists of three lenses having positive, negative, and negative refractive powers in order from the object side to the image side, and is fixed during zooming. Image stabilization is performed by moving the three lenses (image stabilizing lens unit IS) in the second lens unit L2 in a direction approximately orthogonal to the optical axis OA. During focusing from infinity to a close distance, the fifth lens unit L5 moves toward the image side (FOCUS). The aperture stop SP that determines Fno is disposed closest to the image plane in the third lens unit L3.

The zoom lens 1*b* according to Example 2 (FIG. 5) is a six-unit zoom lens. The zoom lens 1*b* includes, in order from the object side to the image side, a first lens unit L1 having positive refractive power, a second lens unit L2 having negative refractive power, a third lens unit L3 having positive refractive power, a fourth lens unit L4 having positive refractive power, a fifth lens unit L5 having negative refractive power, and a sixth lens unit L6 having negative refractive power. The third lens unit L3, the fourth lens unit L4, the fifth lens unit, and the sixth lens unit L6 form a rear group. During zooming from the wide-angle end to the telephoto end, all the lens units except the second lens unit L2 move toward the object side. The second lens unit L2 consists of four lenses having positive, negative, negative, and negative refractive powers in order from the object side to the image side, and is fixed during zooming. Image stabilization is performed by moving the entire second lens unit L2 (image stabilizing lens unit IS) in a direction approximately orthogonal to the optical axis OA. During focusing from infinity to a close distance, the fourth lens unit L4 moves toward the image side (FOCUS). The aperture stop SP that determines Fno is disposed in the third lens unit L3.

The zoom lens 1*c* according to Example 3 (FIG. 9) is a three-unit zoom lens. The zoom lens 1*c* includes, in order from the object side to the image side, a first lens unit L1 having positive refractive power, a second lens unit L2 having negative refractive power, and a third lens unit L3 having positive refractive power. The third lens unit L3 is a rear group. During zooming from the wide-angle end to the telephoto end, all lens units except the second lens unit L2 move toward the object side. The second lens unit L2 is fixed during zooming. The second lens unit L2 consists of five lenses having positive, negative, negative, negative, and positive refractive powers in order from the object side to the image side, and performs image stabilization by moving the three (negative, negative, and positive) lenses (image stabilizing lens unit IS) on the image side in the second lens unit L2 in a direction orthogonal to the optical axis OA during. During focusing from infinity to a close distance, eighth and ninth lenses having positive and negative refractive powers counted from the object side in the third lens unit L3 move toward the image side (FOCUS). An aperture stop SP that determines Fno is disposed in the third lens unit L3.

The zoom lens 1*d* according to Example 4 (FIG. 13) is a six-unit zoom lens. The zoom lens 1*d* includes, in order from the object side to the image side, a first lens unit L1 having positive refractive power, a second lens unit L2 having negative refractive power, a third lens unit L3 having positive refractive power, a fourth lens unit L4 having positive refractive power, a fifth lens unit L5 having negative refractive power, and a sixth lens unit L6 having negative refractive power. The third lens unit L3, the fourth lens unit L4, the fifth lens unit, and the sixth lens unit L6 form a rear group. During zooming from the wide-angle end to the telephoto end, all the lens units except the second lens unit L2 move toward the object side. The second lens unit L2 is fixed during zooming. The second lens unit L2 consists of two lenses having positive and negative refractive powers in order from the object side to the image side, and performs image stabilization by moving in a direction orthogonal to the optical axis as a whole. During focusing from infinity to a close distance, the fifth lens unit L5 moves toward the object side (FOCUS). The aperture stop SP that determines Fno is disposed in the third lens unit L3.

The zoom lens 1*e* according to Example 5 (FIG. 17) is a seven-unit zoom lens. The zoom lens 1*e* includes, in order from the object side, a first lens unit L1 having positive refractive power, a second lens unit L2 having negative refractive power, a third lens unit L3 having negative refractive power, a fourth lens unit L4 having positive refractive power, a fifth lens unit L5 having positive refractive power, a sixth lens unit L6 having negative refractive power, and a seventh lens unit L7 having negative refractive power. The third lens unit L3, the fourth lens unit L4, the fifth lens unit L5, the sixth lens unit L6, and the seventh lens unit L7 form a rear group. During zooming from the wide-angle end to the telephoto end, the first lens unit L1 and the fourth to seventh lens units L4 to L7 move toward the object side. The third lens unit L3 moves toward the image side. The second lens unit L2 is fixed during zooming. The second lens unit L2 consists of three lenses having positive, negative, and negative refractive powers in order from the object side to the image side, and performs image stabilization when the entire second lens unit L2 (image stabilizing lens unit IS) moves in a direction approximately orthogonal to the OA. During focusing from infinity to a close distance, the sixth lens unit L6 moves (FOCUS).

The zoom lens according to each example performs magnification variation (zooming) by moving the first lens unit L1 and the rear group consisting of a plurality of lens units (such as the third lens unit L3) on the image side of the second lens unit L2. The first lens unit L1 moves toward the object side during zooming from the wide-angle end to the telephoto end, and thereby this configuration can achieve a desired zoom ratio while reducing the effective diameter of the front lens at the wide-angle end. Fixing the second lens unit L2 having strong negative refractive power during zooming can reduce unsteadiness due to manufacturing errors.

Each example performs image stabilization by moving or decentering the whole or part of the second lens unit L2 (at least part of the second lens unit L2) in a direction approximately orthogonal to the optical axis OA (a direction including a component of the vertical direction). Providing the image stabilizing lens unit to the second lens unit L2, which does not move for zooming, can suppress tilting of the second lens unit L2 caused by manufacturing errors, and can provide excellent image stabilizing performance. The second lens unit L2 having the positive lens closest to the object can reduce the diameter of the image stabilizing lens unit. Strengthening the telephoto arrangement at the telephoto end is also beneficial to reducing the overall lens length. Placing the positive lens in the second lens unit L2 having negative refractive power can suppress lateral chromatic aberration at the wide-angle end and can suppress chromatic aberration fluctuations during image stabilization.

In each example, the first lens unit L1 is thicker in lens thickness than a conventional zoom lens, and the number of lenses in the first lens unit L1 and the second lens unit L2 is smaller than that of the conventional zoom lens. This configuration can correct aberrations, particularly at the telephoto end, and reduce the weight of the zoom lens (the entire system).

A lens unit that moves during focusing (focus lens unit) is generally driven via an actuator such as a motor. Therefore, it is easy to drive the lens unit with a moving amount different from that of a lens unit that moves together during zooming, and in all Examples except Example 3, the focus lens unit is an independently moving group. This configuration can suppress fluctuations in the curvature of field that occurs during zooming and focusing.

Each example satisfies the following inequality (1):

$$0.003 < D2/\mathrm{ft} < 0.026 \quad (1)$$

where D2 is a distance (or thickness) on an optical axis from a lens surface closest to an object of the second lens unit L2 to a lens surface closest to an image plane of the second lens unit L2, and ft is a focal length of the zoom lens at the telephoto end.

Inequality (1) defines a relationship between the thickness D2 of the second lens unit L2 and the focal length ft of the zoom lens at the telephoto end in order to maintain a lightweight image stabilizing lens unit and excellent image stabilizing performance. In a case where the thickness D2 of the second lens unit L2 increases and the value becomes higher than the upper limit of inequality (1), the image stabilizing lens unit provided in the second lens unit L2 becomes larger, and it becomes difficult to reduce the size and weight of the zoom lens. In a case where the focal length ft becomes smaller and the value becomes higher than the upper limit of inequality (1), it becomes difficult to obtain a desired telephoto angle of view. On the other hand, in a case where the thickness D2 of the second lens unit L2 becomes smaller and the value becomes lower than the lower limit of inequality (1), the sufficient number of lenses cannot be disposed, and it becomes difficult to maintain the image stabilizing performance or to suppress eccentric coma or eccentric curvature of field. In a case where the focal length ft increases and the value becomes lower than the lower limit of inequality (1), it becomes difficult to suppress longitudinal or lateral chromatic aberration that occurs at the telephoto end.

Inequality (1) may be replaced with inequality (1a) below:

$$0.008 < D2/\mathrm{ft} < 0.025 \quad (1a)$$

Inequality (1) may be replaced with inequality (1b) below:

$$0.010 < D2/\mathrm{ft} < 0.025 \quad (1b)$$

In each example, at least one of the following inequalities (2) to (11) may be satisfied:

$$-1.00 < f2/fw < -0.20 \quad (2)$$

$$3.0 < D1/D2 < 30.0 \quad (3)$$

$$3.0 < TD12t/TG12 < 15.0 \quad (4)$$

$$1.00 < \mathrm{ft}/TTDw < 3.50 \quad (5)$$

$$8.0 < \mathrm{ft}/skw < 35.0 \quad (6)$$

$$5 < TTDw/skw < 20 \quad (7)$$

$$0.10 < m1/f1 < 0.50 \quad (8)$$

$$1.00 < f1/fw < 3.00 \quad (9)$$

$$-6.0 < (1-\beta ist)\times\beta rt < -2.0 \quad (10)$$

$$4.0 < |(1-\beta \mathrm{ft}^2)\times\beta frt^2| < 20.0 \quad (11)$$

Here, f2 is a focal length of the second lens unit L2, fw is a focal length of the zoom lens at the wide-angle end, and D1 is a distance (or thickness) on an optical axis from a lens surface closest to an object of the first lens unit L1 to a lens surface closest to an image plane of the first lens unit L1. TD12*t* is a distance from a lens surface closest to the object of the first lens unit L1 to a lens surface closest to the image plane of the second lens unit L2 at the telephoto end, TG12 is a sum of the lens thicknesses on the optical axis of the first lens unit L1 and second lens unit L2. TTDw is an optical overall length (overall lens length) from a lens surface closest to the object of the zoom lens to the image plane at the wide-angle end, and skw is a back focus of the zoom lens at the wide-angle end. m1 is a moving amount of the first lens unit L1 during zooming from the wide-angle end to the telephoto end, f1 is a focal length of the first lens unit L1, βist is a lateral magnification at the telephoto end of the image stabilizing lens unit that performs image stabilization among the second lens unit L2, and βrt is a combined lateral magnification of all lens units on the image side of the image stabilizing lens unit at the telephoto end. βft is a lateral magnification of the focus lens unit at the telephoto end, and βfrt is a combined lateral magnification at the telephoto end of all lens units on the image side of the focus lens unit.

The overall optical length TTDw at the wide-angle end is a sum of a distance from a first (foremost) lens surface on the object side to a final (rearmost) lens surface and the back focus of the air equivalent length. The back focus is a length from the final lens surface to the image plane IP in the air conversion. A zooming-period moving amount (moving amount of the lens unit during zooming) corresponds to a difference between the position on the optical axis at the wide-angle end and the position on the optical axis at the telephoto end. The sign of that moving amount is positive when the lens unit is located closer to the image plane at the telephoto end than at the wide-angle end, and negative when the lens unit is located closer to the object at the telephoto end than at the wide-angle end.

Inequality (2) is to reduce the overall lens length and maintain optical performance by properly setting the focal length f2 of the second lens unit L2. In a case where the focal length f2 becomes larger and the value becomes lower than the lower limit of inequality (2), the moving amount of the first lens unit L1 or the third lens unit L3 is increased in order to achieve the desired zoom magnification, and it becomes difficult to reduce the overall lens length. In addition, the negative refractive power of the entire zoom lens system becomes weaker, the Petzval sum tends to become stronger on the positive side, and it becomes difficult to satisfactorily correct astigmatism and curvature of field. In a case where the focal length fw becomes shorter and the value becomes lower than the lower limit of inequality (2), the refractive power of the negative lens unit on the object side of the aperture stop SP becomes stronger, the desired optical performance cannot be satisfied, and the diameter of the front lens increases. On the other hand, in a case where the focal length f2 becomes too small and the value becomes higher than the upper limit of inequality (2), the refractive power of the second lens unit L2 becomes stronger, the outer diameter of the rear group, such as the third lens unit L3 and the focus lens unit, tends to increase, and it becomes difficult to reduce the size of the zoom lens. In a case where the focal length f2 becomes shorter and the value becomes higher than the upper limit of inequality (2), the positive refractive power of the fourth lens unit L4 or the subsequent lens unit is increased in order to reduce the overall lens length at the wide-angle end, and it becomes difficult to correct axial aberrations such as spherical aberration. In a case where the focal length fw becomes larger, the desired focal length cannot be obtained at the wide-angle end.

Inequality (3) defines a ratio of the (unit) thickness D1 of the first lens unit L1 and the (unit) thickness D2 of the second lens unit L2 for proper aberration correction. Here, the (unit) thickness includes an air gap between the lenses in the group. In a case where the thickness D1 increases and the value becomes higher than the upper limit of inequality (3), the diameter of the first lens unit L1 becomes particularly larger and it becomes difficult to reduce the size and weight of the zoom lens. Alternatively, in a case where the thickness D2 becomes smaller and the value becomes higher than the upper limit of inequality (3), it becomes difficult to reduce the number of lenses in the second lens unit L2 having negative refractive power and to correct various aberrations in each lens unit. In particular, it becomes difficult to correct spherical aberration at the telephoto end and lateral chromatic aberration and coma at the wide-angle end. On the other hand, in a case where the thickness D1 becomes smaller than the lower limit of inequality (3), spherical aberration or chromatic aberration cannot be sufficiently corrected at the telephoto end. In a case where the thickness D2 increases and the value becomes lower than the lower limit of inequality (3), the zooming-period moving amount of the rear group becomes smaller, and the overall length of the entire zoom lens system increases to obtain the desired magnification.

Inequality (4) defines a relationship between the distance TD12t and the overall sum TG12 in order to suppress various aberrations at the telephoto end and reduce the weight of the zoom lens. Here, TG12 is the sum of the lens thicknesses of the first lens unit L1 and the second lens unit L2, and does not include a distance between the lenses. In a case where the distance TD12t increases and the value becomes higher than the upper limit of inequality (4), the overall lens length increases. In particular, as the distance between the first lens unit L1 and the second lens unit L2 for the main magnification variation increases, the diameter of the first lens unit L1 increases, and portability lowers. In a case where the overall sum TG12 becomes smaller and the value becomes higher than the upper limit of inequality (4), the number of lenses decreases or it becomes difficult to provide sufficient refractive power to each lens. As a result, it becomes difficult to sufficiently correct various aberrations, particularly spherical aberration and chromatic aberration, at the telephoto end.

On the other hand, in a case where the distance TD12t becomes smaller and the value becomes lower than the lower limit of inequality (4), the telephoto arrangement of the refractive power becomes too strong, it becomes difficult to sufficiently correct spherical aberration and chromatic aberration, and the optical performance lowers. In a case where the distance TD12t becomes larger and the value becomes lower than the lower limit of inequality (4), it means that more lenses are disposed in the first lens unit L1 and the second lens unit L2, and it becomes difficult to reduce the weight of the zoom lens.

Inequality (5) defines a relationship between the desired focal length ft and the overall optical length TTDw for the reduced overall lens length. In a case where the focal length ft increases and the value becomes higher than the upper limit of inequality (5), the overall lens length becomes too short, the refractive power needs an extreme telephoto arrangement, and it becomes difficult to sufficiently correct various aberrations. In a case where the overall optical length TTDw becomes smaller and the value becomes higher than the upper limit of inequality (5), the first lens unit L1 is moved by a large distance during zooming in order to sufficiently correct various aberrations at the telephoto end, and the mechanical structure becomes complicated. On the other hand, in a case where the focal length ft becomes smaller and the value becomes lower than the lower limit of inequality (5), the desired telephoto angle of view cannot be obtained. In a case where the overall optical length TTDw increases and the value becomes lower than the lower limit of inequality (5), it becomes difficult to reduce the size and weight of the zoom lens.

Inequality (6) defines a relationship between the focal length ft and the back focus skw at the wide-angle end in order to realize the telephoto configuration and the reduced size of the zoom lens. In a case where the focal length ft increases and the value becomes higher than the upper limit of inequality (6), it becomes difficult to correct various aberrations, especially longitudinal chromatic aberration, at the telephoto end. In a case where the back focus skw becomes smaller and the value becomes higher than the upper limit of inequality (6), the lens is disposed near the image plane IP and a mechanical layout becomes difficult. On the other hand, in a case where the back focus skw increases and the value becomes lower than the lower limit of inequality (6), the final lens unit becomes excessively close to the object, and it becomes difficult to suppress lateral chromatic aberration at the wide-angle end. In a case where the focal length ft becomes smaller and the value becomes lower than the lower limit of inequality (6), it becomes difficult to achieve the desired focal length at the telephoto end.

Inequality (7) defines a relationship between the optical overall length TTDw of the zoom lens at the wide-angle end and the back focus skw at the wide-angle end in order to obtain a zoom lens with a reduced overall length. In a case where the overall optical length TTDw of the zoom lens at the wide-angle end becomes longer and the value becomes higher than the upper limit of inequality (7), it becomes difficult to reduce the overall length of the zoom lens. In a case where the back focus skw becomes smaller and the value becomes higher than the upper limit of inequality (7), it becomes difficult to mechanically layout the connector between the lens and the camera. On the other hand, in a case where the overall length of the zoom lens becomes shorter and the value becomes lower than the lower limit of inequality (7), the positive refractive power of the entire zoom lens becomes too high, and it becomes difficult to control the Petzval sum and to acquire the desired optical performance. In a case where the back focus increases and the value becomes lower than the lower limit of inequality (7), it becomes difficult to reduce the overall length.

Inequality (8) defines a relationship between the moving amount m1 and the focal length f1 in order to achieve both the desired zoom magnification and size reduction. In a case where the moving amount m1 increases and the value becomes lower than the lower limit of inequality (8), the effective diameter of the first lens unit L1 becomes too large, and it becomes difficult to reduce the size and weight of the zoom lens. In a case where the focal length f1 becomes smaller and the value becomes lower than the lower limit of inequality (8), it becomes difficult to suppress aberrations occurring in the first lens unit L1, particularly lateral chromatic aberration, at the telephoto end. On the other hand, in a case where the focal length f1 increases and the value becomes higher than the upper limit of inequality (8), the first lens unit L1 is disposed far from the second lens unit L2 in order to achieve the telephoto configuration, the diameter of the front lens increases, and it becomes difficult to reduce the size and weight of the zoom lens. In a case where the moving amount m1 becomes smaller and the value becomes higher than the upper limit of inequality (8), it becomes difficult to obtain the desired focal length at the telephoto end, or the moving amount of the rear group becomes larger in order to obtain the desired focal length and it becomes difficult to suppress zoom fluctuations such as image-plane curvature of field.

Inequality (9) defines a relationship between the focal length fw and the focal length f1 in order to obtain the necessary zoom magnification. In a case where the focal length f1 increases and the value becomes higher than the upper limit of inequality (9), the moving amount of the first lens unit L1 during zooming increases, and the overall length increases. On the other hand, in a case where the focal length f1 becomes smaller and the value becomes lower than the lower limit of inequality (9), it becomes difficult to correct spherical aberration and coma with a small number of lenses. Furthermore, the focal length on the wide-angle side becomes longer, and it becomes difficult to secure desired zoom magnification.

Inequality (10) defines a relationship between the lateral magnification βist and the combined lateral magnification βrt for image stabilization using the image stabilizing lens unit with a proper decentering amount. Inequality (10) is the so-called image stabilizing sensitivity, which expresses how much the image plane IP is decentered relative to the decentering amount of the image stabilizing lens unit at the telephoto end. In a case where the image stabilizing sensitivity of the image stabilizing lens unit increases beyond the upper limit of inequality (10), the decentering amount during image stabilization can be suppressed, which is beneficial to reducing the size of the image stabilizing unit. However, due to the excessively high image stabilization sensitivity, if the image stabilizing lens unit is decentered due to manufacturing errors etc. in a situation where no image blur occurs, eccentric coma or the like occurs and mechanical control of the decentering amount during image stabilization becomes difficult. On the other hand, in a case where the image stabilizing sensitivity of the image stabilizing lens unit IS decreases beyond the lower limit of inequality (10), the decentering amount of the image stabilizing lens unit increases in order to obtain a sufficient image stabilizing angle and the size of the image stabilization unit increases.

Inequality (11) defines a relationship between the lateral magnification βft and the combined lateral magnification βfrt in order to achieve excellent focusing performance. Inequality (11) is the expression of the focus sensitivity at the telephoto end. In a case where the focus sensitivity increases and the value becomes higher than the upper limit of inequality (11), it becomes difficult to mechanically control the focus lens unit. The refractive power of the focus lens unit tends to increase, and it becomes difficult to secure sufficient optical performance during close-distance imaging. On the other hand, in a case where the focus sensitivity decreases and the value becomes lower than the lower limit of inequality (11), the moving amount during focusing increases, the mechanical layout tends to become larger, and it becomes difficult to reduce the size of the zoom lens.

Inequalities (2) to (11) may be replaced with inequalities (2a) to (11a) below:

$$-0.75 < f2/fw < -0.25 \tag{2a}$$

$$3.3 < D1/D2 < 25.0 \tag{3a}$$

$$4.0 < TD12t/TG12 < 12.0 \tag{4a}$$

$$1.50 < \mathrm{ft}/TTDw < 3.00 \tag{5a}$$

$$12.0 < \mathrm{ft}/skw < 30.0 \tag{6a}$$

$$6.0 < TTDw/skw < 15.0 \tag{7a}$$

$$0.15 < m1/f1 < 0.40 \tag{8a}$$

$$1.20 < f1/fw < 2.80 \tag{9a}$$

$$-5.0 < (1-\beta ist)\times\beta rt < -2.5 \tag{10a}$$

$$5.0 < \left|(1-\beta\mathrm{ft}^2)\times\beta frt^2\right| < 15.0 \tag{11a}$$

Inequalities (2) to (11) may be replaced with inequalities (2b) to (11b) below:

$$-0.50 < f2/fw < -0.35 \tag{2b}$$

$$3.8 < D1/D2 < 21.0 \tag{3b}$$

$$5.6 < TD12t/TG12 < 9.5 \tag{4b}$$

$$1.80 < \mathrm{ft}/TTDw < 2.75 \tag{5b}$$

$$15.0 < \mathrm{ft}/skw < 26.0 \tag{6b}$$

-continued $$8.5 < TTDw/skw < 9.5 \quad (7b)$$

$$0.25 < m1/f1 < 0.36 \quad (8b)$$

$$1.40 < f1/fw < 2.55 \quad (9b)$$

$$-4.5 < (1-\beta ist)\times\beta rt < -3.2 \quad (10b)$$

$$6.0 < \left|(1-\beta ft^2)\times\beta frt^2\right| < 13.0 \quad (11b)$$

In each example, the second lens unit L2 tends to have strong negative refractive power, so may have two or more lenses for satisfactorily correcting various aberrations. For excellent image stabilizing performance, the entire second lens unit L2 is set to an image stabilizing lens unit, and the second lens unit may consist of three (positive, negative, and negative) lenses in order from the object side.

In each example, the first lens unit L1 may include three or more lenses so as to satisfactorily correct spherical aberration at the telephoto end. The first lens unit L1 may consist of positive, positive, and negative lenses in order from the object side to the image side for both aberration correction and overall length reduction.

The lens units following the third lens unit L3 may include, in order from the object side to the image side, a fourth lens unit L4 having positive refractive power, a fifth lens unit L5 having negative refractive power, and a sixth lens unit L6 having negative refractive power. This multi-unit telephoto configuration can achieve miniaturization at the telephoto end.

In each example, an aperture stop SP that determines the F-number may be disposed in or on the image side of the third lens unit L3 in order to suppress image-plane distortion or distortion. In each example, all lenses in the zoom lens may be spherical lenses so as to reduce manufacturing costs and manufacturing errors. In each example, the focus lens unit may be a lens unit disposed on the image side of the third lens unit L3, or as the fourth lens unit L4 or the lens unit following the fourth lens unit L4 so as to reduce the weight of the focus lens unit.

Each example can provide a lightweight and compact zoom lens while maintaining high optical performance during image stabilization at the telephoto end.

Image Pickup Apparatus

Figure 21:
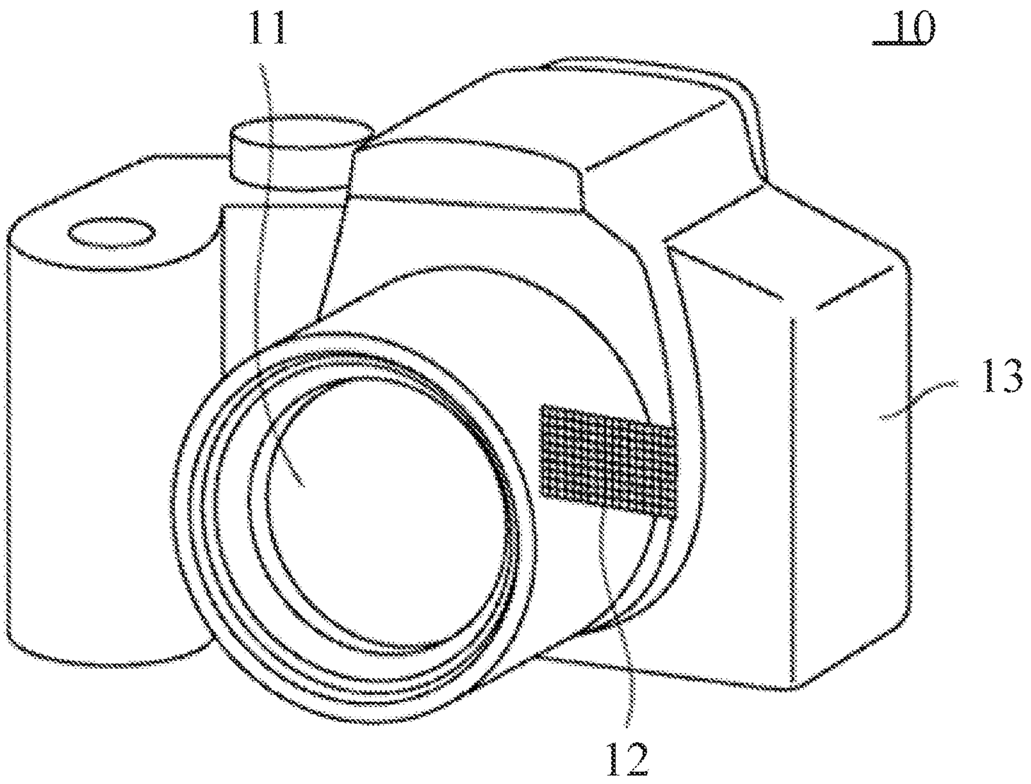
FIG. 21 is a schematic diagram of an image pickup apparatus having the zoom lens according to any one of the examples disclosed herein.

Referring now to FIG. 21, a description will be given of an image pickup apparatus (digital still camera) 10 including the zoom lens according to each example as disclosed herein. FIG. 21 is a schematic diagram of the image pickup apparatus 10. The image pickup apparatus 10 includes a camera body 13, a lens apparatus 11 including the zoom lens (1*a* to 1*e*) according to any one of Examples 1 to 5, and an image sensor 12 configured to photoelectrically convert an image formed by the zoom lens. The image sensor 12 is a photoelectric conversion element such as a CCD sensor or a CMOS sensor. The lens apparatus 11 and the camera body 13 may be integrated with, or attachable to and detachable from each other. The camera body 13 may be a so-called single-lens reflex camera having a quick turn mirror, or a so-called mirrorless camera not having a quick turn mirror. Applying the zoom lens according to each example to the image pickup apparatus 10 in this way can provide a compact image pickup apparatus.

Numerical Examples 1 to 5 corresponding to Examples 1 to 5, respectively, will be illustrated below. In the surface data in each numerical example, r represents a radius of curvature of each optical surface, and d (mm) represents an on-axis distance (distance on the optical axis) between m-th and (m+1)-th surfaces, where m is the number of the surface counted from the light incident side. nd represents a refractive index of each optical member for the d-line, and νd represents the Abbe number of the optical member. The Abbe number νd is expressed as follows:

$$\nu d = (Nd-1)/(NF-NC)$$

where Nd, NF, and NC are refractive indices for the d-line (587.6 nm), the F line (486.1 nm), and the C line (656.3 nm) in the Fraunhofer line.

In each numerical example, d, a focal length (mm), an F-number (Fno), and a half angle of view (*) are values when the zoom lens L0 is in the in-focus state at infinity. Back Focus BF represents a back focus expressed by an air conversion length of a distance on the optical axis from a final lens surface that is the lens surface closest to the image plane in the zoom lens to a paraxial image plane. The overall lens length is a sum of the back focus and the distance on the optical axis from the foremost lens surface as a lens surface closest to the object in the zoom lens L0 to the final lens surface. A lens unit includes one or more lenses.

An asterisk * is added to the right side of the surface number of an optical surface having an aspherical surface shape. An aspherical surface shape is expressed as follows:

$$x = (h^2/R)/\left[1+\left[1-(1+K)(h/R)^2\right]^{1/2}\right] + A4\times h^4 + A6\times h^6 + A8\times h^8 + A10\times h^{10} + A12\times h^{12}$$

where x is a displacement amount from a surface vertex in the optical axis direction, h is a height from the optical axis in the direction orthogonal to the optical axis, R is a paraxial radius of curvature, K is a conic constant, and A4, A6, A8, A10, and A12 are aspherical surface coefficients of respective orders. In each aspherical surface coefficient, "e±XX" means "$\times 10^{\pm XX}$" WIDE represents the wide-angle end, MIDDLE represents an intermediate (middle) zoom position, and TELE represents a telephoto end.

Table 1 summarizes various values in each numerical example.

Numerical Example 1

UNIT: mm

SURFACE DATA

| Surface No. | r | d | nd | νd |
|---|---|---|---|---|
| 1 | 208.140 | 8.30 | 1.48749 | 70.2 |
| 2 | −575.227 | 39.20 | | |
| 3 | 117.400 | 11.35 | 1.49700 | 81.5 |
| 4 | −270.733 | 2.70 | 1.61340 | 44.3 |
| 5 | 154.413 | (Variable) | | |
| 6 | −1313.396 | 3.50 | 1.80518 | 25.4 |
| 7 | −65.332 | 1.40 | 1.77250 | 49.6 |
| 8 | 114.681 | 2.08 | | |
| 9 | −137.293 | 1.40 | 1.83481 | 42.7 |
| 10 | 893.658 | (Variable) | | |
| 11 | 48.839 | 8.05 | 1.49700 | 81.5 |
| 12 | −79.168 | 0.55 | | |
| 13 | 301.466 | 1.35 | 1.77250 | 49.6 |
| 14 | 27.972 | 5.77 | 1.54072 | 47.2 |

-continued

| UNIT: mm | | | | |
|---|---|---|---|---|
| 15 | 776.993 | 0.48 | | |
| 16 | 93.677 | 6.14 | 1.51823 | 58.9 |
| 17 | −33.663 | 1.30 | 1.77250 | 49.6 |
| 18 | −558.826 | 6.04 | | |
| 19 (SP) | ∞ | (Variable) | | |
| 20 | 71.179 | 1.30 | 2.00069 | 25.5 |
| 21 | 35.239 | 4.65 | 1.61340 | 44.3 |
| 22 | −67.501 | (Variable) | | |
| 23 | 112.661 | 2.56 | 1.51742 | 52.4 |
| 24 | −88.341 | 1.22 | | |
| 25 | −100.206 | 0.90 | 1.59522 | 67.7 |
| 26 | 29.728 | (Variable) | | |
| 27 | −43.800 | 1.30 | 1.49700 | 81.5 |
| 28 | 43.800 | 4.30 | 1.72047 | 34.7 |
| 29 | −576.993 | (Variable) | | |
| Image Plane | ∞ | | | |

VARIOUS DATA

Zoom Ratio 3.82

| | WIDE | MIDDLE | TELE |
|---|---|---|---|
| Focal Length | 203.00 | 390.84 | 776.00 |
| Fno | 6.42 | 7.30 | 9.18 |
| Half Angle of View | 6.08 | 3.17 | 1.60 |
| Image Height | 21.64 | 21.64 | 21.64 |
| Overall Lens Length | 331.63 | 390.98 | 421.61 |
| BF | 37.98 | 61.62 | 96.27 |
| d5 | 39.49 | 98.84 | 129.47 |
| d10 | 43.89 | 32.37 | 3.29 |
| d19 | 46.32 | 45.47 | 47.31 |
| d22 | 21.38 | 12.89 | 3.01 |
| d26 | 26.74 | 23.95 | 26.42 |
| d29 | 37.98 | 61.62 | 96.27 |

ZOOM LENS UNIT DATA

| Lens Unit | Starting Surface | Focal Length |
|---|---|---|
| 1 | 1 | 302.68 |
| 2 | 6 | −71.48 |
| 3 | 11 | 99.38 |
| 4 | 20 | 82.71 |
| 5 | 23 | −66.78 |
| 6 | 27 | −203.48 |

Numerical Example 2

UNIT: mm

SURFACE DATA

| Surface No. | r | d | nd | vd |
|---|---|---|---|---|
| 1 | 536.590 | 4.83 | 1.48749 | 70.2 |
| 2 | ∞ | 0.30 | | |
| 3 | 251.106 | 8.46 | 1.49700 | 81.5 |
| 4 | −1673.790 | 61.51 | | |
| 5 | 91.050 | 12.15 | 1.49700 | 81.5 |
| 6 | −1226.452 | 2.70 | 1.61340 | 44.3 |
| 7 | 100.224 | (Variable) | | |
| 8 | 624.330 | 4.93 | 1.84666 | 23.8 |
| 9 | −101.074 | 1.60 | 1.58267 | 46.4 |
| 10 | −8474.517 | 0.82 | | |
| 11 | −225.063 | 1.50 | 1.83481 | 42.7 |
| 12 | 107.177 | 5.01 | | |
| 13 | −106.688 | 1.50 | 1.83481 | 42.7 |
| 14 | −376.854 | (Variable) | | |
| 15 | 49.123 | 10.11 | 1.49700 | 81.5 |
| 16 | −99.750 | 0.55 | | |
| 17 | 167.936 | 1.35 | 1.77250 | 49.6 |
| 18 | 29.139 | 7.38 | 1.54072 | 47.2 |

-continued

| UNIT: mm | | | | |
|---|---|---|---|---|
| 19 | 362.505 | 0.45 | | |
| 20 | 108.905 | 7.67 | 1.51823 | 58.9 |
| 21 | −35.539 | 1.30 | 1.77250 | 49.6 |
| 22 | −596.731 | 8.02 | | |
| 23 (SP) | ∞ | (Variable) | | |
| 24 | 61.937 | 1.30 | 2.00069 | 25.5 |
| 25 | 33.846 | 4.68 | 1.61340 | 44.3 |
| 26 | −84.841 | (Variable) | | |
| 27 | −88.686 | 1.48 | 1.51742 | 52.4 |
| 28 | −70.843 | 0.15 | | |
| 29 | 206.943 | 0.90 | 1.59522 | 67.7 |
| 30 | 29.471 | (Variable) | | |
| 31 | −44.298 | 1.30 | 1.49700 | 81.5 |
| 32 | 46.471 | 4.98 | 1.72047 | 34.7 |
| 33 | −177.536 | (Variable) | | |
| Image Plane | ∞ | | | |

VARIOUS DATA

Zoom Ratio 3.45

| | WIDE | MIDDLE | TELE |
|---|---|---|---|
| Focal Length | 203.00 | 500.93 | 699.99 |
| Fno | 5.60 | 6.34 | 7.10 |
| Half Angle of View | 6.08 | 2.47 | 1.77 |
| Image Height | 21.64 | 21.64 | 21.64 |
| Overall Lens Length | 347.80 | 433.60 | 447.80 |
| BF | 38.65 | 74.20 | 94.84 |
| d7 | 7.80 | 93.60 | 107.80 |
| d14 | 48.87 | 31.25 | 14.64 |
| d23 | 45.93 | 45.36 | 46.42 |
| d26 | 21.43 | 7.99 | 3.00 |
| d30 | 28.22 | 24.28 | 24.19 |
| d33 | 38.65 | 74.20 | 94.84 |

ZOOM LENS UNIT DATA

| Lens Unit | Starting Surface | Focal Length |
|---|---|---|
| 1 | 1 | 329.62 |
| 2 | 8 | −76.52 |
| 3 | 15 | 100.07 |
| 4 | 24 | 84.13 |
| 5 | 27 | −63.08 |
| 6 | 31 | −456.32 |

Numerical Example 3

UNIT: mm

SURFACE DATA

| Surface No. | r | d | nd | vd |
|---|---|---|---|---|
| 1 | 239.499 | 6.41 | 1.48749 | 70.2 |
| 2 | −682.613 | 39.20 | | |
| 3 | 383.309 | 6.65 | 1.49700 | 81.5 |
| 4 | −198.255 | 2.00 | 1.61340 | 44.3 |
| 5 | 606.142 | (Variable) | | |
| 6 | 348.709 | 2.47 | 1.72322 | 28.3 |
| 7 | −138.862 | 0.00 | | |
| 8 | −138.862 | 1.50 | 1.78320 | 48.3 |
| 9 | −529.645 | 1.77 | | |
| 10 | 342.121 | 1.00 | 1.83481 | 42.7 |
| 11 | 86.145 | 3.07 | | |
| 12 | −77.314 | 1.40 | 1.77250 | 49.6 |
| 13 | 76.558 | 2.92 | 1.83899 | 33.6 |
| 14 | −2475.163 | (Variable) | | |
| 15 | 45.295 | 8.27 | 1.49700 | 81.5 |
| 16 | −85.968 | 0.55 | | |
| 17 | 187.609 | 1.35 | 1.77250 | 49.6 |
| 18 | 25.519 | 6.17 | 1.54072 | 47.2 |

-continued

UNIT: mm

| | | | | |
|---|---|---|---|---|
| 19 | 244.166 | 0.45 | | |
| 20 | 67.987 | 7.13 | 1.51823 | 58.9 |
| 21 | −31.867 | 1.30 | 1.77250 | 49.6 |
| 22 | 786.113 | 20.13 | | |
| 23 (SP) | ∞ | 18.06 | | |
| 24 | 144.798 | 1.30 | 2.00069 | 25.5 |
| 25 | 51.669 | 5.42 | 1.61340 | 44.3 |
| 26 | −55.655 | 17.46 | | |
| 27 | −69.421 | 2.01 | 1.51742 | 52.4 |
| 28 | −39.772 | 10.00 | | |
| 29 | −35.157 | 0.90 | 1.59522 | 67.7 |
| 30 | −1176.924 | 26.96 | | |
| 31 | −38.517 | 1.30 | 1.49700 | 81.5 |
| 32 | 48.580 | 3.66 | 1.72047 | 34.7 |
| 33 | −489.785 | (Variable) | | |
| Image Plane | ∞ | | | |

VARIOUS DATA

Zoom Ratio 3.78

| | WIDE | MIDDLE | TELE |
|---|---|---|---|
| Focal Length | 158.88 | 299.63 | 600.00 |
| Fno | 5.89 | 7.47 | 9.18 |
| Half Angle of View | 7.75 | 4.13 | 2.07 |
| Image Height | 21.64 | 21.64 | 21.64 |
| Overall Lens Length | 332.30 | 388.15 | 447.10 |
| BF | 38.50 | 64.61 | 92.00 |
| d5 | 37.49 | 93.34 | 152.29 |
| d14 | 55.50 | 29.40 | 2.00 |
| d33 | 38.50 | 64.61 | 92.00 |

ZOOM LENS UNIT DATA

| Lens Unit | Starting Surface | Focal Length |
|---|---|---|
| 1 | 1 | 398.74 |
| 2 | 6 | −78.16 |
| 3 | 15 | 58.77 |

Numerical Example 4

UNIT: mm

SURFACE DATA

| Surface No. | r | d | nd | vd |
|---|---|---|---|---|
| 1 | 186.469 | 9.88 | 1.48749 | 70.2 |
| 2 | −726.912 | 39.20 | | |
| 3 | 177.233 | 10.76 | 1.49700 | 81.5 |
| 4 | −193.647 | 2.70 | 1.61340 | 44.3 |
| 5 | 242.431 | (Variable) | | |
| 6* | −142.676 | 2.27 | 1.84666 | 23.8 |
| 7 | −63.835 | 0.80 | 1.77250 | 49.6 |
| 8 | 109.425 | (Variable) | | |
| 9 | 61.333 | 7.63 | 1.49700 | 81.5 |
| 10 | −92.115 | 0.55 | | |
| 11 | 1476.984 | 1.35 | 1.77250 | 49.6 |
| 12 | 34.399 | 5.97 | 1.54072 | 47.2 |
| 13 | −351.449 | 0.45 | | |
| 14 | 108.611 | 5.56 | 1.51823 | 58.9 |
| 15 | −45.439 | 1.30 | 1.77250 | 49.6 |
| 16 | −921.975 | 6.06 | | |
| 17 (SP) | ∞ | (Variable) | | |
| 18 | 68.543 | 1.30 | 2.00069 | 25.5 |
| 19 | 34.997 | 4.20 | 1.61340 | 44.3 |
| 20 | −76.767 | (Variable) | | |
| 21 | −37.068 | 1.34 | 1.51742 | 52.4 |
| 22 | −35.632 | 0.15 | | |
| 23 | 117.721 | 0.90 | 1.59522 | 67.7 |
| 24 | 29.286 | (Variable) | | |

-continued

UNIT: mm

| | | | | |
|---|---|---|---|---|
| 25 | −43.555 | 1.30 | 1.49700 | 81.5 |
| 26 | 43.555 | 5.02 | 1.72047 | 34.7 |
| 27 | −318.157 | (Variable) | | |
| Image Plane | ∞ | | | |

ASPHERIC DATA

6th Surface

K = 0.00000e+00 A4 = 2.45350e−07 A6 = −4.04728e−11
A8 = 1.59426e−14

VARIOUS DATA

Zoom Ratio 3.82

| | WIDE | MIDDLE | TELE |
|---|---|---|---|
| Focal Length | 203.00 | 389.29 | 776.00 |
| Fno | 6.43 | 6.96 | 9.18 |
| Half Angle of View | 6.08 | 3.18 | 1.60 |
| Image Height | 21.64 | 21.64 | 21.64 |
| Overall Lens Length | 332.30 | 408.08 | 437.94 |
| BF | 37.00 | 54.05 | 97.68 |
| d5 | 27.42 | 103.19 | 133.06 |
| d8 | 45.45 | 39.63 | 4.42 |
| d17 | 59.88 | 58.99 | 60.55 |
| d20 | 25.74 | 13.62 | 3.00 |
| d24 | 28.13 | 29.92 | 30.55 |
| d27 | 37.00 | 54.05 | 97.68 |

ZOOM LENS UNIT DATA

| Lens Unit | Starting Surface | Focal Length |
|---|---|---|
| 1 | 1 | 318.12 |
| 2 | 6 | −84.10 |
| 3 | 9 | 110.21 |
| 4 | 18 | 87.13 |
| 5 | 21 | −68.28 |
| 6 | 25 | −256.33 |

Numerical Example 5

UNIT: mm

SURFACE DATA

| Surface No. | r | d | nd | vd |
|---|---|---|---|---|
| 1 | 268.457 | 11.38 | 1.48749 | 70.2 |
| 2 | −497.277 | 12.61 | | |
| 3 | 152.103 | 14.80 | 1.43875 | 94.7 |
| 4 | −445.928 | 2.70 | 1.61340 | 44.3 |
| 5 | 245.757 | (Variable) | | |
| 6 | −2147.592 | 3.90 | 1.76182 | 26.5 |
| 7 | −68.466 | 1.40 | 1.77250 | 49.6 |
| 8 | 140.459 | 1.64 | | |
| 9 | −313.103 | 1.40 | 1.83481 | 42.7 |
| 10 | 360.786 | (Variable) | | |
| 11 | −264.245 | 1.40 | 1.90525 | 35.0 |
| 12 | 470.676 | 0.38 | | |
| 13 | 298.312 | 1.93 | 1.80810 | 22.8 |
| 14 | −3695.446 | (Variable) | | |
| 15 | 44.959 | 9.19 | 1.49700 | 81.5 |
| 16 | −99.933 | 0.55 | | |
| 17 | 157.984 | 1.35 | 1.77250 | 49.6 |
| 18 | 27.027 | 6.73 | 1.54072 | 47.2 |
| 19 | 354.035 | 0.45 | | |
| 20 | 80.294 | 7.02 | 1.51823 | 58.9 |
| 21 | −34.972 | 1.30 | 1.77250 | 49.6 |
| 22 | 422.356 | 5.21 | | |
| 23 (SP) | 00 | (Variable) | | |

-continued

| UNIT: mm | | | | |
|---|---|---|---|---|
| 24 | 66.490 | 1.30 | 2.00069 | 25.5 |
| 25 | 35.232 | 4.55 | 1.61340 | 44.3 |
| 26 | −79.073 | (Variable) | | |
| 27 | 716.730 | 2.10 | 1.51742 | 52.4 |
| 28 | −85.930 | 1.09 | | |
| 29 | −125.479 | 0.90 | 1.59522 | 67.7 |
| 30 | 33.062 | (Variable) | | |
| 31 | −43.468 | 1.30 | 1.49700 | 81.5 |
| 32 | 56.190 | 4.16 | 1.72047 | 34.7 |
| 33 | −191.732 | (Variable) | | |
| Image Plane | 00 | | | |

VARIOUS DATA

| Zoom Ratio | 4.90 | | |
|---|---|---|---|
| | WIDE | MIDDLE | TELE |
| Focal Length | 199.98 | 390.17 | 980.38 |
| Fno | 6.43 | 6.24 | 9.18 |
| Half Angle of View | 6.17 | 3.17 | 1.26 |
| Image Height | 21.64 | 21.64 | 21.64 |
| Overall Lens Length | 362.79 | 455.26 | 482.80 |
| BF | 38.64 | 40.95 | 100.15 |
| d5 | 67.97 | 160.43 | 187.98 |
| d10 | 2.00 | 6.44 | 8.67 |
| d14 | 55.86 | 55.47 | 0.98 |
| d23 | 40.86 | 41.03 | 45.75 |
| d26 | 23.33 | 11.25 | 2.00 |
| d30 | 33.37 | 38.91 | 36.52 |
| d33 | 38.64 | 40.95 | 100.15 |

ZOOM LENS UNIT DATA

| Lens Unit | Starting Surface | Focal Length |
|---|---|---|
| 1 | 1 | 337.22 |
| 2 | 6 | −90.35 |
| 3 | 11 | −414.51 |
| 4 | 15 | 104.37 |
| 5 | 24 | 85.07 |
| 6 | 27 | −63.29 |
| 7 | 31 | −281.32 |

TABLE 1

| | INEQUALITY | Ex. 1 | Ex. 2 | Ex. 3 | Ex. 4 | Ex. 5 |
|---|---|---|---|---|---|---|
| (1) | $0.003 < D2/ft < 0.026$ | 0.011 | 0.022 | 0.024 | 0.004 | 0.009 |
| (2) | $-1.00 < f2/fw < -0.20$ | −0.352 | −0.377 | −0.492 | −0.414 | −0.452 |
| (3) | $3.0 < D1/D2 < 30.0$ | 7.348 | 5.859 | 3.837 | 20.350 | 4.973 |
| (4) | $3.0 < TD12t/TG12 < 15.0$ | 6.960 | 5.657 | 9.064 | 7.521 | 6.683 |
| (5) | $1.00 < ft/TTDw < 3.50$ | 2.340 | 2.013 | 1.806 | 2.335 | 2.702 |
| (6) | $8.0 < ft/skw < 35.0$ | 20.433 | 18.112 | 15.585 | 20.973 | 25.372 |
| (7) | $5 < TTDw/skw < 20$ | 8.733 | 8.999 | 8.631 | 8.981 | 9.389 |
| (8) | $0.10 < m1/f1 < 0.50$ | 0.297 | 0.303 | 0.288 | 0.332 | 0.356 |
| (9) | $1.00 < f1/fw < 3.00$ | 1.491 | 1.624 | 2.510 | 1.567 | 1.686 |
| (10) | $-6.0 < (1 - \beta ist)\beta rt < -2.0$ | −3.904 | −3.294 | −4.433 | −3.542 | −3.438 |
| (11) | $4.0 < \lvert(1 - \beta ft^2)\beta frt^2\rvert < 20.0$ | 10.261 | 9.019 | 6.060 | 10.400 | 12.361 |
| | D2 | 8.377 | 15.354 | 14.141 | 3.074 | 8.344 |
| | ft | 775.996 | 699.993 | 600.001 | 775.999 | 980.377 |
| | f2 | −71.481 | −76.516 | −78.164 | −84.102 | −90.353 |
| | fw | 203.002 | 202.998 | 158.885 | 203.001 | 199.985 |
| | D1 | 61.550 | 89.951 | 54.253 | 62.548 | 41.494 |
| | TD12t | 199.399 | 213.105 | 220.683 | 198.682 | 237.819 |
| | TG12 | 28.650 | 37.671 | 24.347 | 26.419 | 35.584 |
| | TTDw | 331.633 | 347.799 | 332.299 | 332.300 | 362.792 |
| | skw | 37.977 | 38.649 | 38.499 | 37.001 | 38.640 |
| | m1 | 89.979 | 100.000 | 114.802 | 105.643 | 120.012 |
| | f1 | 302.680 | 329.621 | 398.739 | 318.120 | 337.217 |
| | β ist | −1.912 | −1.814 | −1.179 | −2.213 | −5.482 |
| | β rt | −1.341 | −1.171 | −2.034 | −1.102 | −0.530 |
| | β ft | 2.360 | 2.627 | 1.797 | 2.497 | 2.730 |
| | β frt | 1.498 | 1.236 | 1.649 | 1.409 | 1.384 |

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

Each example can provide a zoom lens that has a small size and high optical performance during image stabilization at the telephoto end.

This application claims the benefit of Japanese Patent Application No. 2023-015971, filed on Feb. 6, 2023, which is hereby incorporated by reference herein in its entirety.

What is claimed is:

1. A zoom lens comprising a plurality of lens units, the plurality of lens units consisting of, in order from an object side to an image side:

a first lens unit having positive refractive power;

a second lens unit having negative refractive power; and a rear group consisting of one or more lens units, wherein each distance between adjacent lens units changes during zooming, and the second lens unit does not move for zooming, wherein at least a part of the second lens unit moves in a direction including a component orthogonal to an optical axis during image stabilization, wherein a lens disposed closest to an object in the second lens unit has positive refractive power, wherein the rear group includes a focus lens unit that moves during focusing, and wherein the following inequality is satisfied:

$$0.003 < D2/ft < 0.026$$

$$3.0 < D1/D2 < 30.0$$

$$4.0 < \left|(1-\beta\ \mathrm{ft}^2)\beta\ \mathrm{ft}^2\right| < 20.0$$

where D2 is a distance on an optical axis from a lens surface closest to an object of the second lens unit to a lens surface closest to an image plane of the second lens unit, ft is a focal length of the zoom lens at a telephoto end, and D1 is a distance on an optical axis from a lens surface closest to an object of the first lens unit to a lens surface closest to an image plane of the first lens unit, βft is a lateral magnification of the focus lens unit at the telephoto end, and βfrt is a combined lateral magnification of all lens units on the image side of the focus lens unit at the telephoto end.

2. The zoom lens according to claim 1, wherein the following inequality is satisfied:

$$-1.00 < f2/fw < -0.20$$

where f2 is a focal length of the second lens unit, and fw is a focal length at a wide angle end.

3. The zoom lens according to claim 1, wherein the following inequality is satisfied:

$$3.0 < TD12t/TG12 < 15$$

where TD12t is a distance from a lens surface closest to the object of the first lens unit to a lens surface closest to an image plane of the second lens unit at the telephoto end, and TG12 is a sum of lens thicknesses on the optical axis of the first lens unit and the second lens unit.

4. The zoom lens according to claim 1, wherein the following inequality is satisfied:

$$1.00 < \mathrm{ft}/TTDw < 3.50$$

where TTDw is an overall optical length from a lens surface closest to the object of the zoom lens to an image plane at a wide-angle end.

5. The zoom lens according to claim 1, wherein the following inequality is satisfied:

$$8.0 < \mathrm{ft}/skw < 35.0$$

where skw is a back focus of the zoom lens at a wide-angle end.

6. The zoom lens according to claim 1, wherein the following inequality is satisfied:

$$5 < TTDw/skw < 20$$

where TTDw is an optical overall length from a lens surface closest to the object of the zoom lens at a wide-angle end to an image plane, and skw is a back focus of the zoom lens at the wide-angle end.

7. The zoom lens according to claim 1, wherein the following inequality is satisfied:

$$0.10 < m1/f1 < 0.50$$

where m1 is a moving amount of the first lens unit during zooming from a wide-angle end to the telephoto end, and f1 is a focal length of the first lens unit.

8. The zoom lens according to claim 1, wherein the following inequality is satisfied:

$$1.00 < f1/fw < 3.00$$

where fw is a focal length at a wide-angle end, and f1 is a focal length of the first lens unit.

9. The zoom lens according to claim 1, wherein the following inequality is satisfied:

$$-6.0 < (1-\beta ist)\beta rt < -2.0$$

where βist is a lateral magnification of an image stabilizing lens unit that performs the image stabilization among the second lens unit at the telephoto end, and βrt is a combined lateral magnification of all lens units on the image side of the image stabilizing lens unit at the telephoto end.

10. The zoom lens according to claim 1, wherein the first lens unit consists of, in order from the object side to the image side, a set of lenses having positive, positive, and negative refractive powers.

11. The zoom lens according to claim 1, wherein the second lens unit consists of, in order from the object side to the image side, a set of lenses having positive, negative, and negative refractive powers, and wherein the second lens unit wholly serves as an image stabilizing lens unit that performs the image stabilization.

12. The zoom lens according to claim 1, wherein the rear group consists of a third lens unit having positive refractive power, a fourth lens unit having positive refractive power, a fifth lens unit having negative refractive power, and a sixth lens unit having negative refractive power.

13. The zoom lens according to claim 1, further comprising an aperture stop disposed in or on the image side of a third lens unit included in the rear group.

14. The zoom lens according to claim 1, wherein all lenses in the zoom lens are spherical lenses.

15. An image pickup apparatus comprising:

a zoom lens; and an image sensor configured to receive an image formed by the zoom lens, wherein the zoom lens includes a plurality of lens units, the plurality of lens units consisting of, in order from an object side to an image side:

a first lens unit having positive refractive power;

a second lens unit having negative refractive power; and a rear group consisting of one or more lens units, wherein each distance between adjacent lens units changes during zooming, and the second lens unit does not move for zooming, wherein at least a part of the second lens unit moves in a direction including a component orthogonal to an optical axis during image stabilization, wherein a lens disposed closest to an object in the second lens unit has positive refractive power, wherein the rear group includes a focus lens unit that moves during focusing, and wherein the following inequality is satisfied:

$$0.003 < D2/\mathrm{ft} < 0.026$$

$$3.0 < D1/D2 < 30.0$$

$$4.0 < \left|(1 - \beta \mathrm{ft}^2)\beta frt^2\right| < 20.0$$

where D2 is a distance on an optical axis from a lens surface closest to an object of the second lens unit to a lens surface closest to an image plane of the second lens unit, ft is a focal length of the zoom lens at a telephoto end, and D1 is a distance on an optical axis from a lens surface closest to an object of the first lens unit to a lens surface closest to an image plane of the first lens unit, βft is a lateral magnification of the focus lens unit at the telephoto end, and βfrt is a combined lateral magnification of all lens units on the image side of the focus lens unit at the telephoto end.

* * * * *